United States Patent [19]

Miyata et al.

[11] Patent Number: 4,739,231
[45] Date of Patent: Apr. 19, 1988

[54] IMAGE FORMING SYSTEM

[75] Inventors: Masanori Miyata, Yokohama; Yutaka Komiya; Shinichi Nakamura, both of Tokyo; Masayuki Hirose, Yokohama, all of Japan

[73] Assignee: Canon Kabushiki Kaisha, Tokyo, Japan

[21] Appl. No.: 8,133

[22] Filed: Jan. 22, 1987

Related U.S. Application Data

[63] Continuation of Ser. No. 620,715, Jun. 14, 1984, abandoned.

[30] Foreign Application Priority Data

| Jun. 16, 1983 | [JP] | Japan | 58-106621 |
| Jun. 16, 1983 | [JP] | Japan | 58-106622 |
| Jun. 16, 1983 | [JP] | Japan | 58-106623 |
| Jun. 16, 1983 | [JP] | Japan | 58-106624 |
| Jun. 16, 1983 | [JP] | Japan | 58-106625 |
| Jun. 16, 1983 | [JP] | Japan | 58-106626 |

[51] Int. Cl.$^4$ .............. H02P 3/10; G03G 15/00
[52] U.S. Cl. ................. 318/369; 318/362; 355/14 R
[58] Field of Search ........... 318/138, 254, 293, 439, 318/443, 362, 369; 355/14 R, 14 SH; 364/426

[56] References Cited

U.S. PATENT DOCUMENTS

| 3,519,805 | 7/1970 | Thorne-Booth | 364/426 |
| 3,639,754 | 2/1972 | Kovalcik et al. | 364/426 X |
| 4,223,261 | 9/1980 | White | 318/314 X |
| 4,234,833 | 11/1980 | Barrett | 318/282 |
| 4,391,506 | 7/1983 | Koide | 355/14 R X |
| 4,394,889 | 7/1983 | Gray | 187/108 |
| 4,454,454 | 6/1984 | Valentine | 318/293 |
| 4,561,771 | 12/1985 | Sugiura | 355/14 R |
| 4,568,171 | 2/1986 | Ikenoue | 355/14 R X |

FOREIGN PATENT DOCUMENTS

| 0043732 | 1/1982 | European Pat. Off. . | |
| 0066673 | 12/1982 | European Pat. Off. . | |
| 0092832 | 11/1983 | European Pat. Off. . | |
| 53-79215 | 7/1978 | Japan | 318/443 |
| 55-74385 | 6/1980 | Japan | 318/254 |
| 56-46692 | 4/1981 | Japan | 318/254 |
| 56-71489 | 6/1981 | Japan | 318/254 |
| 58-79499 | 5/1983 | Japan | 318/254 |
| 80/02135 | 10/1980 | PCT Int'l Appl. . | |
| 601491 | 7/1948 | United Kingdom . | |
| 1117830 | 6/1968 | United Kingdom . | |
| 1235809 | 6/1971 | United Kingdom . | |
| 1337308 | 11/1973 | United Kingdom . | |
| 1393944 | 5/1975 | United Kingdom . | |
| 1436913 | 5/1976 | United Kingdom . | |
| 1456434 | 11/1976 | United Kingdom . | |
| 1465676 | 2/1977 | United Kingdom . | |
| 1467250 | 3/1977 | United Kingdom . | |
| 2061559 | 5/1981 | United Kingdom . | |

OTHER PUBLICATIONS

Conference Record of the Industry Applications Society, IEEE-IAS, 1981 Annual Meeting, Philadelphia, PA, U.S.A., 5-9 Oct. 1981, pp. 265-270.

Primary Examiner—William M. Shoop, Jr.
Assistant Examiner—Bentsu Ro
Attorney, Agent, or Firm—Fitzpatrick, Cella, Harper & Scinto

[57] ABSTRACT

There is provided a moving body control device comprising a motor for driving a moving body, detector for detecting the speed of the motor, memory for storing a program for the phase comparison control of the speed of the motor, and control means for controlling the motor according to said program by inputting the output from the detector.

10 Claims, 59 Drawing Sheets

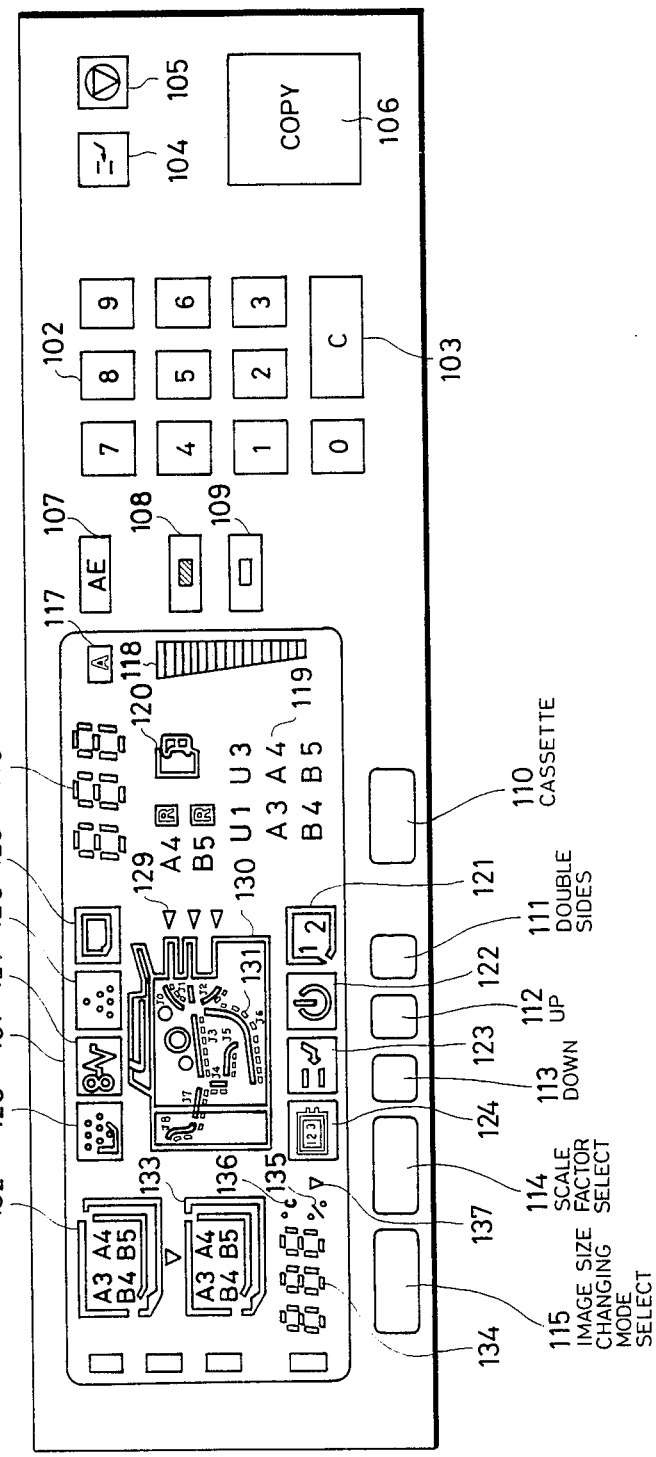

DATA
CLOCK
LATCH (1)
(2)
(3)
(4)
(5)

DISPLAY CHANGE TIMING ⟶ t

BACKWARD ← → FORWARD

FIG. 6-2
FIG. 6-3
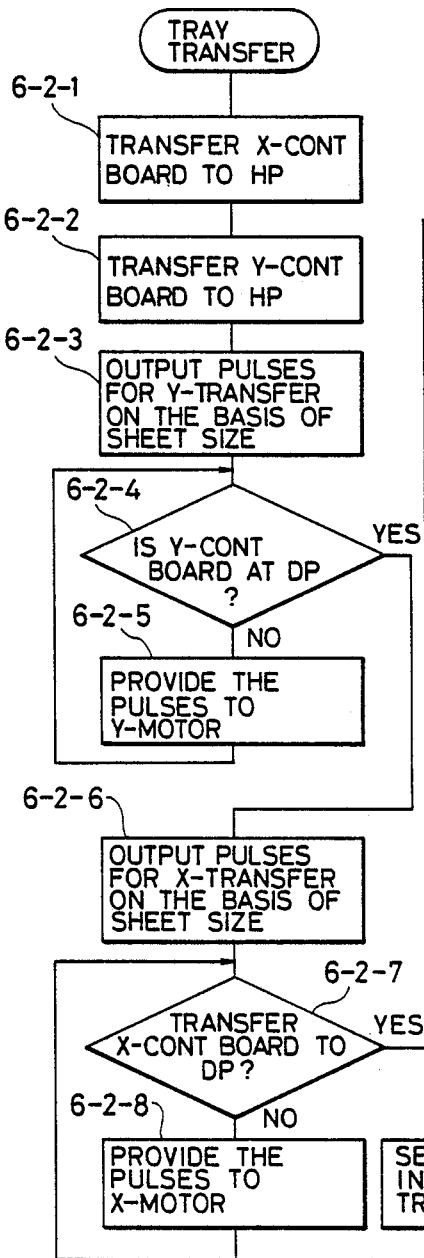
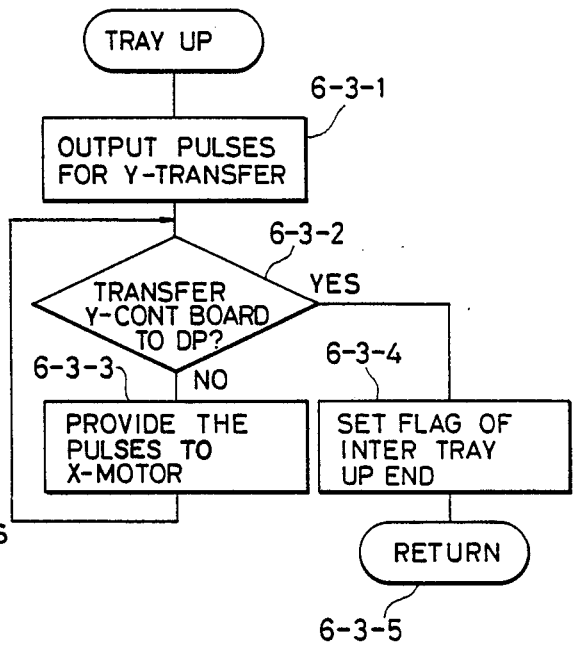

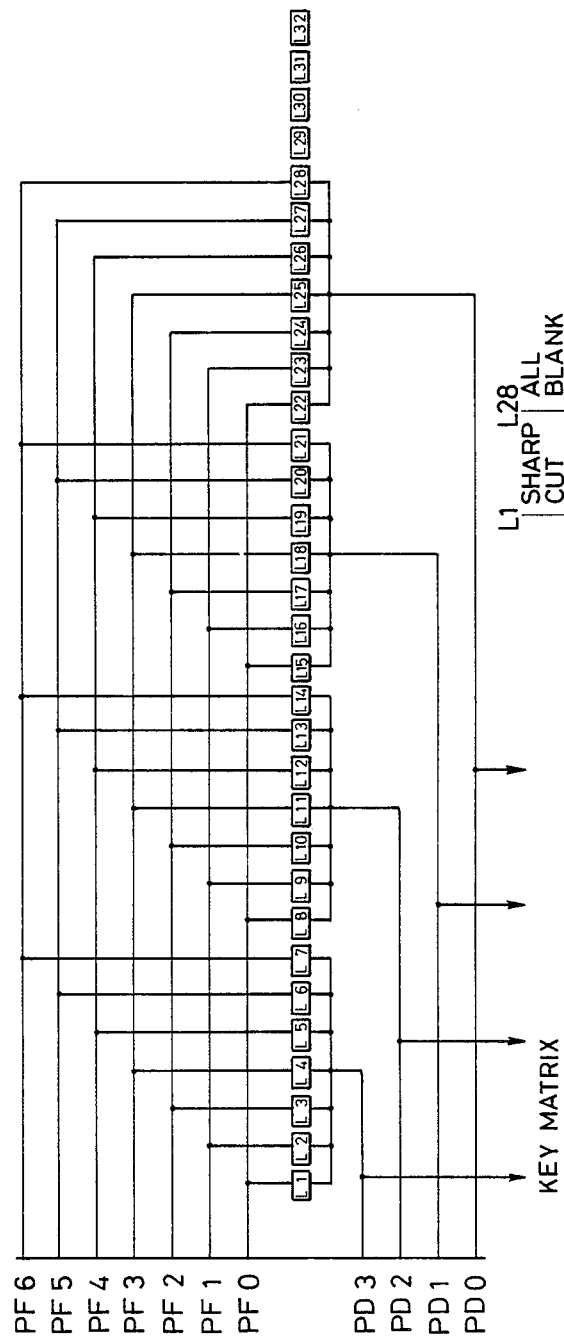
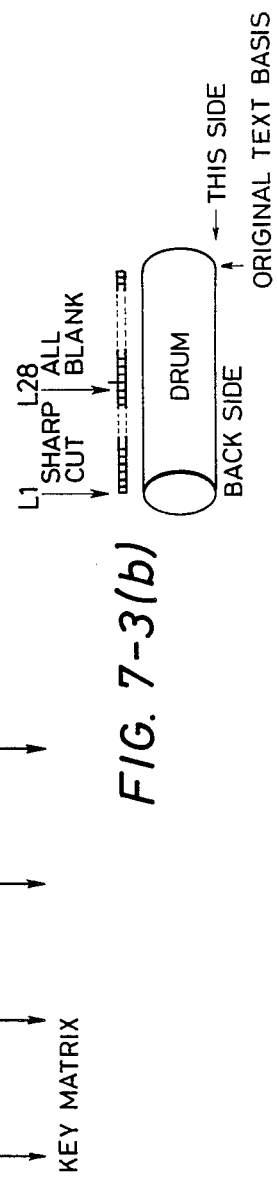

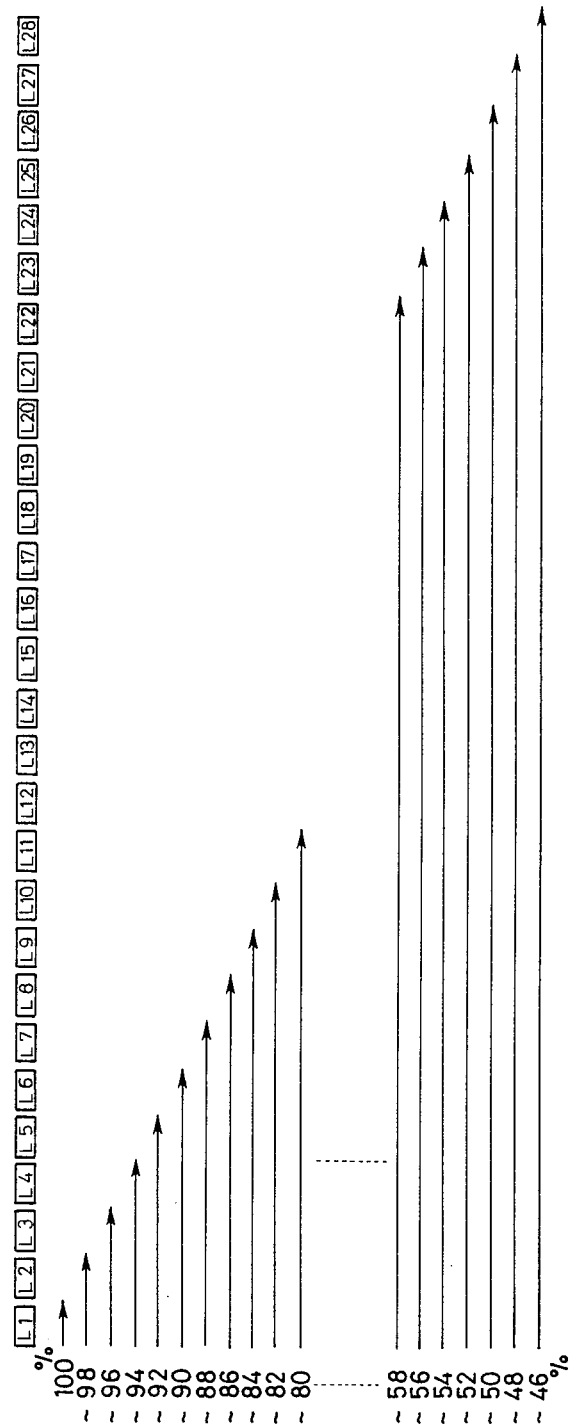

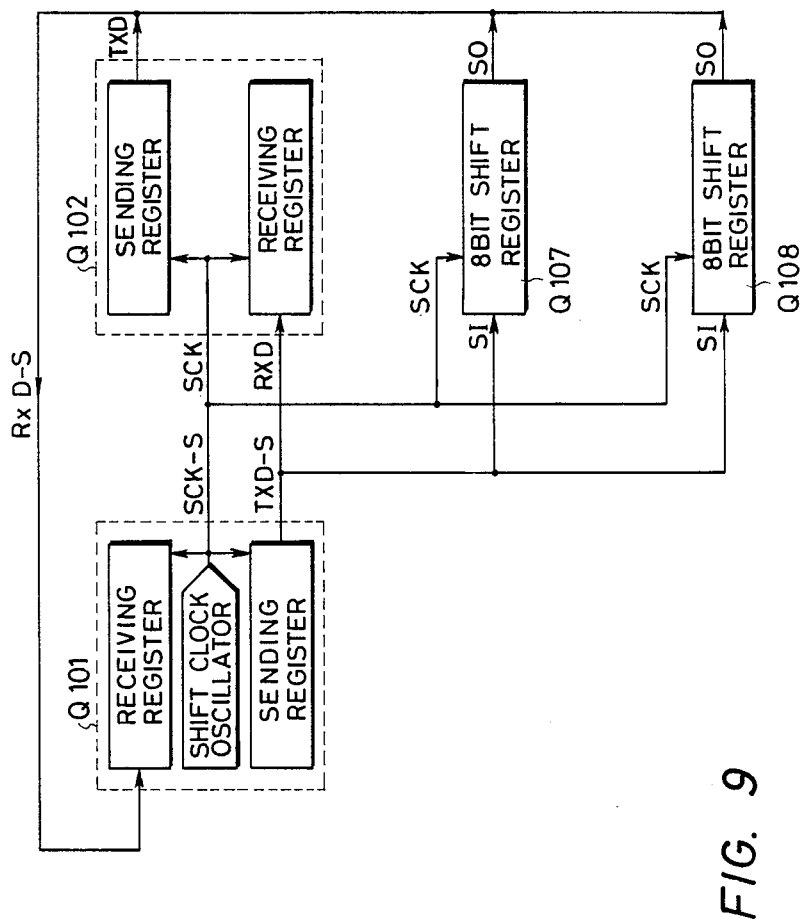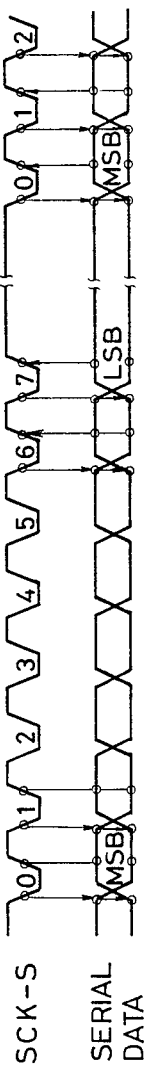
FIG. 8
FIG. 9

FIG. 10(a)

| | b7 | b6 | b5 | b4 | b3 | b2 | b1 | b0 |
|---|---|---|---|---|---|---|---|---|
| SM0 | 0 | 0 | 0 | SLAVE ABNORMAL / NORMAL | SEQUENCE OPERATION STATUS REFER TO FIG.10(b) | | | |
| SM1 | 0 | 0 | 1 | THE NUMBER OF SHEET DISPLAY COUNT DOWN REQ. | POTENTIAL CONTROL REFER TO FIG.10(c) | | | |
| SM2 | 0 | 1 | 0 | BACK DOOR OPEN | | | ADF EJECT | THE BODY SHEET DISCHARGE SENSOR SIGNAL |
| SM3 | 0 | 1 | 1 | | | | | |
| SM4 | 1 | 0 | 0 | THE BODY JAM OCCURRENCE | | THE NUMBER OF REMAINING SHEET IN THE EQUIPMENT BODY | | |
| SM5 | 1 | 0 | 1 | DECK | JAM POSITION INTER TRAY | SW BACK | SHEET DISCHARGE | SEPARATION |
| SM6 | 1 | 1 | 0 | | THE NUMBER OF PROCESSED SHEETS LOWER | | | |
| SM7 | 1 | 1 | 1 | | THE NUMBER OF PROCESSED SHEETS UPPER | | | |

FIG. 10(b)

| b3 | b2 | b1 | b0 | CONTENT |
|---|---|---|---|---|
| 0 | 0 | 0 | 0 | STOP |
| 0 | 0 | 0 | 1 | PRE-ROTATION |
| 0 | 0 | 1 | 0 | POTENTIAL CONTROL ROTATION $V_D$ |
| 0 | 0 | 1 | 1 | POTENTIAL CONTROL ROTATION V |
| 0 | 1 | 0 | 0 | POTENTIAL CONTROL ROTATION AE SCAN |
| 0 | 1 | 0 | 1 | COPY CYCLE  OPTICAL SYSTEM FORWARD |
| 0 | 1 | 1 | 0 | COPY CYCLE  OPTICAL SYSTEM RETREAT |
| 0 | 1 | 1 | 1 | THE LAST COPY CYCLE |
| 1 | 0 | 0 | 0 | POST-ROTATION |
| 1 | 0 | 0 | 1 | MANUAL INSERTION ROTATION |
| 1 | 0 | 1 | 0 | STOP ROTATION FOR MANUAL INSERTION |
| 1 | 0 | 1 | 1 | |
| 1 | 1 | 0 | 0 | |
| 1 | 1 | 0 | 1 | |
| 1 | 1 | 1 | 0 | |
| 1 | 1 | 1 | 1 | INTER TRAY  EJECT |

FIG. 10(c)

| b3 | b2 | b1 | b0 | CONTENT |
|---|---|---|---|---|
| 0 | 0 | 0 | 0 | NO OPERATION |
| 0 | 0 | 0 | 1 | $V_D$ |
| 0 | 0 | 1 | 0 | $V_{L1}$ |
| 0 | 0 | 1 | 1 | $V_{L2}$ |
| 0 | 1 | 0 | 0 | DEVELOPMENT BIAS +0V |
| 0 | 1 | 0 | 1 | DEVELOPMENT BIAS +100V |
| 0 | 1 | 1 | 0 | DEVELOPMENT BIAS +500V |
| 0 | 1 | 1 | 1 | |
| 1 | 0 | 0 | 0 | AE MEASURING EXPOSURE |
| 1 | 0 | 0 | 1 | AE EXPOSURE |
| 1 | 0 | 1 | 0 | REFERENCE EXPOSURE |
| 1 | 0 | 1 | 1 | MANUAL EXPOSURE |
| 1 | 1 | 0 | 0 | AE START |
| 1 | 1 | 0 | 1 | AE END |
| 1 | 1 | 1 | 0 | |
| 1 | 1 | 1 | 1 | |

FIG. 11(a)

| | b0 | b1 | b2 | b3 | b4 | b5 | b6 | b7 |
|---|---|---|---|---|---|---|---|---|
| MS0 | MASTER ABNORMAL / NORMAL | PWR ON / OFF | SHEET CASSETTE YES / NO | MANUAL / AE | 0 | 0 | 0 | 0 |
| MS1 | END OF LENS DISPLACEMENT | SORTER ENABLE | INTER TRAY READY / NOT READY | STOP / INTERRUPTION KEY INPUT YES / NO | 1 | 0 | 0 | 0 |
| MS2 | | | REFER TO FIG.11(c) | OPERATION MODE | 0 | 1 | 0 | 0 |
| MS3 | | RESTART REQ | SW BACK REQ | INTER TRAY PAPER FULL / EMPTY | 1 | 1 | 0 | 0 |
| MS4 | THE NUMBER OF SET UP SHEET DIGIT OF "1" (BCD) | | | | 0 | 0 | 1 | 0 |
| MS5 | THE NUMBER OF SET UP SHEET DIGIT OF "10" (BCD) | | | | 1 | 0 | 1 | 0 |
| MS6 | THE NUMBER OF SET UP SHEET DIGIT OF "100" (BCD) | | | | 0 | 1 | 1 | 0 |
| MS7 | SORTER JAM | ADF JAM | CONTROL COUNTER NONE | | 1 | 1 | 1 | 0 |

FIG. 11(b)

| | b7 | b6 | b5 | b4 | b3 | b2 | b1 | b0 |
|---|---|---|---|---|---|---|---|---|
| MS8 | 1 | 0 | 0 | 0 | | OTHER KILL | TIMER KILL | JAM KILL |
| MS9 | 1 | 0 | 0 | 1 | SORTER YES/NO | ADF YES/NO | DOUBLE SIDES YES/NO | DECK YES/NO |
| MSA | 1 | 0 | 1 | 0 | SCALE FACTOR LOWER 4BIT HEX | | | |
| MSB | 1 | 0 | 1 | 1 | SCALE FACTOR UPPER 4BIT HEX | | | |
| MSC | 1 | 1 | 0 | 0 | MANUAL INSERTION | SIZE F/H | SIZE A/B | SIZE AB/u |
| MSD | 1 | 1 | 0 | 1 | | | CASSETTE DECK | UP/DOWN |
| MSE | 1 | 1 | 1 | 0 | SORTER III | FD SORTER | DF III | ADF |
| MSF | 1 | 1 | 1 | 1 | | | CONVEY DRIVE ALL ON | JAM RELAY ON |

FIG. 11(c)

| b₃ | b₂ | b₁ | b₀ | CONTENT |
|---|---|---|---|---|
| 0 | 0 | 0 | 0 | STOP |
| 0 | 0 | 0 | 1 | POWER ON BELOW 170°C |
| 0 | 0 | 1 | 0 | POWER ON 170°C |
| 0 | 0 | 1 | 1 | POWER ON 180°C |
| 0 | 1 | 0 | 0 |  |
| 0 | 1 | 0 | 1 |  |
| 0 | 1 | 1 | 0 |  |
| 0 | 1 | 1 | 1 | INTER TRAY EJECT |

| b₃ | b₂ | b₁ | b₀ | CONTENT |
|---|---|---|---|---|
| 1 | 0 | 0 | 0 | SINGLE SIDE ORIGINAL SHEET → ONE SIDE COPY |
| 1 | 0 | 0 | 1 | DOUBLE SIDES ORIGINAL SHEET → ONE SIDE COPY |
| 1 | 0 | 1 | 0 | MANUAL INSERTION ONE SIDE COPY |
| 1 | 0 | 1 | 1 |  |
| 1 | 1 | 0 | 0 | SINGLE SIDE ORIGINAL SHEET → DOUBLE SIDES TOP SURFACE |
| 1 | 1 | 0 | 1 | SINGLE SIDE ORIGINAL SHEET → DOUBLE SIDES UNDER SURFACE |
| 1 | 1 | 1 | 0 | DOUBLE SIDES ORIGINAL SHEET → DOUBLE SIDES TOP SURFACE |
| 1 | 1 | 1 | 1 | DOUBLE SIDES ORIGINAL SHEET → DOUBLE SIDES UNDER SURFACE |

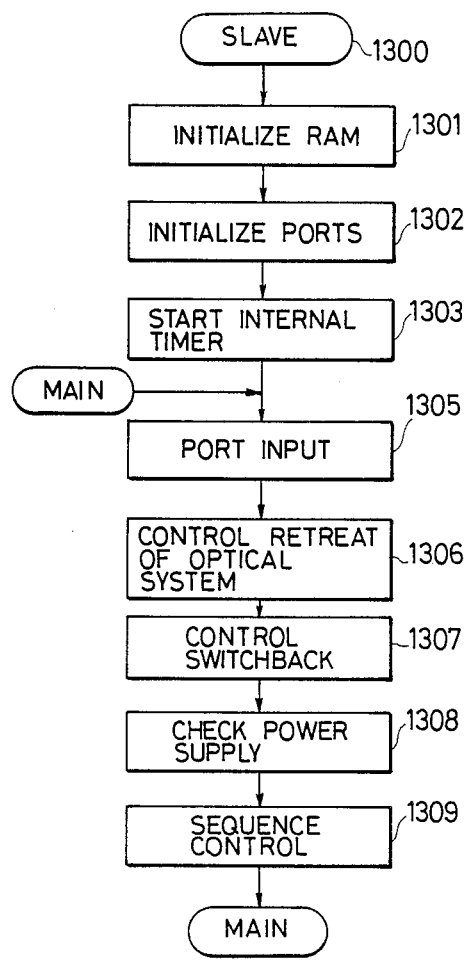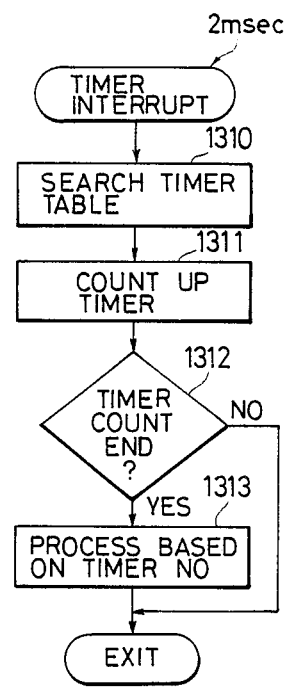

FIG. 13-14

```
STS 21 ─(1402)
    │
    ▼
 1402-1
 ╱DRUM  ╲  NO
╱ CLOCK  ╲──────┐
╲  193?  ╱      │
 ╲      ╱       │
  ▼ YES         │
1402-2          │
┌──────────────┐│
│ 4 TIMES      ││
│ MEASUREMENT  ││
│ OF DARK      ││
│ PORTION      ││
│ ON DRUM      ││
│ SURFACE      ││
└──────┬───────┘│
       ▼        │
 ┌──────────┐   │
 │ CLEAR    │   │
 │ DRUM     │   │
 │ CLOCK    │1402-3
 └────┬─────┘   │
      ▼         │
 ┌──────────┐1402-4
 │STATUS←22 │   │
 └────┬─────┘   │
      ▼         │
    (EXIT)◄─────┘
```

FIG. 13-15

```
STS 22 ─(1403)
    │
    ▼
 1403-1
 ╱ END    ╲ NO
╱ OF LENS  ╲────┐
╲ TRANSFER ╱    │
 ╲   ?    ╱     │
  ▼ YES         │
1403-2          │
┌──────────────┐│
│ TURN ON      ││
│ HALOGEN LAMP ││
│ WITH REF     ││
│ EXPOSURE     ││
└──────┬───────┘│
       ▼        │
 ┌──────────┐1403-3
 │ CLEAR    │   │
 │ DRUM     │   │
 │ CLOCK    │   │
 └────┬─────┘   │
      ▼         │
 ┌──────────┐1403-4
 │STATUS←23 │   │
 └────┬─────┘   │
      ▼         │
    (EXIT)◄─────┘
```

FIG. 13-16

```
STS 23 ─(1404)
    │
    ▼
 1404-1
 ╱DRUM  ╲  NO
╱ CLOCK  ╲──────┐
╲  115?  ╱      │
 ╲      ╱       │
  ▼ YES         │
1404-2          │
┌──────────────┐│
│ 3 TIMES      ││
│ MEASUREMENT  ││
│ OF POTENTIAL │
│ OF LIGHT     ││
│ PORTION ON   ││
│ DRUM SURFACE ││
└──────┬───────┘│
       ▼        │
 ┌──────────┐1404-3
 │ CLEAR    │   │
 │ DRUM     │   │
 │ CLOCK    │   │
 └────┬─────┘   │
      ▼         │
 ┌──────────┐1404-4
 │STATUS←24 │   │
 └────┬─────┘   │
      ▼         │
    (EXIT)◄─────┘
```

FIG. 13-17

```
STS 24 ─(1405)
    │
    ▼
 1405-1
 ╱DRUM  ╲  NO
╱ CLOCK  ╲──────┐
╲  96?   ╱      │
 ╲      ╱       │
  ▼ YES         │
1405-2          │
┌──────────────┐│
│ REGISTRATION ││
│ CLUTCH OFF   ││
└──────┬───────┘│
       ▼        │
 ┌──────────┐1405-3
 │ HV OFF   │   │
 └────┬─────┘   │
      ▼         │
 ┌──────────┐1405-4
 │ TURN OFF │   │
 │ HALOGEN  │   │
 │ LAMP     │   │
 └────┬─────┘   │
      ▼         │
 ┌──────────┐1405-5
 │ CLEAR    │   │
 │ DRUM     │   │
 │ CLOCK    │   │
 └────┬─────┘   │
      ▼         │
 ┌──────────┐1405-6
 │STATUS←25 │   │
 └────┬─────┘   │
      ▼         │
    (EXIT)◄─────┘
```

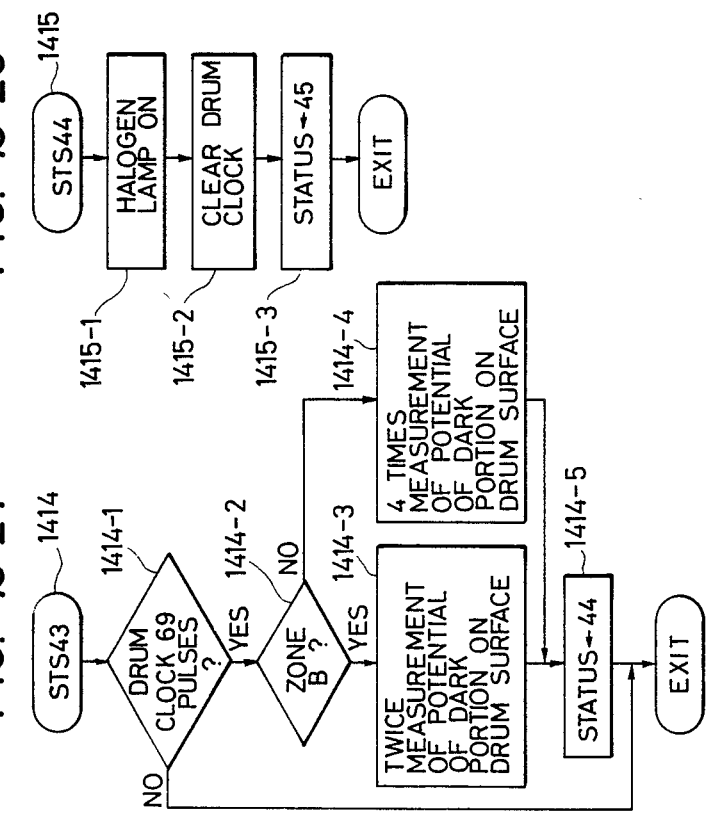
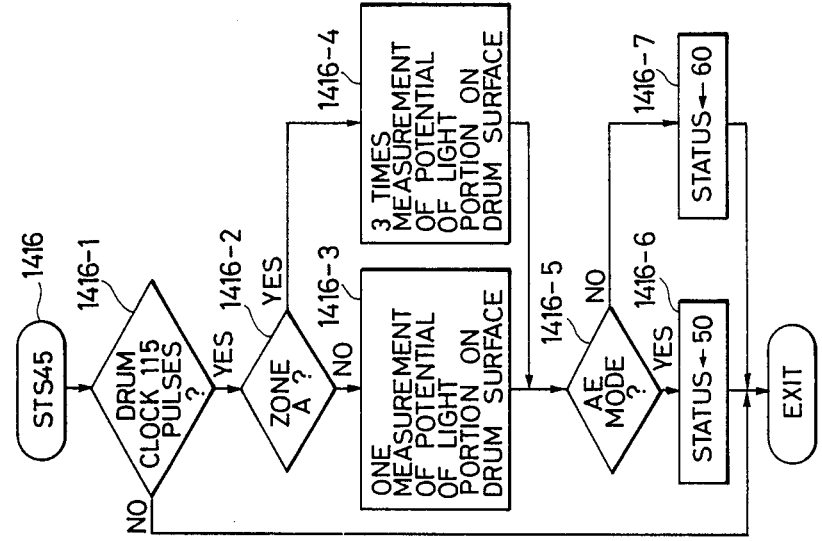
FIG. 13-26
FIG. 13-25
FIG. 13-24

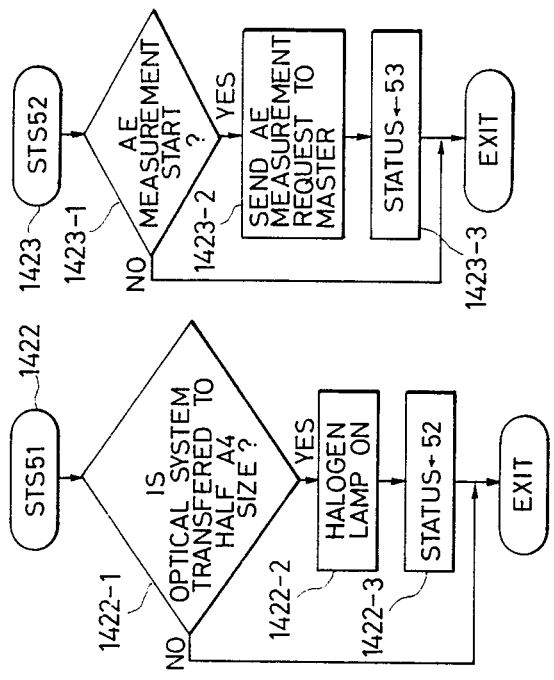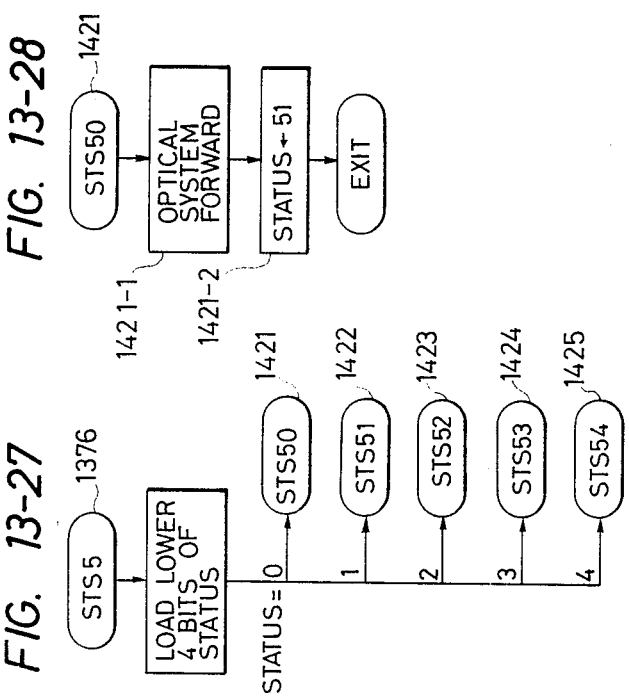

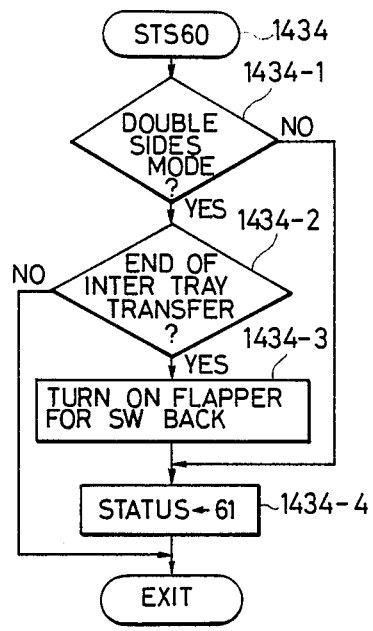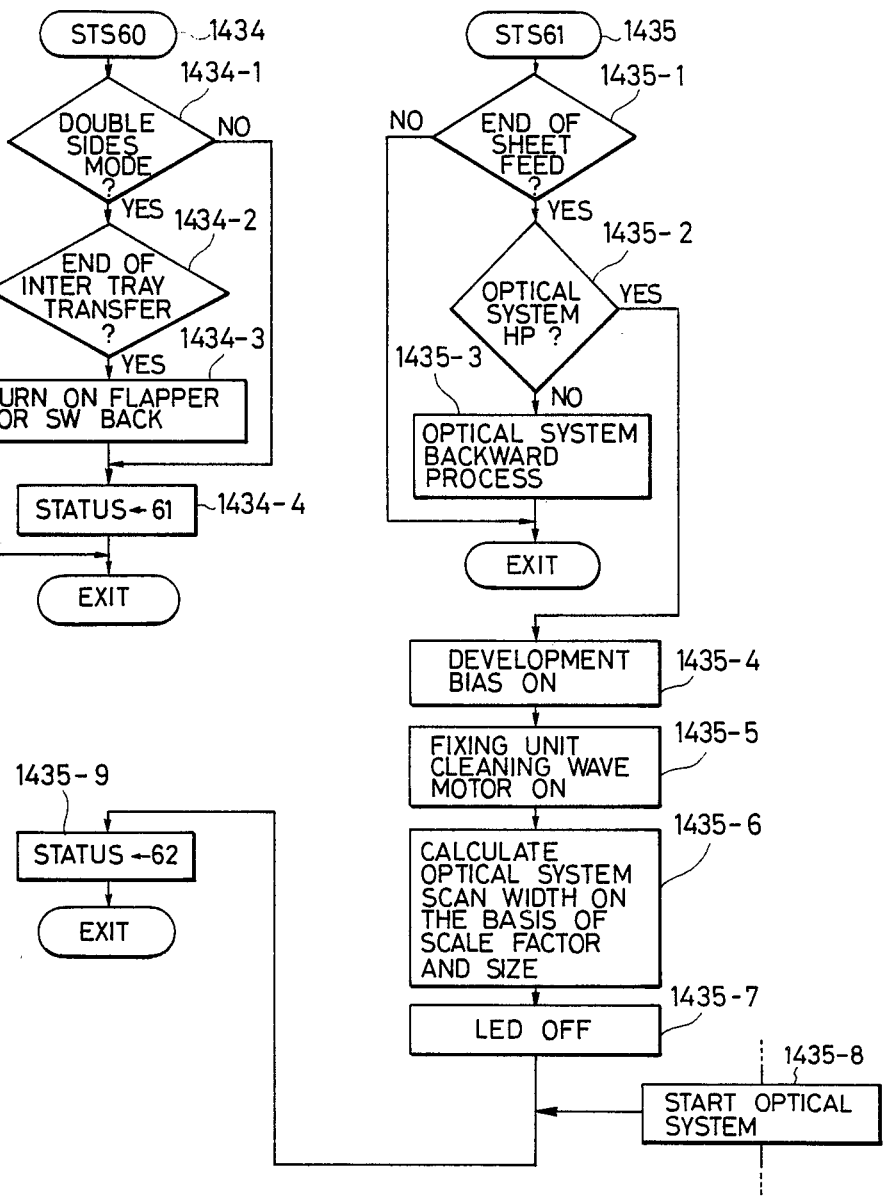
FIG. 13-34
FIG. 13-35

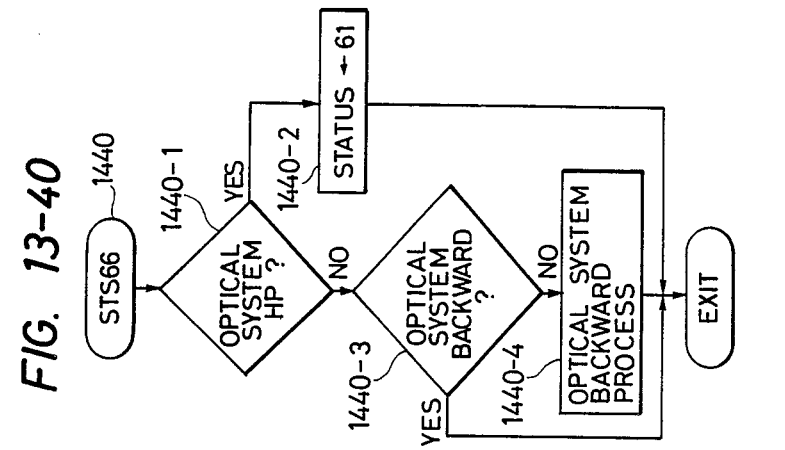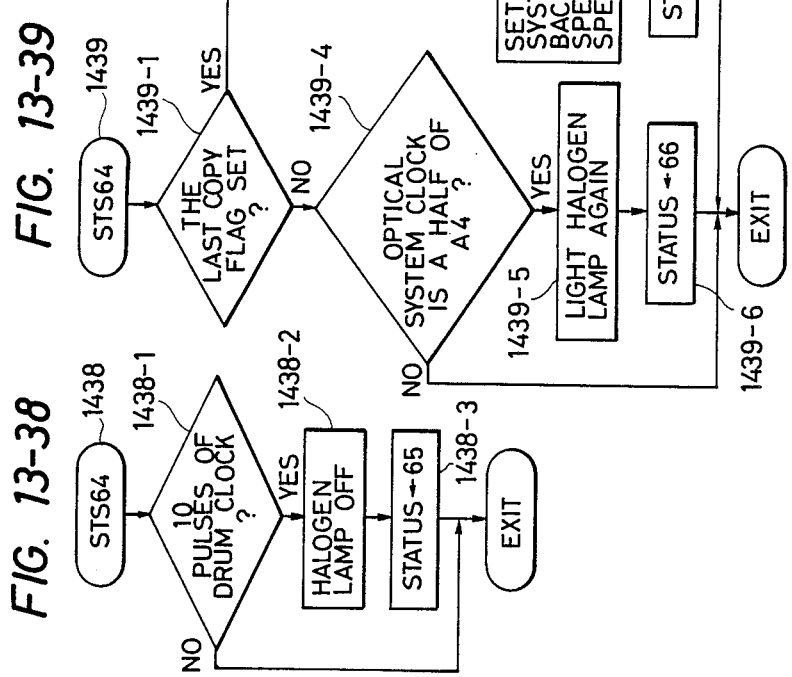

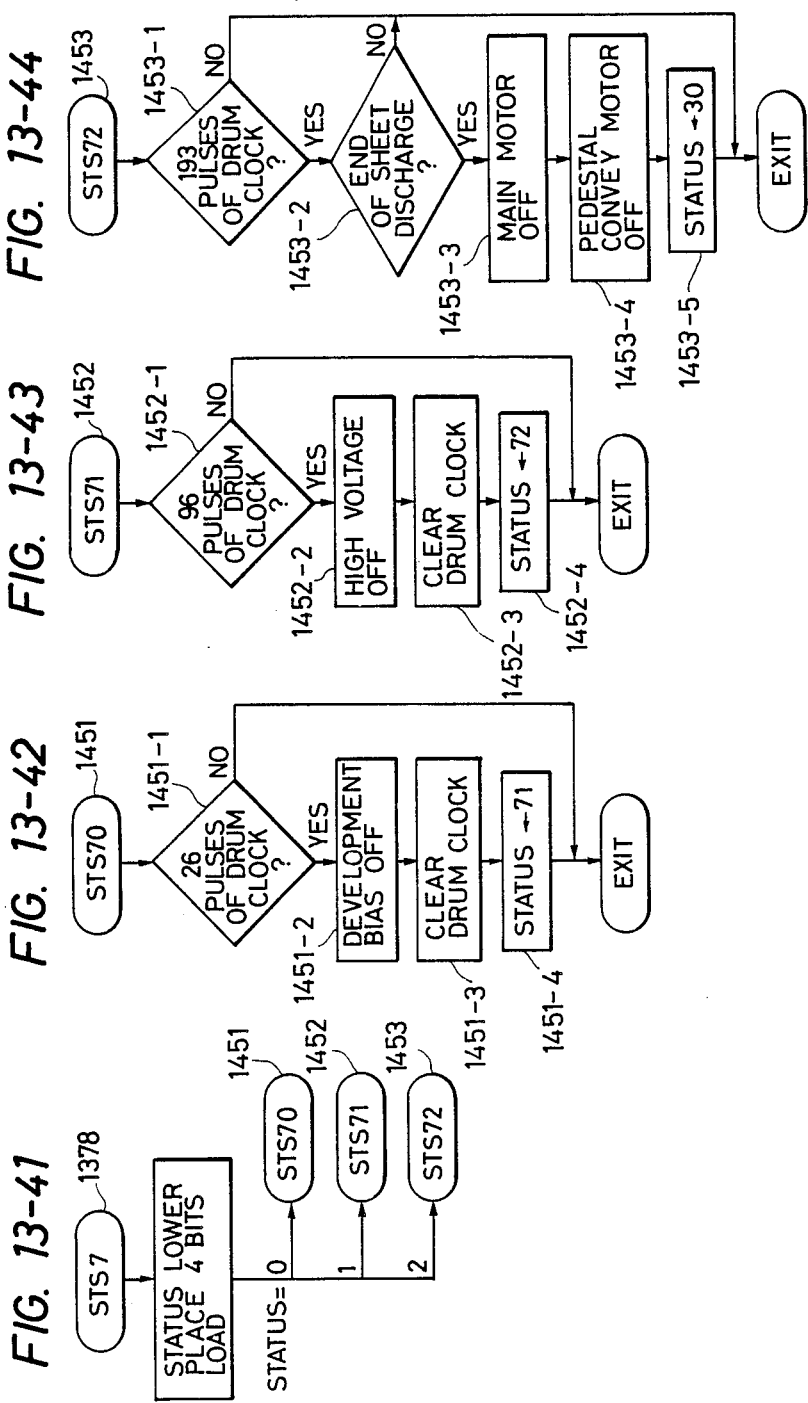

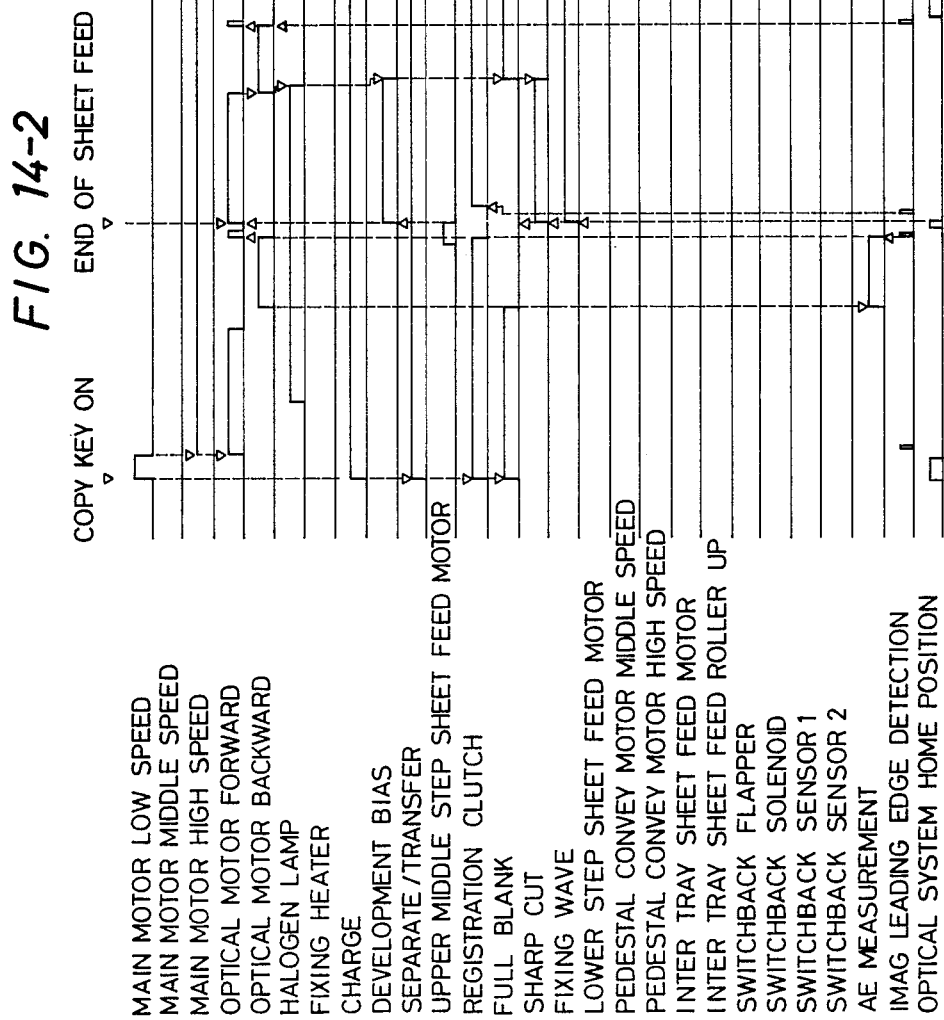

FIG. 15-2

| SCALE FACTOR % | B5R 257 | B5 182 | u3 220+10 | A4 215.9 | A4R 297 | B4 364 | u1 360+10 | A3 431.8 |
|---|---|---|---|---|---|---|---|---|
| 64 | 231 CLOCK | 164 CLOCK | 207 CLOCK | 194 CLOCK | 248 CLOCK | 248 CLOCK | 248 CLOCK | 248 CLOCK |
| 68 | 218 | 155 | 195 | 183 | 248 | 248 | 248 | 248 |
| 72 | 205 | 146 | 184 | 173 | 237 | 248 | 248 | 248 |
| 76 | 195 | 139 | 175 | 164 | 225 | 248 | 248 | 248 |
| 80 | 185 | 132 | 166 | 156 | 214 | 248 | 248 | 248 |
| 84 | 176 | 126 | 158 | 149 | 204 | 248 | 248 | 248 |
| 88 | 169 | 120 | 151 | 142 | 194 | 238 | 242 | 248 |
| 92 | 161 | 115 | 145 | 136 | 186 | 227 | 231 | 248 |
| 96 | 155 | 110 | 139 | 130 | 178 | 218 | 222 | 248 |
| 100 | 149 | 106 | 133 | 125 | 171 | 209 | 213 | 239 |
| 104 | 143 | 102 | 128 | 121 | 165 | 201 | 205 | 230 |
| 108 | 138 | 98 | 124 | 116 | 159 | 194 | 197 | 222 |
| 112 | 133 | 95 | 119 | 112 | 153 | 187 | 190 | 214 |
| 116 | 128 | 92 | 115 | 108 | 148 | 181 | 184 | 207 |
| 120 | 124 | 89 | 111 | 105 | 143 | 175 | 178 | 200 |
| 124 | 120 | 86 | 108 | 102 | 139 | 169 | 172 | 194 |
| 128 | 117 | 83 | 105 | 98 | 134 | 164 | 167 | 188 |
| 132 | 113 | 81 | 102 | 96 | 130 | 159 | 162 | 183 |
| 136 | 110 | 79 | 99 | 93 | 127 | 155 | 157 | 178 |
| 140 | 105 | 76 | 96 | 90 | 123 | 150 | 153 | 178 |

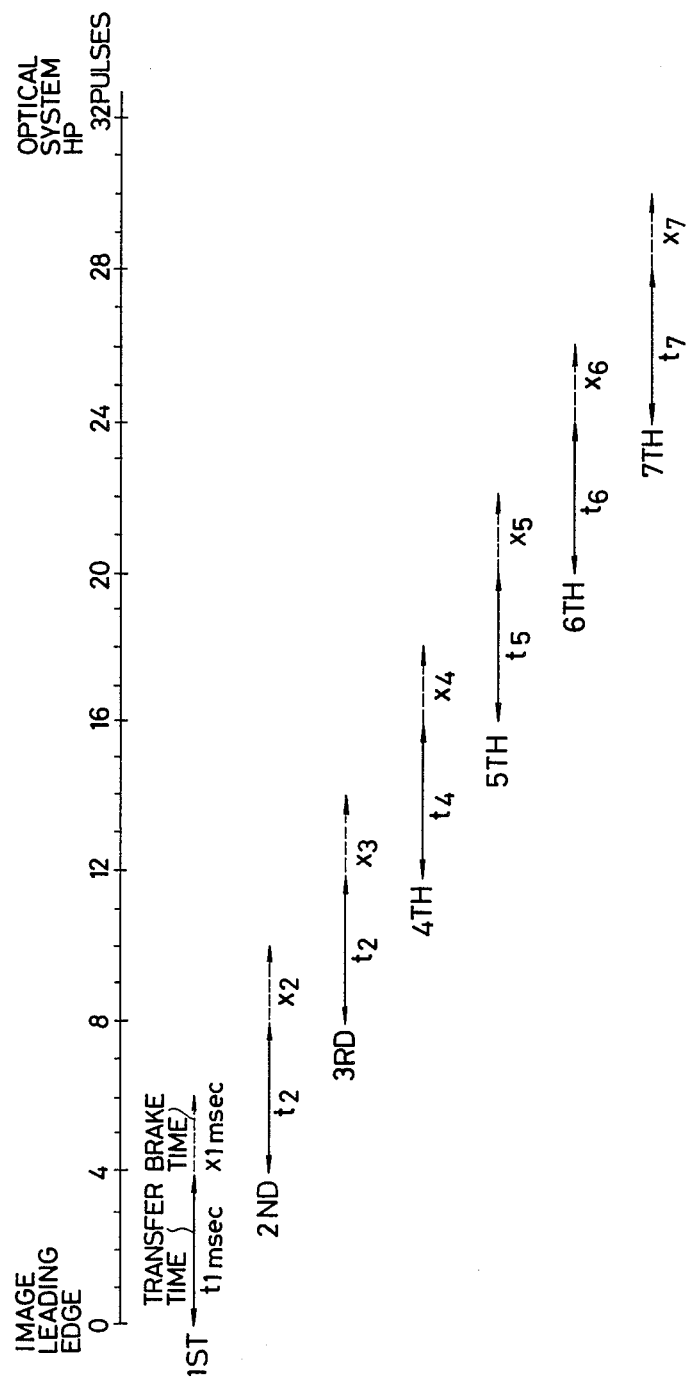

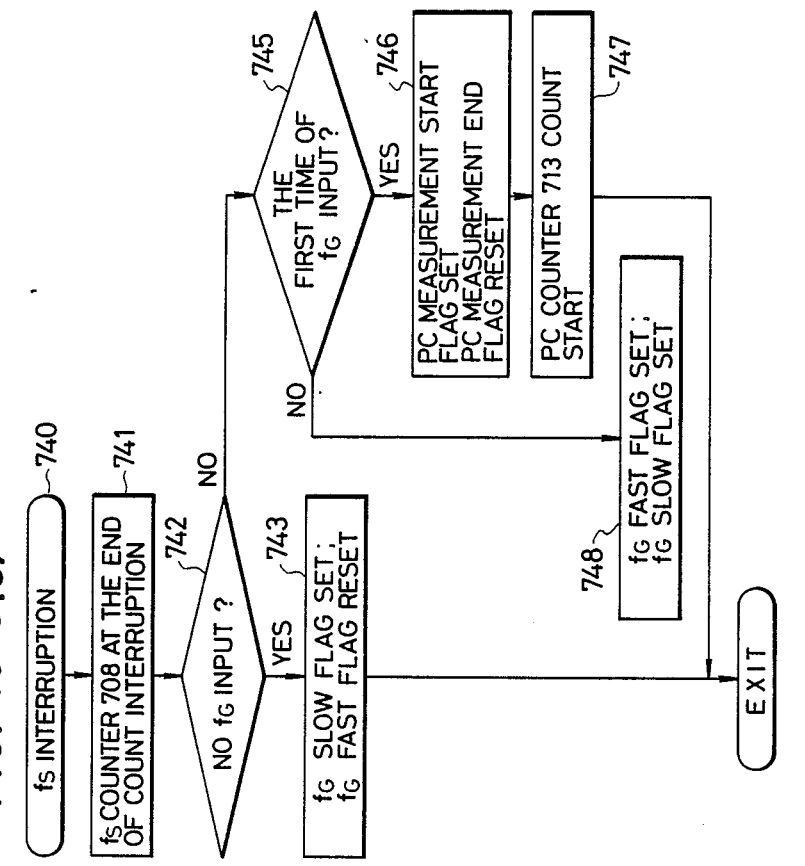
FIG. 16-3(c)
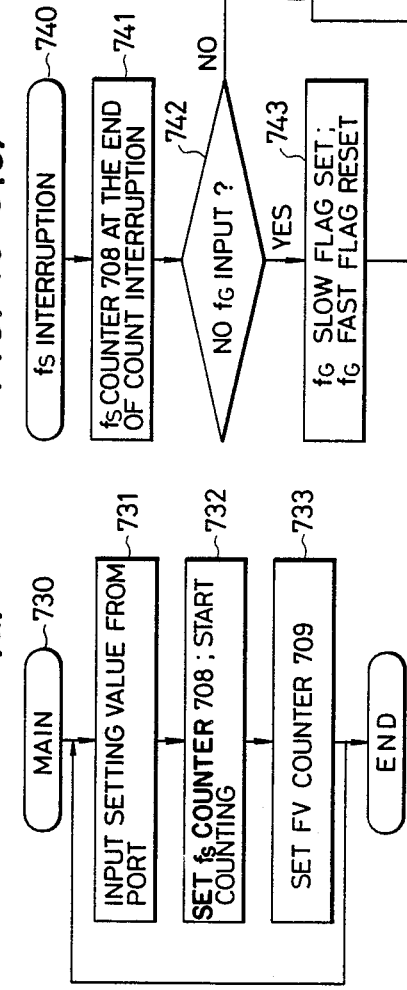
FIG. 16-3(a)
FIG. 16-3(b)

IMAGE FORMING SYSTEM

This application is a continuation of application Ser. No. 620,715 filed June 14, 1984, now abandoned.

BACKGROUND OF THE INVENTION

1. Field of the Invention

The present invention relates to an image forming system for forming images.

2. Description of the Prior Art

In prior art copying machines of the type, a light source is caused to scan along the original surface and close to the original, an optical system including the light source has been moved, and when stopping at a specified position, its speed has been slowed down by a frictional force of a wire, rail, or the like supporting the optical system by cutting off the driving force before the stop position, or typically a damper has been provided at the stop position to stop the motion.

However, as the copying speed of the copying machine has been increased to high speeds, it has been difficult for the prior art method to give stable stop position not only in copying machines but in any other equipment causing a moving body to move at high speeds, and inability to give a stable stop position has been a common problem.

In addition, copying machines of the prior art having an optical system scanning means including a light source which scans the original and is capable of changing the copy magnification, the optical system has performed the original scan of a constant width regardless of the sheet size of the transfer sheet. The processing speed of this method, however, has been slow due to wasteful scan by the optical scan means.

There is also a system wherein only the effective range of the copy sheet is scanned using a plurality of inversion filters. However, this method has a drawback that in copying machines capable of changing the copy magnification continuously or capable of setting at many copy magnifications, number of inversion sensors must be provided with resultant complicated structure and complex control.

In addition, in prior art copying machines, the control sequence of typically continuous copy has been performed based on typically a driving clock of the transfer means, and the next transfer sheet feed operation has been performed at the inverse timing of the original scan system, or typically by a position sensor of the optical system.

As a result, in copying machines wherein the magnification is settable continuously, the scan timing has changed each time, with the resultant complicated sequence control, particularly, complex feed/scan timing control in the sequential copy mode. In addition, when a plurality of sheet feed means are provided, separate control for each sheet feed means has been necessary, thereby making the control very complex.

In addition, in prior art copying machines, display items at a numeric display unit have been limited typically to the set value of the number of copies, the number of copies obtained, and magnification.

In addition, in prior art display units, display information has been sent to the display unit only when the content to be displayed on the display unit has changed. However, this method has such problem that when noise is applied onto the data bus to which information is to be sent and the effect of this noise cannot be removed, the true display content and actual display content would differ.

SUMMARY OF THE INVENTION

An object of the present invention is to remove the aforementioned drawbacks.

A further object of the present invention is to provide an image forming system free of various inconveniences occurring during the image formation.

A further object of the present invention is to improve the image forming system.

A further object of the present invention is to provide a moving body control system capable of giving a stable stop position despite the load variation.

A further object of the present invention is to provide a simply structured moving body control system capable of performing a stable motion control.

A further object of the present invention is to provide a scan device capable of shortening the original scan time.

A further object of the present invention is to provide a highly, reliable motor rotation controller.

A further object of the present invention is to provide an image forming system characterized by simple sequence control.

A further object of the present invention is to provide an image forming system of a simple structure capable of obtaining a variety of information.

A further object of the present invention is to provide a controller capable of performing highly accurate moving body shift control.

A further object of the present invention is to provide a moving body controller capable of stopping a moving body at a desired position at a high precision.

A further object of the present invention is to provide a display unit capable of giving accurate and highly reliable displays.

Further objects of the present invention will be expressly understood from the description based on the accompanying drawings and claim.

BRIEF DESCRIPTION OF THE DRAWINGS

FIG. 3 is a front elevation display unit;

FIG. 4-1 through FIG. 4-6 show examples of display on the display unit;

FIG. 4-7 is a display unit display drive circuit diagram;

FIG. 4-8 and FIG. 4-9 are display unit display timing charts;

FIG. 4-10 through FIG. 4-12 are display control flowcharts;

FIG. 5-1 is an optical lens drive unit schematic drawing;

FIG. 5-2 is an optical lens drive circuit diagram;

FIG. 5-3 (a) through (c) are optical lens drive timing charts;

FIG. 5-4 is an optical lens drive control flowchart;

FIG. 6-1 is a schematic drawing showing the structure of the intermediate tray sheet size control panel;

FIG. 6-2 is a control flowchart of the intermediate tray sheet size control panel;

FIG. 6-3 is a control flowchart of the intermediate tray X axis control panel up;

FIG. 7-1 is a key matrix circuit diagram;

FIG. 7-2 is a digit signal timing chart;

FIG. 7-3 (a) is a drum eraser LED array drive circuit diagram;

FIG. 7-3 (b) shows the positional relationship between the drum eraser LED array and the drum;

FIG. 7-4 shows the number of lamps lighting of the LED array with respect to the magnification at the time of A4 traverse feed;

FIG. 8 is an inter-CPU serial communication line configuration diagram;

FIG. 9 is a CPU serial communication line data input/output timing chart;

FIG. 10 (a) through (c) show transfer data to be transferred from the slave CPU to the main CPU;

FIG. 11 (a) to (c) show transfer data to be transferred from the main CPU to the slave CPU;

FIG. 12-1 through 12-9 are main CPU control flowcharts;

FIG. 13-1 through 13-44 are slave CPU control flowcharts;

FIG. 14-1 is a control timing chart when power is switched on;

FIG. 14-2 is a control timing chart in the normal copy mode;

FIG. 14-3 is a control timing chart in the double side copy mode;

FIG. 14-4 is an enlarged view of the switch-back unit;

FIG. 15-1 is a schematic view of the optical system drive unit including the light source;

FIG. 15-2 shows the relation among scale factors, optical system clock pulses, and transfer sheet sizes;

FIG. 15-3 and FIG. 15-5 are optical system control timing charts;

FIG. 15-4 is an optical system control flowchart;

FIG. 16-1 is a PLL controller block diagram;

FIG. 16-2 is a detailed diagram of the slave CPU;

FIG. 16-3 (a) through (d) is PLL control flowcharts;

FIG. 17-1 is a sheet feed control timing chart;

FIG. 17-2 is a sheet feed controller drive circuit diagram; and

FIG. 17-3 is a sheet feed control flowchart.

DETAILED DESCRIPTION OF THE PREFERRED EMBODIMENTS

An embodiment of the present invention will now be described with reference to the drawings.

Figure 1:
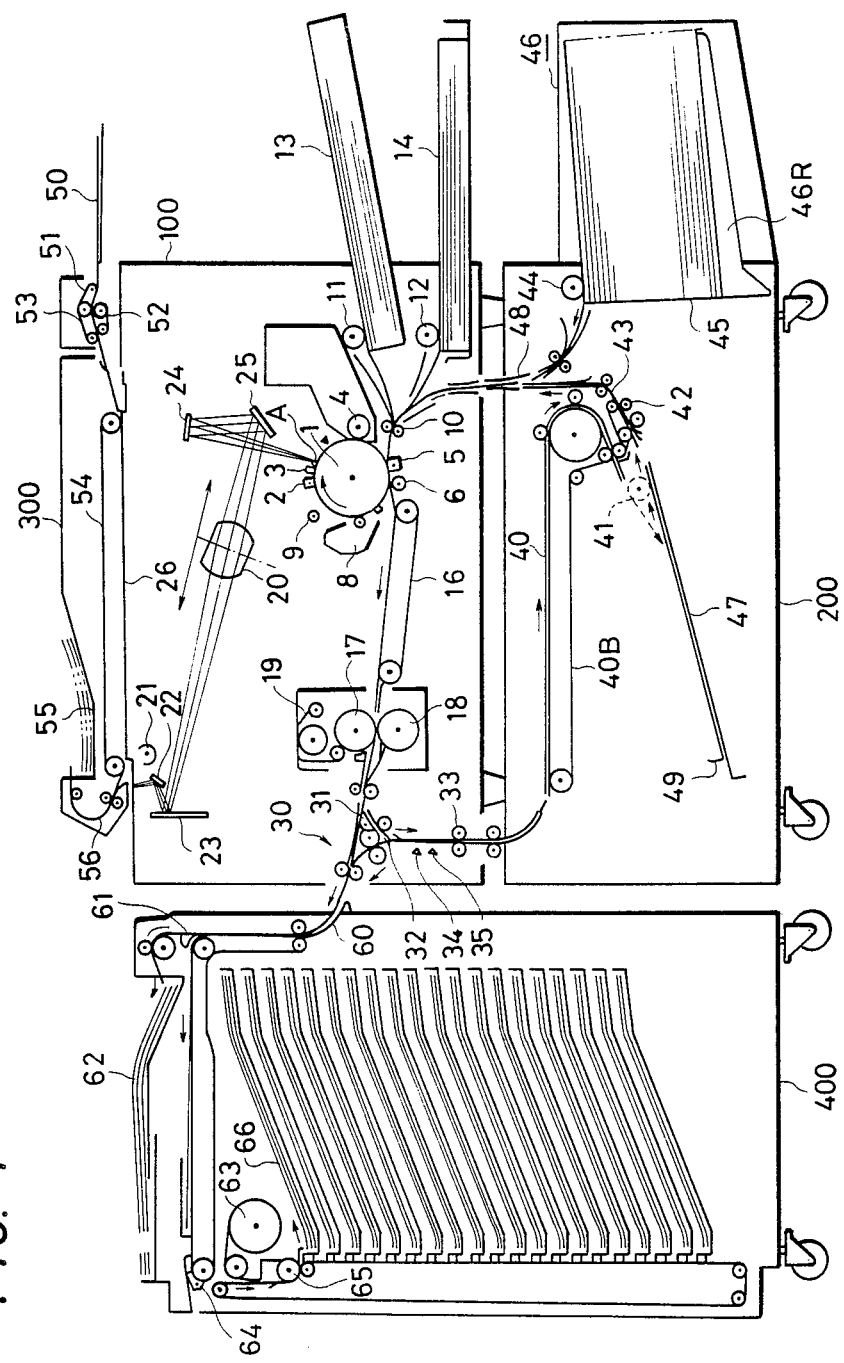
FIG. 1 is a schematic sectional view of the copying machine of an embodiment of the present invention.

FIG. 1 is a schematic view of a copying machine to which the present invention is applicable. Structure and operation will be outlined based on this view.

Figures 1, 4:
Figures 2, 4:
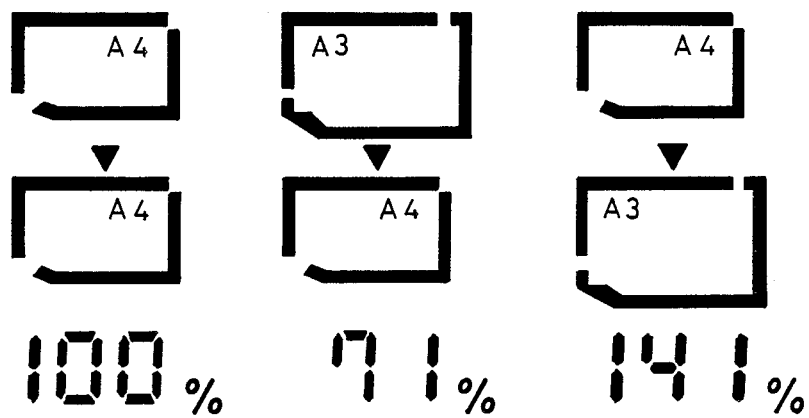
Figures 3, 4:
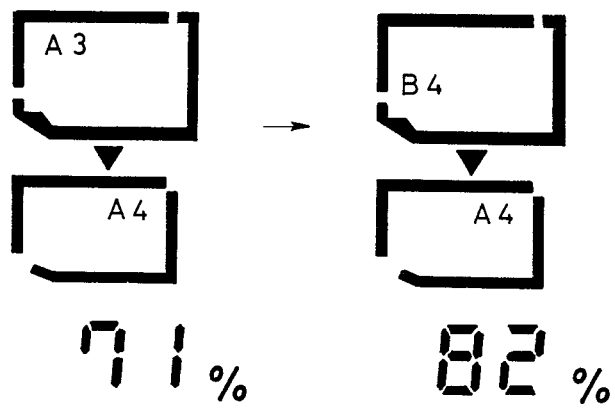
Figure 4:
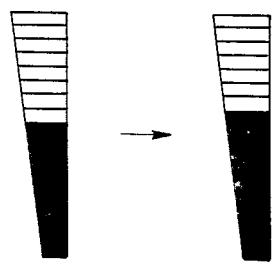

The surface of a drum 1 is comprised of a seamless photosensitive element employing a photoconductive layer, rotatably supported on a shaft, and started rotation in the arrow direction by a main motor which is actuated when a copy key (106) shown in FIG 3 is pressed.

When the drum 1 gains a specified speed, and the potential control process mentioned later (preprocess) is completed, the original set on an original platen glass 26 is illumined by an illumination lamp 21 integrated with a first scan mirror 22, and its reflected light is scanned by the first scan mirror 22 and a second scan mirror 23. As the first scan mirror 22 and the second scan mirror 23 move at the speed ratio of 1:0.5, the original is scanned with the optical path length forward of a zoom lens 20 being kept constant at all times.

The above reflected light forms an image at an exposure part A on the drum 1 after passing through the zoom lens 20, a third mirror 25, and a fourth mirror 24.

The drum 1 is discharged by a pre-discharge means 9 comprised of a pre-discharge lamp, and then corona-charged [typically plus (+) charging] by a charger 2. Thereafter the image radiated at the exposure part A is slit-exposed. By this slit exposure, a static latent image having a remaining electric charge in the black portion of the original is formed. The static latent image formed on the drum 1 is made visible as a developed toner image through the developing roller of a developing unit 4, and the toner image is transferred to the transfer sheet being fed by a transfer charger 5.

Now, the transfer sheet feed control will be outlined.

The transfer sheet in an upper cassette 13 or a lower cassette 14 is fed into the copying machine main body by a sheet feed roller 11 or 12 driven by a sheet feed stepping motor, transferred toward the photosensitive drum 1 at a precise timing taken by a registration roller 10, is brought to coincide with the leading edge of the latent image at its front end. Then, the toner image on the drum 1 is transferred onto the transfer sheet while the transfer sheet passes between the transfer charger 5 and the drum 1.

After the image transfer, the transfer sheet is separated from the drum 1 by a separation discharger 6, is directed to fixing rollers 17 and 18 by a transfer belt 16, and is discharged outside the copying machine by a discharge roller after pressure and heat fixing.

After fixing, the fixing rollers are cleaned by a web 19.

After image transfer, the drum 1 continues rotation, the surface of the drum 1 is cleaned by a cleaning unit 8 consisting of a cleaning roller and an elastic blade, recovered toner is collected to a discharge toner container by a pipe not shown, and the cycle proceeds to the next cycle.

200 is a pedestal having a 2000 sheet deck 46 separable from a copying machine main body 100 and a double side copy intermediate tray 47.

46R in the pedestal 200 is a lifter of the 2000 sheet deck 46, lifts up the deck 46 so that a sheet 45 is brought into contact with a sheet feed roller 44 at all times according to the quantity of sheets.

The sheet feed roller 44 is also driven by the stepping motor.

In the case of double side front (top surface) copy, a flapper 31 of the main body is lifted. The copied sheet is directed to the pedestal 200 side, and is kept in the intermediate tray 47 through a transfer path 40 of the pedestal. 49 is a sheet size control plate, and movable according to the sheet size to be kept. The intermediate tray 47 can accommodate up to 99 sheet. Then, in the case of double side under surface copy, the copy sheet is directed to the registration roller 10 of the main body 100 from the intermediate tray 47 by sheet feed rollers 41 and 43 and a separation roller 42 through a path 48. 300 is an original automatic feeder (ADF). 50 is a sheet feed tray for setting the original, and 55 is a sheet discharge tray. Upon copy start from the main body 100, the original is fed by a sheet feed roller 51, and is directed to a transfer belt 54 by a transfer roller 53 and a double feed prevention separation roller 52, and is set in position on the glass surface 26 of the main body 100. Then, the copy operation starts. After the completion of a series of copy operations of the original, the original is discharged to the sheet discharge tray 55 through a transfer belt 54 and a sheet discharge belt 56. While the original is in the sheet feed tray 50, the next original is fed concurrent with sheet discharge operation. This automatic original feeder may be an original processor (RDF) having an original reverser. 400 is a sorter for sorting copies discharged from the main body. 62 is a non-sort bin. Since there are only 20 sort bins 66, when sorting is not required, when copies of an original is 21 sheets or more, or when an interrupt copy occurred at the main body 100, copies are discharged to bin 62. A flapper 64 is one for flowing the sheet to the next stage sorter when a plurality of the sorters are used.

Now, each part will be described in detail.

Figures 2, 2A:
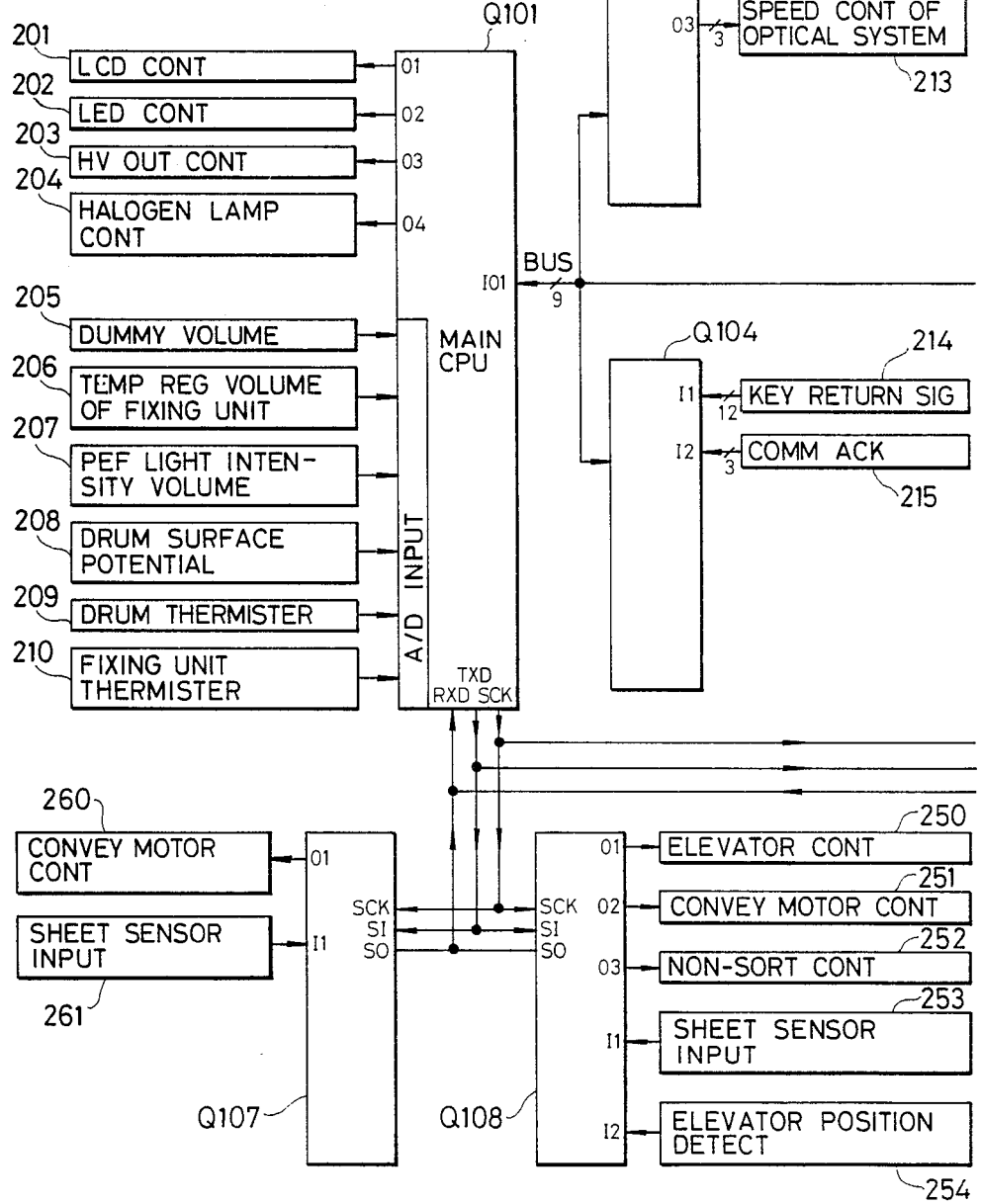
FIG. 2 composed of FIGS. 2A and 2B is a control circuit diagram of the copying machine of FIG. 1.

FIG. 2 is a control circuit diagram of the copying machine of FIG. 1. In the diagram, Q101 is a main CPU of one-chip microcomputer having a ROM memory storing the programs shown by the flowcharts of FIG. 12 (A) through (I) by the instruction word codes, a RAM memory storing various processing data, and I/O ports for taking care of input and output. Q102 is a slave CPU of one-chip microcomputer identical with the main CPU (Q101) wherein the ROM memory stores the programs shown in the flowcharts of FIG. 13-1 through 13-44. Both main CPU (Q101) and the slave CPU (Q102) have built-in A/D converter, and a temperature regulation setting volume, thermisters, and the like connected to the A/D converter. Q103 through Q106 are extension I/O ports for extending input/output of the main CPU (Q101), and are controlled by data bus and control signals from the main CPU (Q101). Q107 and Q108 are one-chip microcomputers equivalent to the main CPU (Q101), are an ADF CPU for controlling the automatic original feeder (ADF) 300 and a sorter CPU for controlling the sorter 400, connected with the main CPU (Q101) by serial communication lines (TXD, RXD, and SCK), direct feed control of the original and sorter control through the serial communication lines, and perform control.

FIG. 3 is a plan of the operation unit. 102 through 115 are keys. 102 is a numeric key for setting the number of copy sheets, 103 is a clear key for canceling that value, 104 is an interrupt key for executing copy of different number of sheets before the completion of copy of the number of sheets set by the numeric key 102, 106 is a copy key for directing copy start, 105 is a stop key for stopping copy operation during continuous copy of the number of sheets set, and 110 is a selection key of sheet feed cassette for sequentially selecting the upper, middle, and lower effective sheet feed cassettes each time the key (pushbutton) is pressed. 111 is a double side copy key for selecting double side copy, and when this key is pressed, an indicator 121 of a display unit 101 displays "1", indicating the "1" side of the double side copy. When the "1" side copy is completed, the indicator 121 displays "2" automatically, indicating the "2" side copy. These display patterns are shown in FIG. 4-1.

115 is an image size changing mode selection key for specifying four image size modes of magnification, reduction, real size, and continuous size change, and the size mode rotates in the order of real size, reduction, magnification, continuous, and real size . . . each time the key is pressed. FIG. 4-2 shows display examples of displays 132 and 133 when the key 115 is pressed. In the case of continuous size change, the displays 132 and 133 display nothing, and a display 134 displays the image size in percentage (%). The scale factors are 61 through 141%, and are directed via keys 113 and 112 in 1% step. 114 is a scale factor selection key for setting regular changing size in the image size mode selected by 115. That is, when the reduction mode is set by 115, a regular reduction scale factor is set automatically according to the cassette size having been selected at that time. For example, when the A4 size vertical feed cassette: A4R is selected, each time the key 114 is pressed, the scale factor changes to A3→A4:71%, B4→A4:82%, A3→B5:B4:87%, B4→B5:71%, A3→B5:61%, and A4→B5:87%. Concurrent with the change of the displays 132 and 133, the scale factor is displayed on the display 134 in %. FIG. 4-3 shows display examples in this case. Each time an up key 112 (or a down key 113) for continuous size change 0 is pressed, the size factor ups (or downs) by 1%, and when it is kept pressed for a second, the scale factor ups (or downs) continuously while the key is being pressed. When the scale factor becomes 141% or more, the value returns automatically to 61% and ups again. When the value becomes below 61%, it ups to 141% and downs.

The 3-digit numeric display 134 normally displays "%" by a scale factor % display 135, however, it is designed to be capable of displaying various information as mentioned later by using a display selection switch in the main body for adjustments at the time of maintenance. In addition, when the scale factor corresponds to the scale factor of regular size change when the scale factor is specified via the up and down keys 112 and 113, display may be made together with the regular size change display relevant to the sheet size of the cassette selected or the original. In this manner, though the display unit 134 is for 3-digit numeric display, as mentioned above, the display 135 displays "%" to display the scale factor in %. On the other hand, an display 136 displays the temperature of the fixer at the time when power is switched on in "°C". In this embodiment, when the fixing unit temperature becomes 170° C., the main motor (the fixing roller, drum, and transfer unit) enters low speed rotation, and enters high speed rotation at 180° C. Thereafter, the unit becomes the standby state to be ready for copying. However, under low temperature condition, several minutes are required from power on to the time when the fixing unit temperature reaches a specified level, and the operator is apt to feel it a long time. For this reason, temperature display is made using the display 134 from power on to standby. The fixer temperature is fed from a fixing unit thermister 210 shown in FIG. 2 to an A/D input terminal of the main CPU (Q101), and the display of the display 134 is updated every 700 msec according to the input value. When the fixing unit becomes standby state, the display 134 returns to the scale factor display automatically. The display 134 may be set to display other information by the operation of the selection switch in the copying machine by typically a service man at the time of factory adjustment or maintenance work. Display available by the use of switches DMS0 through 3 are as shown in Table 1. In switches DMS0 through 3, DMS0 corresponds to switch OFF, and DMS1 switch ON.

TABLE 1

| DMS0 | DMS1 | DMS2 | DMS3 | Display content | Unit |
|---|---|---|---|---|---|
| 0 | 0 | 0 | 0 | Scale factor | % |
| 0 | 0 | 0 | 1 | Fixing unit temperature | °C. |
| 0 | 0 | 1 | 0 | Drum surface temperature | °C. |
| 0 | 0 | 1 | 1 | Halogen lamp ON voltage | V |
| 0 | 1 | 0 | 0 | Halogen lamp ON voltage correction | V |
| 0 | 1 | 0 | 1 | Temperature regulation setting volume | — |

TABLE 1-continued

| DMS0 | DMS1 | DMS2 | DMS3 | Display content | Unit |
|---|---|---|---|---|---|
| 0 | 1 | 1 | 0 | | |
| 0 | 1 | 1 | 1 | | |
| 1 | 0 | 0 | 1 | Drum surface potential | V |
| 1 | 0 | 0 | 1 | Light part drum surface potential | V |
| 1 | 0 | 1 | 0 | Dark part drum surface potential | V |
| 1 | 0 | 1 | 1 | AE measurement voltage | V |
| 1 | 1 | 0 | 0 | Primary high output current | — |
| 1 | 1 | 0 | 1 | | |
| 1 | 1 | 1 | 0 | | |
| 1 | 1 | 1 | 1 | | |

The use of these displays facilitates various adjustments. "V" in the table is used by a display 137.

The set value of a fixing unit temperature adjustment setting volume 206 shown in FIG. 2 is displayed by setting the switch DMS0-DMS3 to "0, 1, 0, 1". The set value of this volume is changeable. When the main CPU (Q101) reads this set value, the fixing unit temperature setting becomes variable, and at the same time the temperature at the low speed rotation and that at the high speed rotation at the time of power switch on are changed relatively.

Figures 4, 5:
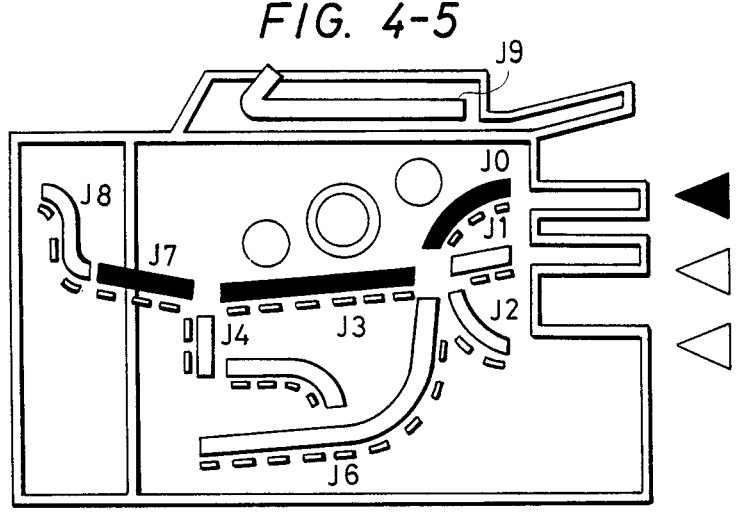
Figures 4, 5, 6:
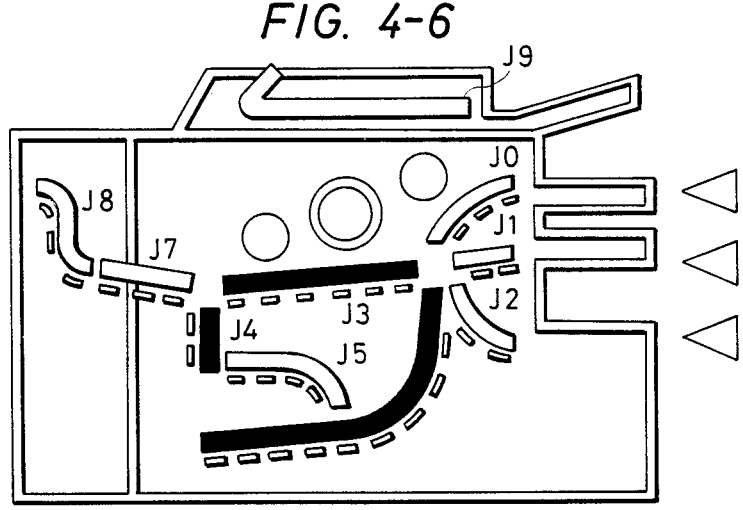

124 through 128 are warning indicators for giving lamp on indication in picture-letter. 124 is a key counter check indicator, and it lights when the key counter for counting copy sheets is not inserted to the socket of the main body. 125 is a sheet/cassette supply indicator, and it lights when there is no cassette in the selected cassette base or when there is no sheet in that cassette. 126 is a developer supply indicator which lights when the developing solution in the developing unit is below a specified level. 127 is a sheet feed check indicator, which lights in case of sheet jam in the machine. 128 is a discharged toner full indicator which lights when used toner becomes full. 122 is a weight indicator which lights when the temperature of the fixing heater is below a specified level when the power switch is turned on, and goes off when the temperature becomes a specified value or more and weight UP process is completed. 123 is an interruption indicator which lights when an interrupt key 104 is pressed, and goes off when interrupt process has been completed. 129 is a cassette indicator which indicates by going on the cassette selected by a cassette selection key among the upper, intermediate, and lower cassettes. 119 is a cassette size indicator for indicating the size of the cassette thus selected. In the case of regular image size change, when specified scale factor and the cassette size do not coincide, the recommended cassette size in the indicator 119 blinks. 107 is a selection key of the automatic exposure control (AE). Keys 108 and 109 are manual shading adjustment key. When AE is selected, an indicator 117 lights, manual shading adjustment is neglected, and a clear image free of fog can always be obtained. In the AE mode, the result of measurement made at the time of AE scan (preparatory scan) is indicated in 17 steps by shading adjustment indicator 118. Keys 108 and 109 are valid in other than the AE mode. When the key 108 is pressed, the lamp on indication of a bar graph indicator 118 extends upward, while when the key 109 is pressed, the lamp on indication of the bar graph indicator 118 falls. The standard shading level is lamp on indicated in the middle of the bar graph indicator. Continuous pressing of the key 108 (or 109) causes continuous up (or down) of lamp on indication. FIG. 4-4 shows an example of change in the bar graph indicator 118 when the key 108 is pressed in the standard shading level condition. 116 is a 3-digit numeric display for displaying the number of copy sheets having been fed from numeric keys 102. The number of copy sheets to be settable by the numeric keys 102 is 1 through 999. When more than 3 digits are fed, overflow results, and the last 3 digits become valid. That is, when 4 is fed subsequent to 123, "234" becomes valid, and "234" is displayed. 131 is an indicator for indicating sheet jam position to call operator's attention. The indicator 131 indicates the sheet jam spot and the sheet passing route through lamp on indication using 10 zones (J0 to J9). For example, when sheet jam has occurred at the sheet discharge part when the upper cassette has been selected, lamp on indication is made as shown in FIG. 4-5, and the sheet feed check indicator 127 lights at the same time. The display 116 for displaying the number of copy sheets displays "P03" indicating the number of sheets jammed in the copying machine, thereby calling the operator's attention that 3 sheets have been jammed. FIG. 4-6 shows how the indication is made when jam occurred at the switchback unit when the second (rear) side is processed in the double side mode.

The numeric display units, such as 116 and 134, employ 7-segment display element using liquid crystal. FIG. 4-7 shows the detail of the 7-segment liquid crystal display (LCD) of an LCD control unit 201 shown in FIG. 2, and FIG. 4-8 and FIG. 4-9 show the control timings.

In FIG. 4-7, Q201 through Q203 are liquid crystal drivers containing the drive unit wherein serial display data sent from the main CPU (Q101) is fed, serial to parallel conversion is performed, input data is latched by the latch input, and 7-segment display is performed based on the latched data. FIG. 4-8 shows the data storage timing. FIG. 4-7 and FIG. 4-8 show an example of displaying "7".

FIG. 4-9 is a timing chart showing the timing to store data into Q201 through Q203. At the latch signal on time, the display data are latched by the driver. In the chart, a dotted line shows the display change timing. FIG. 4-9 (1) is the drive timing of the display unit 134, and illustrates the storing of display information at a fixed period in the liquid crystal driver. (2) and (3) show examples of the storing of new display information at the time of display data change, and the storing of the same display data in the liquid crystal driver at a fixed period at the time other than change. (2) shows based on the assumption that the phase following the display data change and the phase before the display data change are the same, and (3) shows an example of storing the display data in the liquid crystal driver at a fixed period based on the display data change time. Alternatively, it may be adapted to store a new display data at the time of display data change as shown in (4), and to store the same display data at an irregular timing at other than change time. (5) shows an example of storing a new display data in the liquid crystal driver at irregular period. These data storage timings are also used at the display 116 of the indicator unit 101.

FIG. 4-10 through FIG. 4-12 show display control flowcharts to be executed by the main CPU (Q101). These flowcharts correspond to FIG. 4-9 (3).

FIG. 4-10 is a flowchart for storing the display data to the liquid crystal driver.

First, in step 4-10-1, process to output the display data in the main CPU (Q101) to the data line of the main CPU is performed, and then the step proceeds to 4-10-2. In step 4-10-2, a clock line as shown in FIG. 4-8 is output to store the display data to the liquid crystal drivers Q201 through Q203. In step 4-10-3, judgement is made to determine whether or not all display data have been output, when all display data have been output, the step proceeds to 4-10-4, and a latch signal is output so that each liquid crystal driver can latch each display data. As a result, a new display data is output from the terminal S1 through S7 of each liquid crystal driver. In step 4-10-5, the next display data change time is set to the timer, and display data output process is terminated.

FIG. 4-11 is a flowchart for storing a new display data in the liquid crystal driver when need to change the display data has occurred as there has been key input.

First, in step 4-11-1, whether or not there has been key input is judged, and when there has been key input, the step proceeds to 4-11-2. In step 4-11-2, the display data output process shown in FIG. 4-10 is executed, and data corresponding to key input is displayed.

FIG. 4-12 is a flowchart for storing display data in the liquid crystal driver at a fixed period.

In step 4-12-1, judgment is made whether the timer set in step 4-10-5 of FIG. 4-10 has come to the end. When the timer has run its course, the step proceeds to 4-12-2, and the data output process shown in FIG. 4-10 is executed. As a result, the same display data is stored in the liquid crystal driver at a fixed period except when there is a key input.

Though not used in the configuration of the embodiment, it may be designed that with the display processing function (refresh function) as described previously provided in advance to the latch unit of the liquid crystal driver, display change is performed by a command from the one-chip CPU (Q101). The same effect as above can be obtained by constant display refresh except the display data change time.

Now, the operation of the serial communication line connecting one-chip microcomputers will be described. Master control of communication is performed by the main CPU (Q101)...

As has been given above, typically nose is applied to the display data transmitting signal line when the mechanism is so designed that the display data is sent to the display unit at other than display data change time, however, even when noise effect cannot be removed, error display due to noise effect can be kept minimum, and the sent display data and actual display content can be kept identical.

Figures 3, 13:
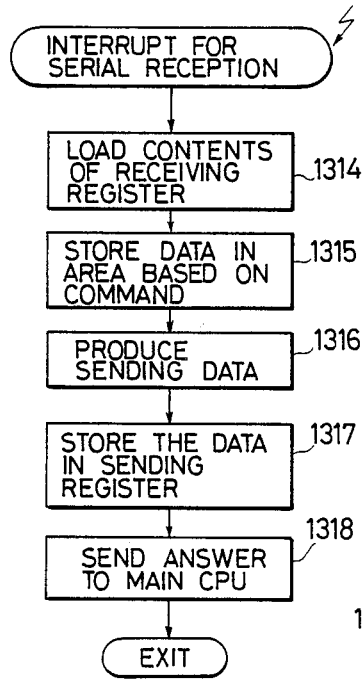
Figures 4, 13:
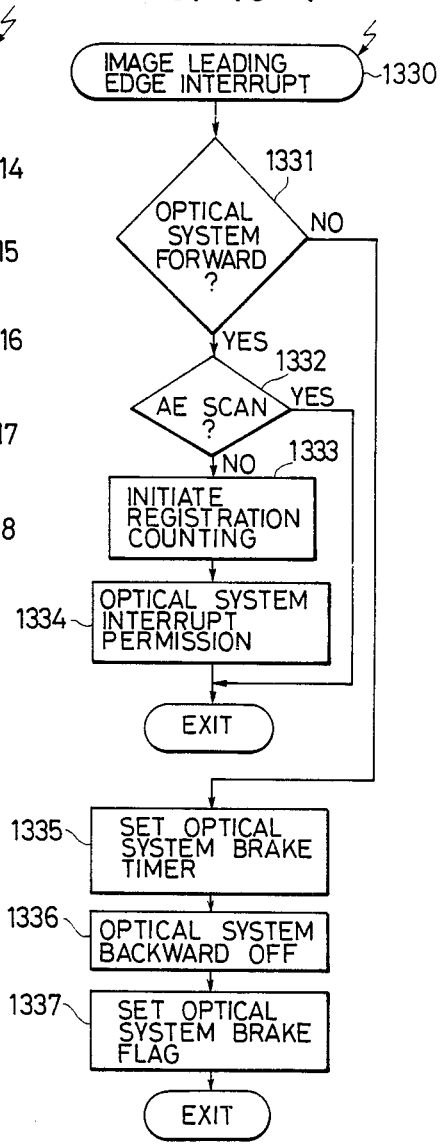
Figures 5, 13:
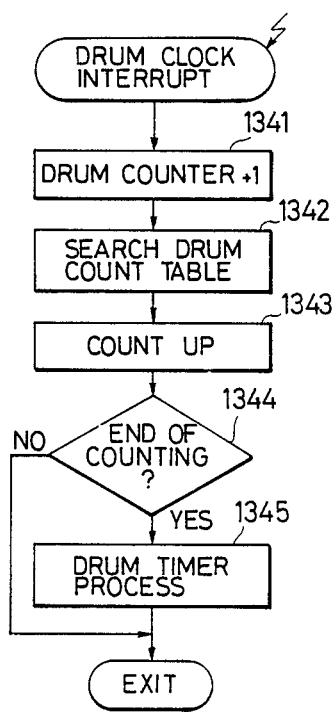
Figures 7, 13:
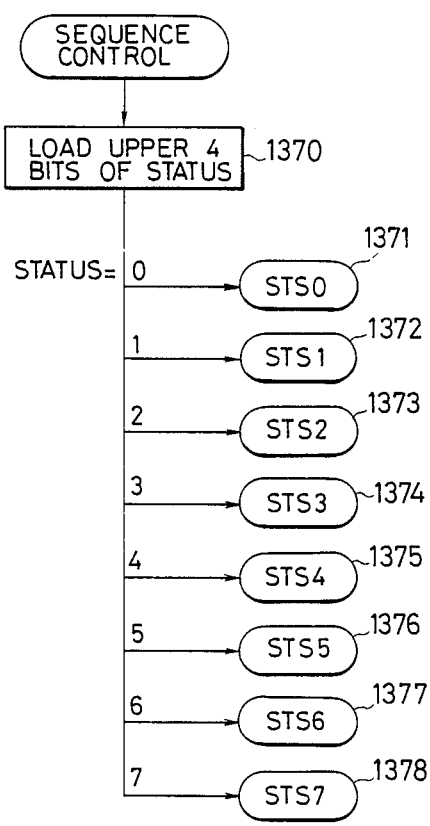
Figures 11, 13:
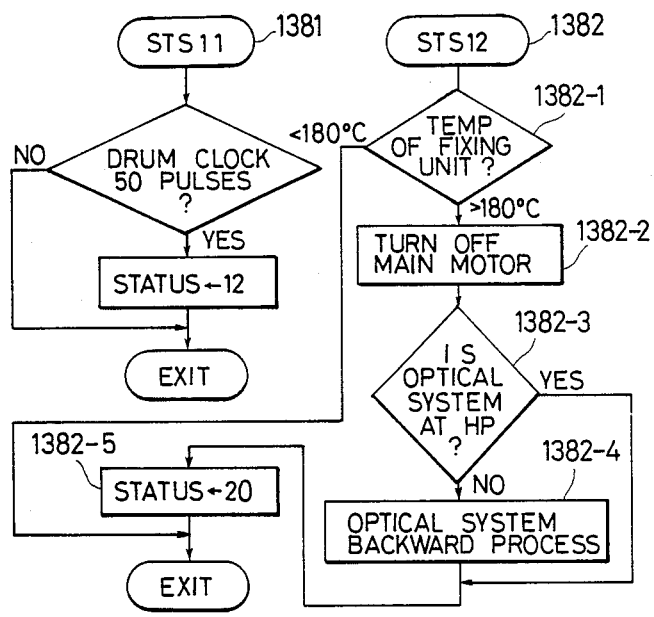
Figures 12, 13:
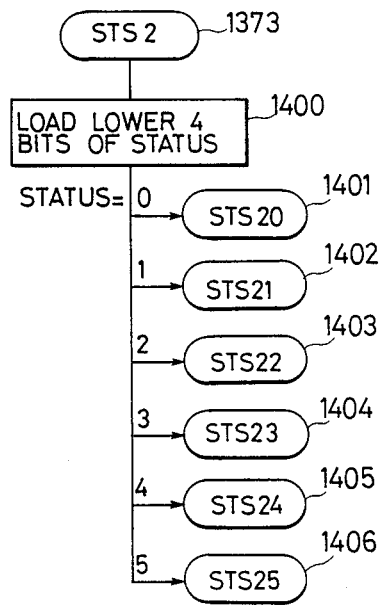
Figure 13:
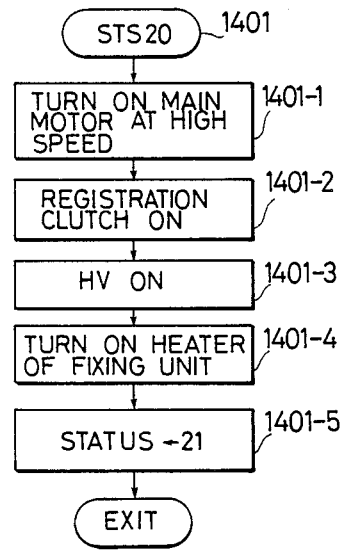

Communication master control is performed by the main CPU (Q101), and each one-chip CPU of Q102, Q107, and Q108 becomes a slave station. That is, as shown in step 1212 of FIG. 12-2, the main CPU (Q101) issues a request signal to each slave station at fixed time intervals, and data delivery is performed to the applicable slave station after an ACK signal is received from the other party. This control at the slave CPU is shown in FIG. 13-3.

Figures 4, 5, 6, 7:
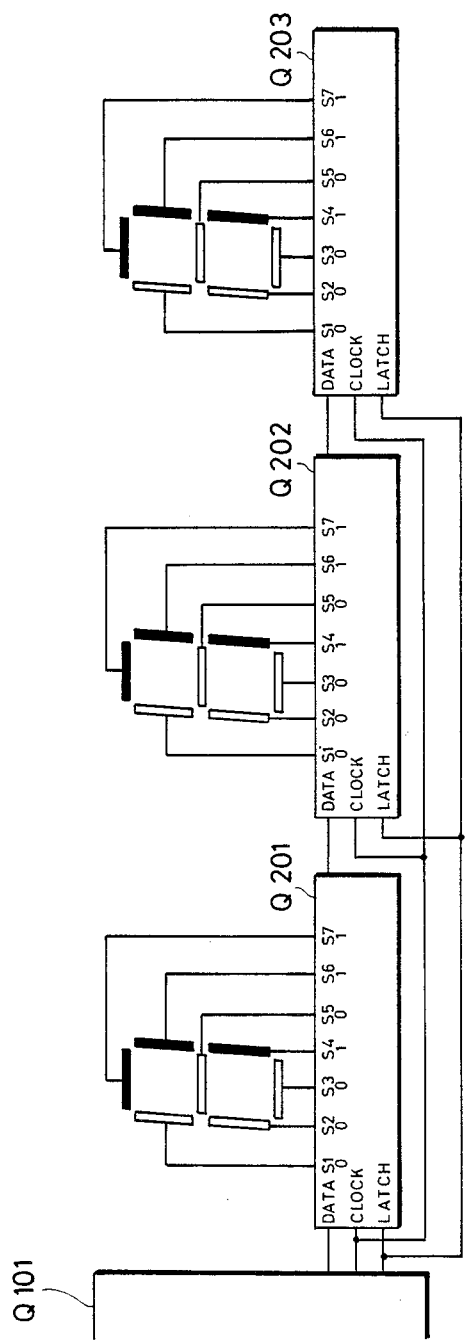
Figures 4, 5, 6, 7, 8:
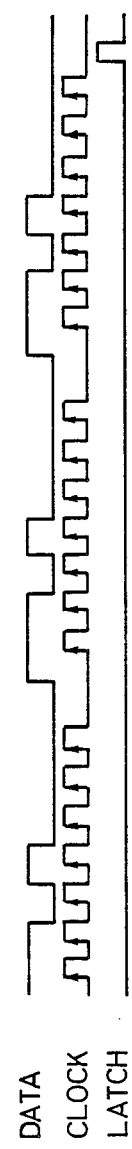
Figures 4, 5, 6, 7, 8, 9:
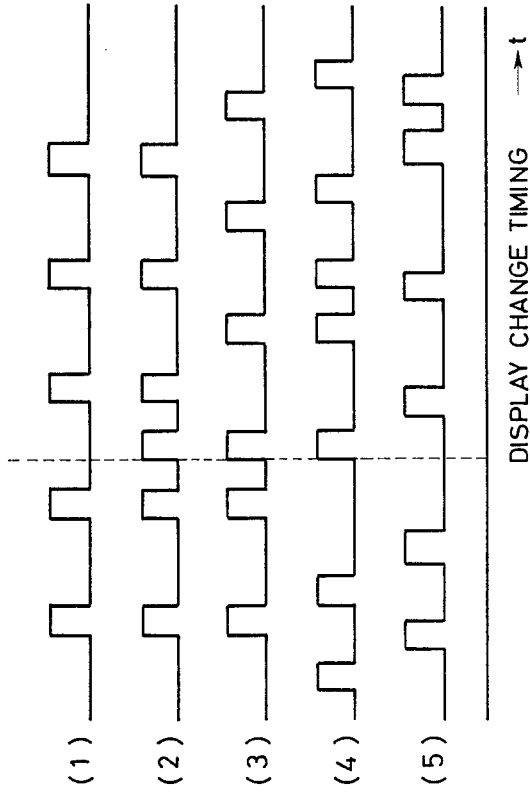

Schematic block diagram of the serial communication line is shown in FIG. 8. Each of the main CPU (Q101) and the slave CPU (Q102) has an 8-bit receiving register and an 8-bit transmitting register, while each of ADF CPU (Q107) and sorter CPU (Q108) has an 8-bit register which at once serves as the receiving and transmitting registers. The serial communication line is adapted mainly to transmit serial output data TXD-S from the main CPU (Q101), serial input data RXD-S of the main CPU (Q101), and data I/O timing clock SCK-S to be outputted from the main CPU (Q101), and the slave side makes the data I/O timing clock acceptable only when there is a request from the master (Q101). Accordingly, in no case data input/output is performed between a plurality of registers at the same time. Data is output synchronized with the fall of the data I/O timing clock SCK-S, and data input is performed at the timing of the rise of SCK-S. The timing relation between the serial data and the data I/O timing clock SCK-S is shown in FIG. 9.

Figures 4, 5, 6, 7, 8, 9, 10:
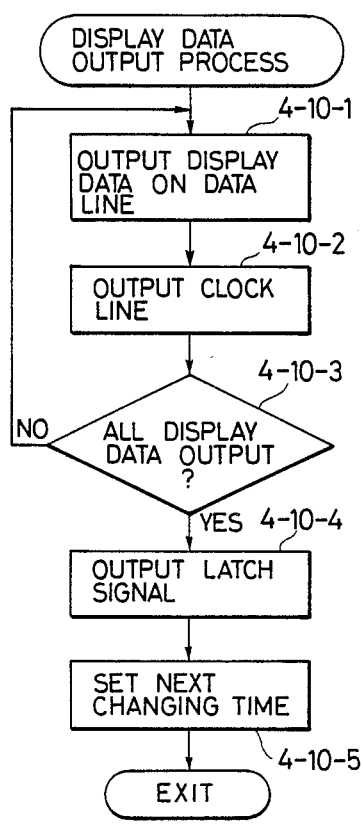
Figures 4, 5, 6, 7, 8, 9, 10, 11:
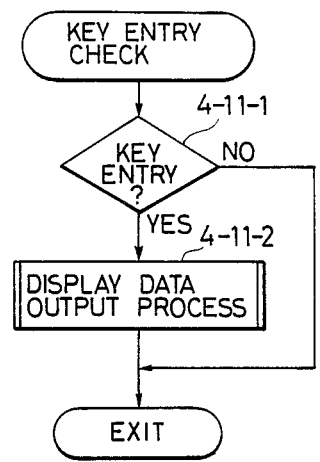

Data to be transmitted via the serial data communication line are shown in FIG. 10 (a) through (c) and FIG. 11 (a) through (c). FIG. 10 (a) shows transfer data (SM0 through SM7) of 8 bits ($b_0$–$b_7$) to be serial transferred from the slave CPU (Q102) to the main CPU (Q101), the upper 3 bits ($b_5$ through $b_7$) indicate the type of data (these upper 3 bits are called a command), and the lower 5 bits ($b_0$–$b_4$) indicate typically device status. Further, the contents of the lower 4 bits ($b_0$–$b_3$) in the cases of SM0 and SM1 are shown in FIGURE (b) and (c). These lower 4 bits contain a command for the main CPU.

FIGS. 11 (a) and (b) shows the structure of the 8-bit data ($b_0$–$b_7$) to be serial transferred from the master CPU (Q101) to the slave CPU (Q102). As shown, 16 difference data (MS0 - MSF) are transferred from the master CPU to the slave CPU. The upper four ($b_4$–$b_7$) of the eight bits ($b_0$–$b_7$) indicate the type of data (these upper 4 bits are called a command), and the lower 4 bits ($b_0$–$b_3$) indicate typically device status, mode, and command.

FIG. 11 (c) shows the contents of the lower 4 bits ($b_0$–$b_3$) in the transfer data MS2.

FIG. 7-1 shows the operation unit key matrix connection and the main body service man's adjusting switch matrix connection. "0" to "9" are numeric keys 102 of FIG. 3, and 103 to 115 correspond to respective keys of FIG. 3. The right side of FIG. 7-1 the key matrix for the microswitch at the sensor of each unit and serviceman's selection switches (DMS0—DMS3). EX2P40 to EX2P63 are selection signals to be outputted from the main CPU (Q101). PD0 to PD3 are digit signals to be outputted from the main CPU (Q101), and are sequentially output from PD0 at 2 msec intervals. The output timing is shown in FIG. 7-2. These digit signals are also used for the dynamic display of the eraser LED array (blank exposure) of the drum surface. The circuit diagram is shown in FIG. 7-3 (a). In FIG. 7-3 (a), L1 - L28 - L32... are LED elements. Blank exposure by the LED array is performed by lighting all LED array between sheets under copying or during idling. When the outside of image area or margin is sharp cut (sharp-cut is a process performed to eliminate unwanted electric charge part outside the image area occurring on the drum) according to the sheet size and scale factor, the LED array is partially lit.

For performing the sharp-cut, LED L1 to L28 are lit according to the sheet size by dynamic lamp on. FIG. 7-3 (b) shows the positional relation between the eraser LEDs and the drum. The LED array is in the 7-segment unit, and is controlled by a single line digit signal. In this example, LED array L1 to L28 is controlled using aforementioned digit signals PD0 to PD3. This LED array is selected and displayed by a combination of a selection signal PF0–PF6 to be output from the main CPU (Q101) and a digit signal PD0-PD3. FIG. 7-4 shows the number of LEDs which light in the LED array according to the scale factor at the time of A4 traverse feed sheet size. That is, in the case of 100% (real size), only LED 1 is lit, and subsequently one LED is lit each time 2% is reduced. In the figure, an example corresponding to 46% is shown.

Now, copy operation will be described. The drum clock (238) generated by the running drum synchronized with the main motor provides the reference of operation. The slave CPU (Q102) counts this drum clock, and uses it for the later-mentioned various sequence controls. The slave CPU (Q102) also counts the encoder pulse (239) generated by the optical system motor, and uses it for the optical system position control.

For driving the main motor, the main motor is started being driven at a low speed for both high speed and intermediate speed, and then is switched to a given speed. This is for protecting the thermister attached to the fixer roller, that is, for shock prevention.

Now, the control of embodiment will be described with reference to flowcharts shown in FIGS. 2-1 to 12-9, and FIGS. 13-1 to 13-44, FIGS. 12-1 to 12-9 are control flowcharts to be executed by the main CPU, while FIGS. 13-1 to 13-44 are control flowcharts to be executed by the slave CPU.

Figures 4, 5, 6, 7, 8, 9, 10, 11, 12:
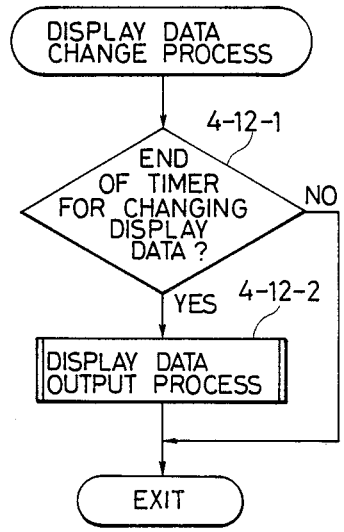
Figures 1, 5:
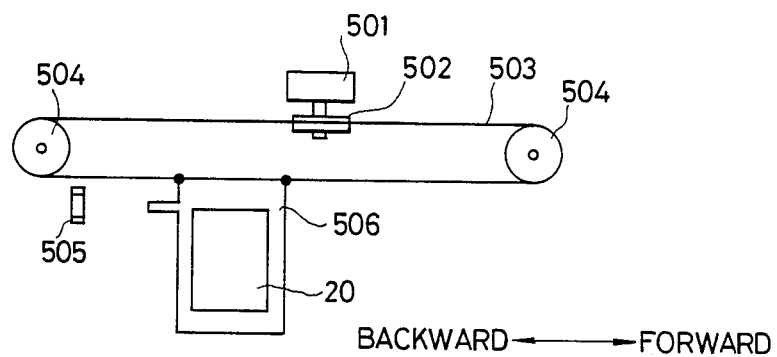
Figures 2, 5:
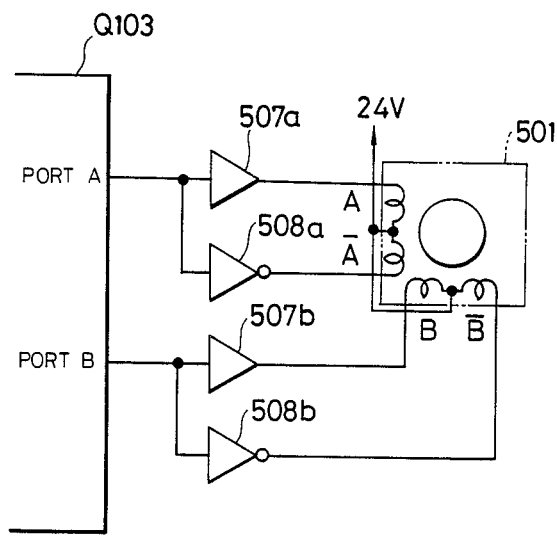
Figures 3A, 5:
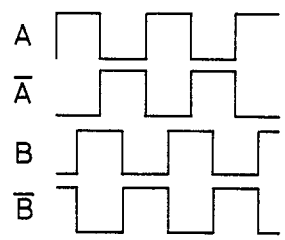
Figures 3B, 5:
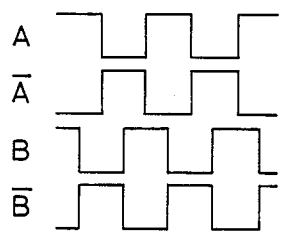
Figures 3C, 5:
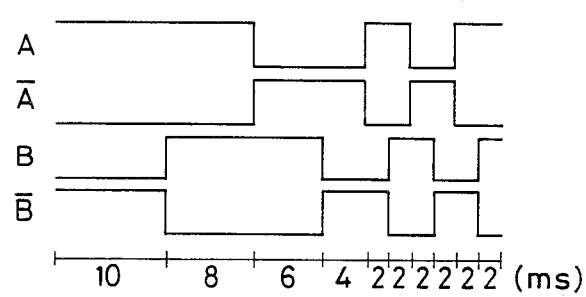

As shown in FIG. 12-1, the main CPU (Q101) resets RAM and I/O ports (Q103-Q106) in steps 1201 to 1203 at power ON or reset time, performs initial process for starting an internal timer, then inputs data typically from the input port (step 1204), then perform key input process (step 1205), and then performs zoom lens transfer shown in FIG. 12-7. The detail of this zoom lens transfer will be described later with reference to FIG. 5-4. In step 1207, intermediate tray transfer process shown in FIG. 12-8 is performed. The detail of this process will be described later with reference to FIG. 6-2. Subsequently, display process at the display unit is performed (step 1208), and the monitor program process shown in FIG. 12-4 is performed (step 1209). Normally steps from 1204 to 1209 are looped, and required processes are performed sequentially. In addition, there is a timer interruption process at every 2 msec by the internal timer shown in FIG. 12-2. In this interruption process, time control (step 1213) is performed typically.

When a serial data is received from other CPU, the serial receive interruption is generated as shown in FIG. 12-3, and the received data is stored in step 1215.

In the monitor program of FIG. 12-4, the status of each part of the copying machine is sequentially checked as shown.

FIG. 12-5 shows the detail of the sequence check of step 1217 of FIG. 12-4. In this sequence check, the status is "0" initially, as the process is completed, the status value is changed, and corresponding process is performed. Before the power of the copying machine is switched on, the status is "0", power on wait process of step 1232 is performed, when all powers are switched on, the status becomes "1", the fixer heater is actuated (step 1234), temperature regulation process is started, and then the status is caused to become "2".

Then, the step proceeds to 1236 where the fixing unit 170° C. wait process is performed. The detail is shown in FIG. 12-6. When the fixing unit temperature is below 170° C. (step 1245N), the latest fixing unit temperature is displayed for a fixed period as shown in FIG. 4-9 (1) at the display unit (step 1247). Then, when the fixing unit temperature rises to 170° C. or more (step 1245), the display of the display unit is changed from the fixing unit temperature to copy scale factor display, and the status is changed to "3" (step 1246). When the status becomes "3", the pressing of the copy key is waited (step 1238), when the copy key is pressed, the status is caused to become "4" in the case of one side copy, one side copy process is performed (step 1240), in the case of double side copy the status is caused to become "5", the first side copy process is performed (step 1242), then the status is brought to "6", the second side copy process is performed (step 1244), then the status is brought to "3", and the copy key wait process is performed again.

Now, the control of the slave CPU (Q102) will be outlined. As shown in FIG. 13 (A), the slave CPU (Q102) initializes the RAM and the I/O ports similar to the main CPU (Q101) (steps 1301 and 1302), resets the internal timer (step 1303), then performs port input and inputs the status of control portion (step 1305), then performs optical system return control (step 1306) and switch back control (step 1307) as required, performs sequence control (step 1309) after power check (step 1308), and step 1305 to 1309 are looped.

In addition, there are processes of FIGS. 13-2 to 13-6.

FIG. 13-2 is a flowchart of internal timer interruption occurring once every 2 msec, and the process is utilized for time control. The process of FIG. 13-3 occurs when a serial data is received from the aforementioned main CPU (Q101), the content of the receiving register having the data received from the main CPU (Q101) is loaded (step 1314), the data received in the area corresponding to the command is stored (step 1315), an answer corresponding to the status of the slave CPU (Q102) is stored in the receive register (step 1317), and the data is sent (step 1318). FIG. 13-4 is a flowchart of interruption occurring when the optical system for scanning the original is driven. Its explanation will be given later. FIG. 13-5 is a flowchart of interruption by the drum clock (238) generated by the drum which runs synchronized with the main motor, and the drum counter providing the basis of copy operation is incremented by "1" (step 1341). The drum count table to be used for the copy operation is searched (step 1342), the counter in the required table is counted up (step 1343), the corresponding process is performed (step 1345) when the count specified by the table has been completed (step 1344), and the drum clock interrupt process is directly terminated when the count is not completed. FIG. 13-6 is a flowchart of optical system clock interrupt process. This process is started by an encoder pulse (239) generated by the encoder which is driven interlocked with the rotation of the optical system motor. The process will be described later.

Interrupt process has been described as above.

The sequence control (step 1309) of FIG. 13-1 is for performing various controls according to the status values sequentially from the power on time similar to the main CPU (Q101). As shown in FIG. 13 (G), there are 8 sequences from STS0 process of step 1371 to STS7 of step 1378 according to the values of the upper 4 bits of the status 8 bits.

The control will now be described according to the status.

(1) Power on time operation

Description will be made with reference to the initial operation timing chart at power on time of FIG. 14-1.

Initial condition is set at status "0", and step proceeds to 1371. In step 1371, the status is "0" until power on as shown in FIG. 13-8. When the main switch is turned on (power on), the fixer heater becomes on, making the status "10". As the status becomes "10", the step proceeds to 1372, as shown in FIG. 13-9 the step is divided to 1380 through 1382 corresponding to the lower 4 bits of the status, and the processes shown in FIGS. 13-10 and 13-11 are executed.

When the status is "10", the step proceeds to 1380, and step 1391 waits until the fixing unit thermister 210 becomes 170° C. The main CPU also performs 170° C. wait process as shown in FIG. 12-6. Thereafter, when the fixing unit thermister 210 becomes 170° C., the main motor is caused to run at a low speed (step 1392), the development bias is caused to become on (step 1393), all LEDs of the drum surface eraser LED array are lit (step 1394), and the status is brought to "11". When the status becomes "11", the step proceeds to 1381, and time is spent to wait until the drum clock becomes 50 pulses as shown in FIG. 13-11, and the status is brought to "12" when the drum clock becomes 50 pulses. This is for making the fixing unit temperature uniform. When the status becomes "12", the operation proceeds to step 1382, and the time is spent to wait until the fixer temperature becomes 180° C.

When the fixer thermister 210 becomes 180° C. (step 1382-1), the main motor is stopped temporarily (step 1382-2), the optical system is returned to the home position (step 1382-3 and -4), and the status is brought to "20" (step 1382-5). When the status becomes "20", the operation proceeds to step 1373, and according to the values of the lower 4 bits the operation is divided to step 1401 to step 1406. Here, the lower 4 bits are "0", and the operation proceeds to step 1401 shown in FIG. 13-13. In step 1401-1 the main motor is switched to the high speed rotation, and then in step 1401-3 the charger is actuated, and the control rotation for measuring the drum surface potential is started. In step 1401-4, the fixing unit heater is switched off for preventing the fixing unit temperature from rising to 180° C. (thereafter the fixing unit temperature is regulated to 180° C.). Then, in step 1401-5 the status is brought to "21", and the step 1401 process ends.

Figures 13, 14, 15, 16, 17, 18:
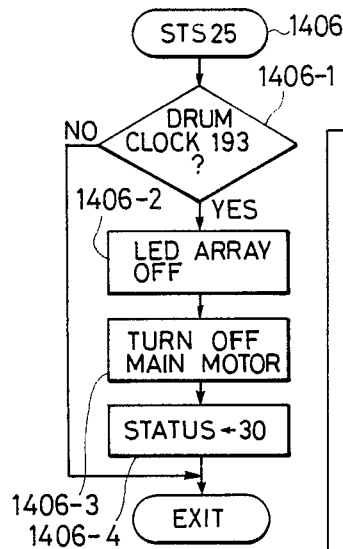
Figures 13, 14, 15, 16, 17, 18, 19:
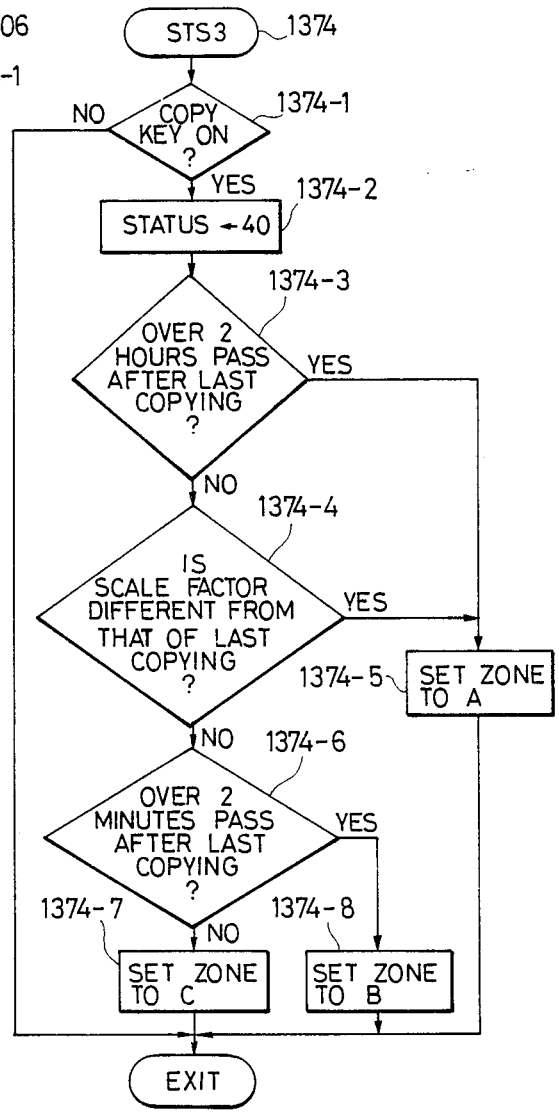
Figures 13, 14, 15, 16, 17, 18, 19, 20:
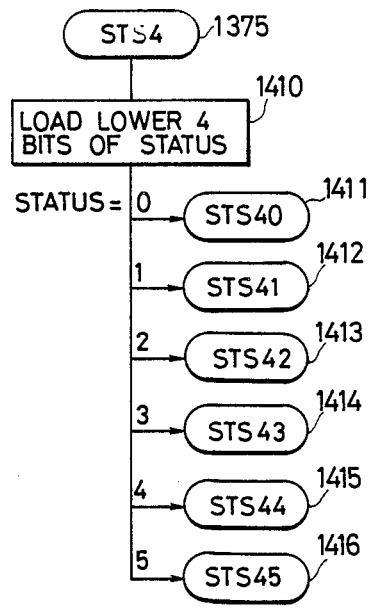
Figures 13, 14, 15, 16, 17, 18, 19, 20, 21:
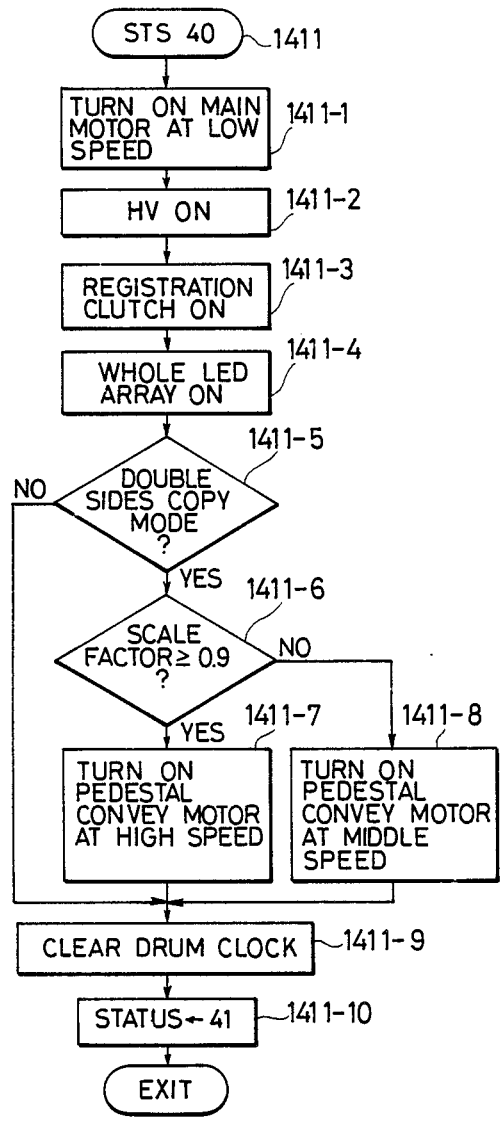
Figures 13, 14, 15, 16, 17, 18, 19, 20, 21, 22:
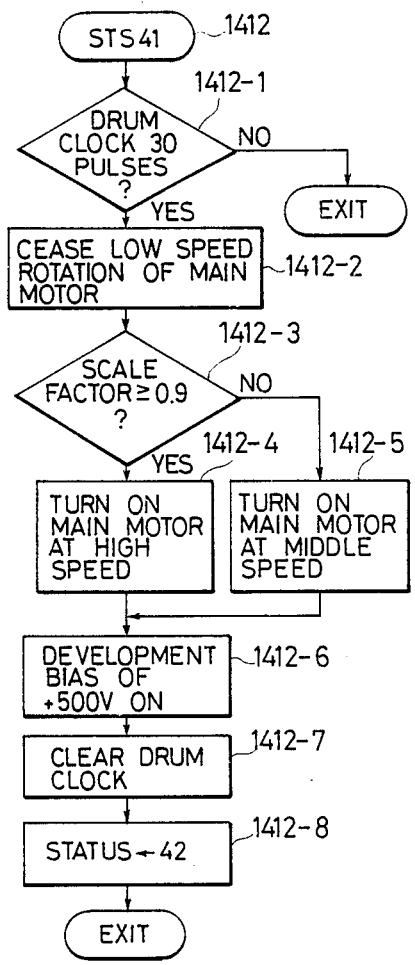
Figures 13, 14, 15, 16, 17, 18, 19, 20, 21, 22, 23:
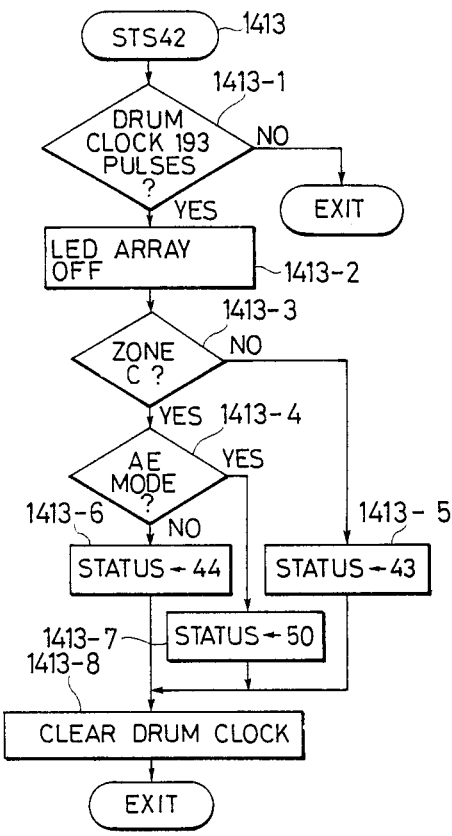
Figures 13, 14, 15, 16, 17, 18, 19, 20, 21, 22, 23, 24, 25, 26, 27, 28, 29, 30, 31:
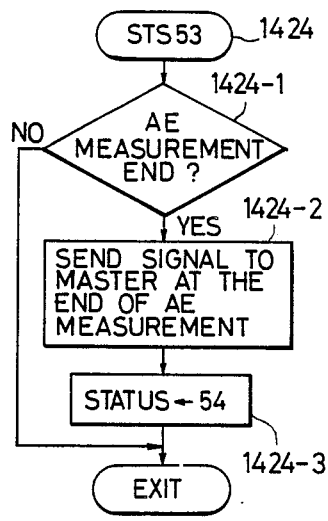
Figures 13, 14, 15, 16, 17, 18, 19, 20, 21, 22, 23, 24, 25, 26, 27, 28, 29, 30, 31, 32, 33:
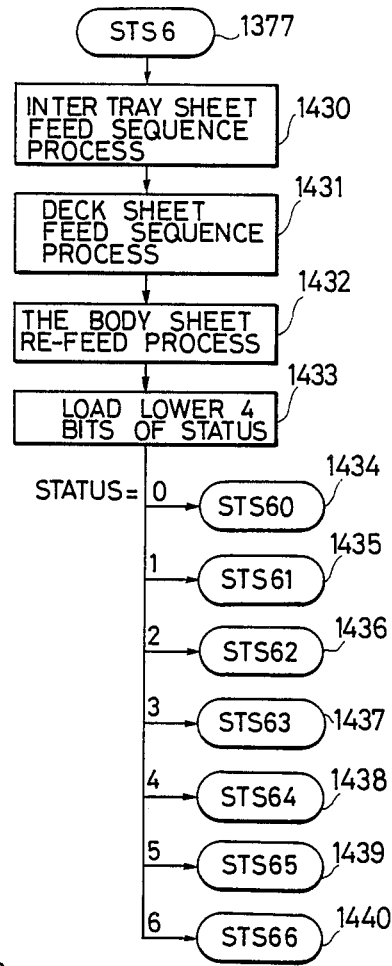
Figures 13, 14, 15, 16, 17, 18, 19, 20, 21, 22, 23, 24, 25, 26, 27, 28, 29, 30, 31, 32:
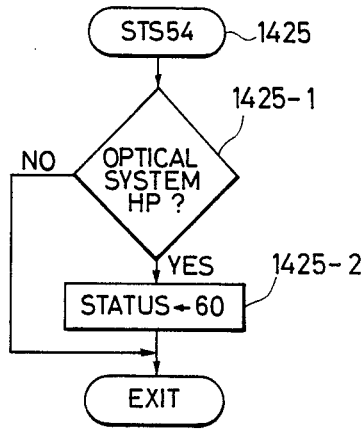
Figures 13, 14, 15, 16, 17, 18, 19, 20, 21, 22, 23, 24, 25, 26, 27, 28, 29, 30, 31, 32, 33, 34, 35, 36:
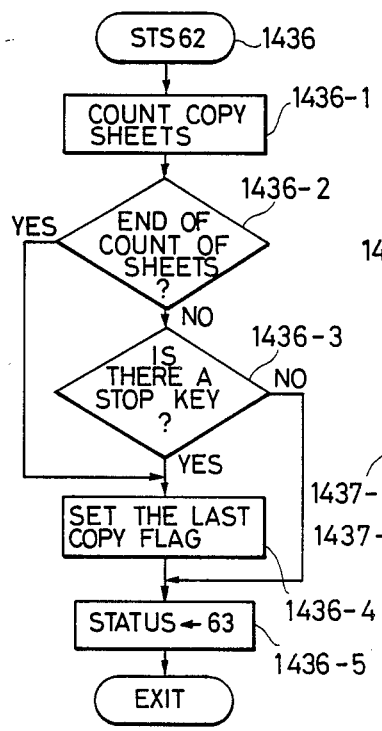
Figures 13, 14, 15, 16, 17, 18, 19, 20, 21, 22, 23, 24, 25, 26, 27, 28, 29, 30, 31, 32, 33, 34, 35, 36, 37:
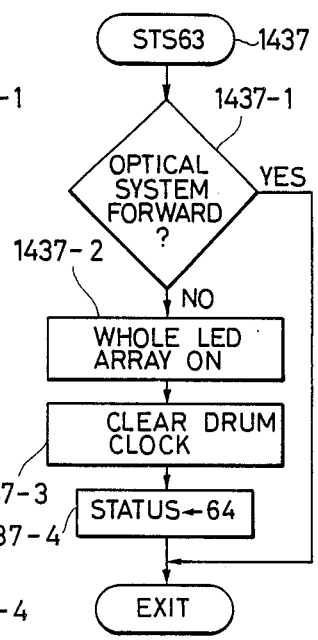
Figures 1, 14:
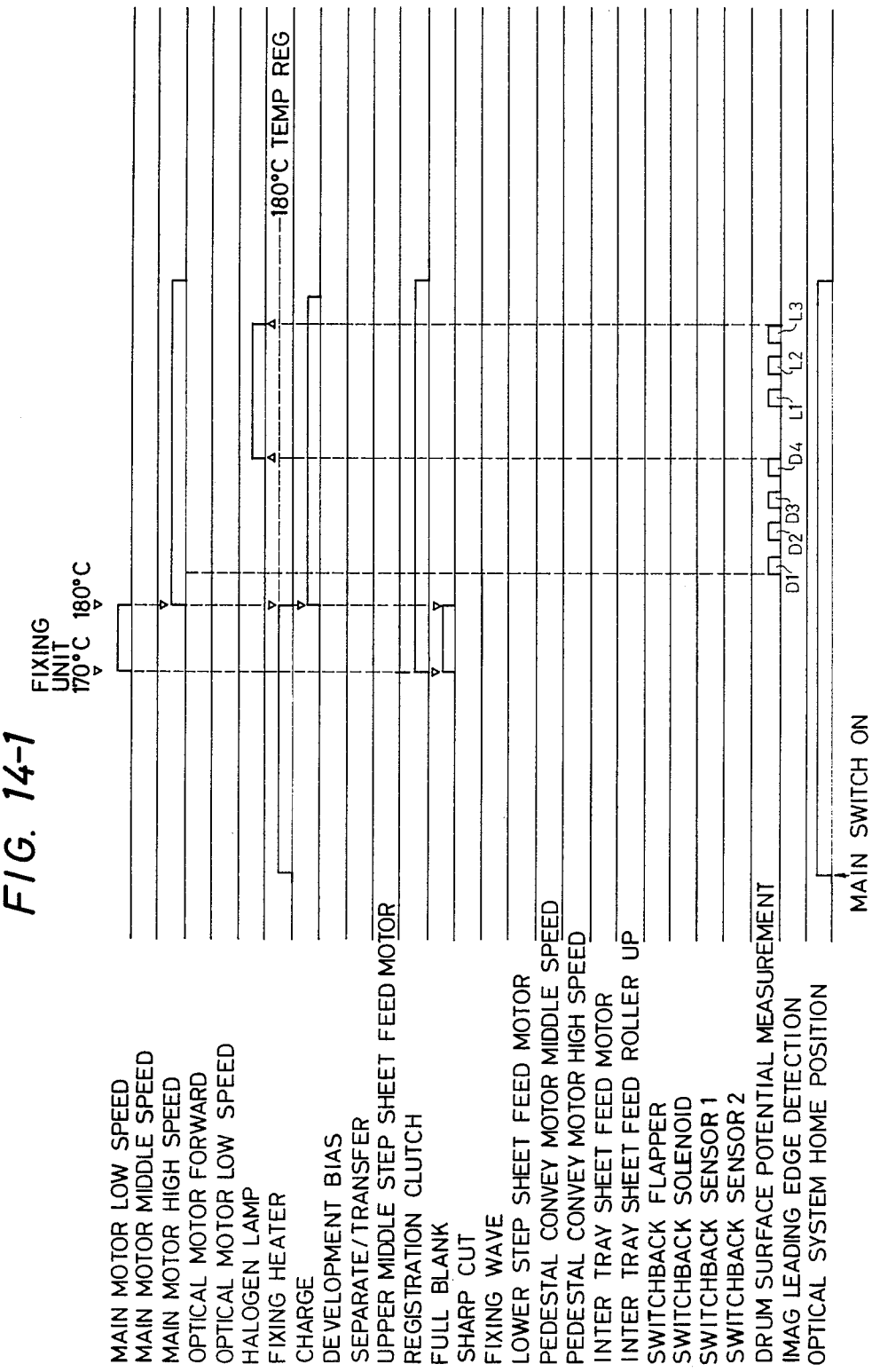
Figures 3, 14:
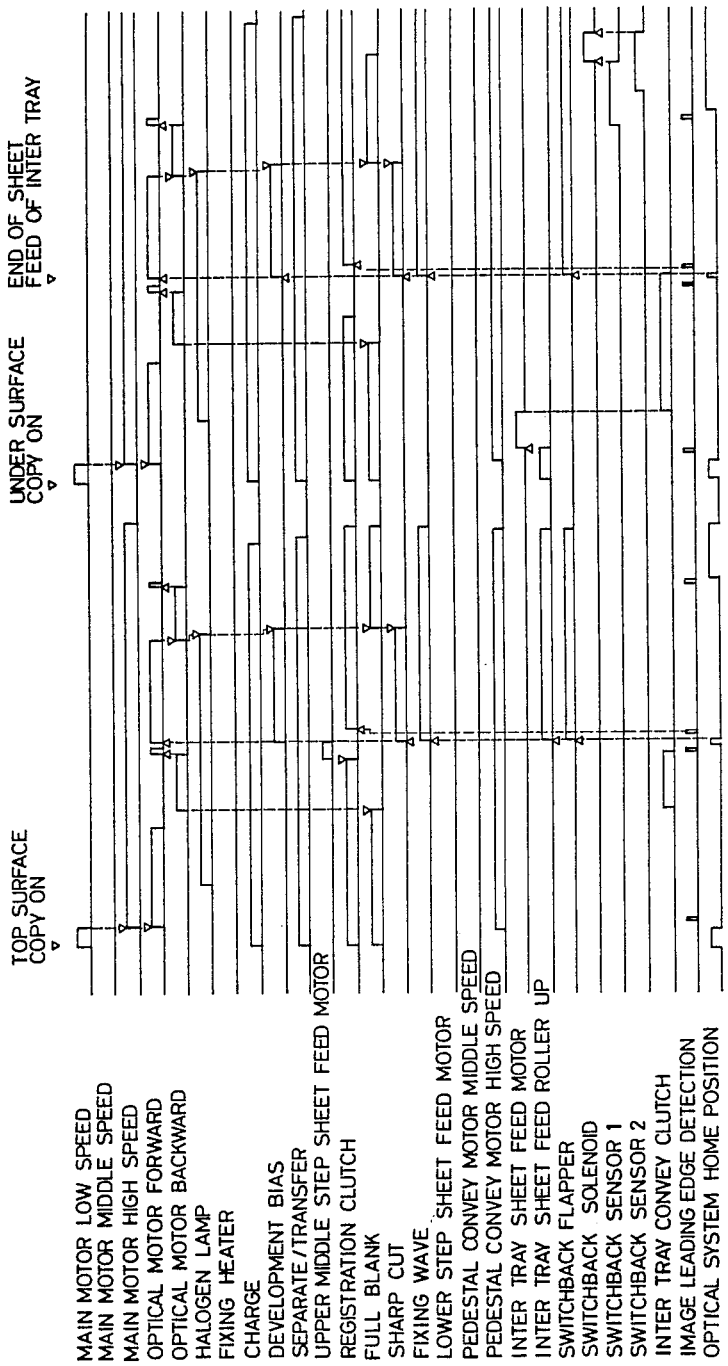
Figures 4, 14:
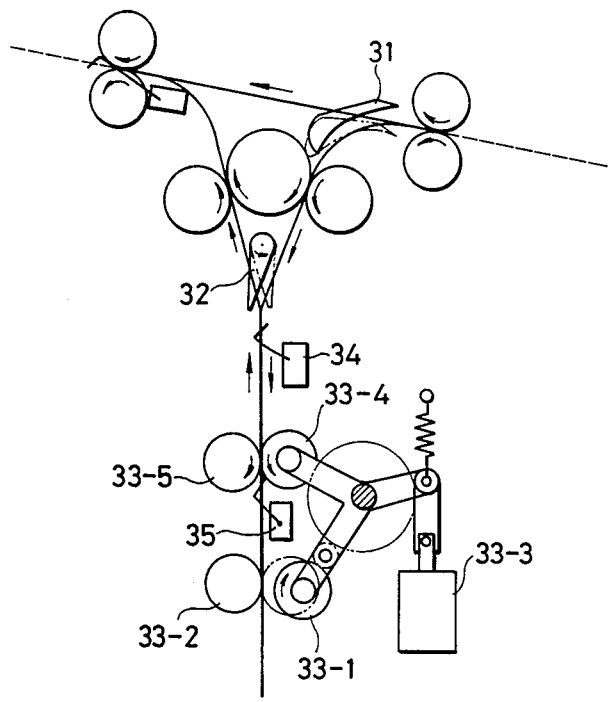
Figures 1, 15:
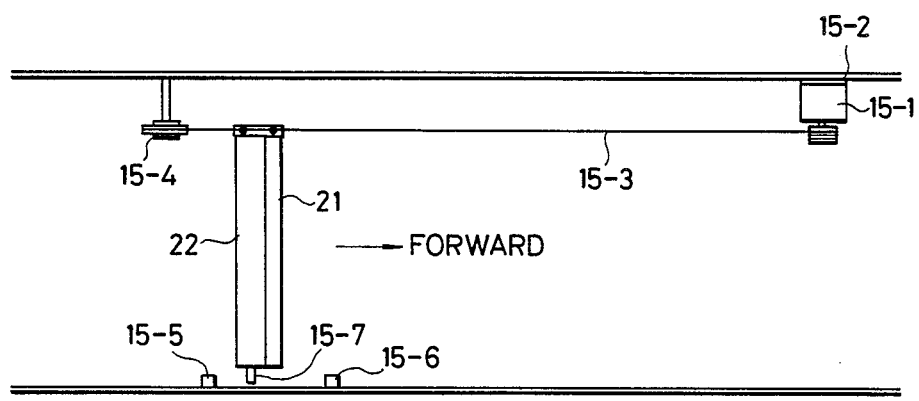
Figures 6, 13:
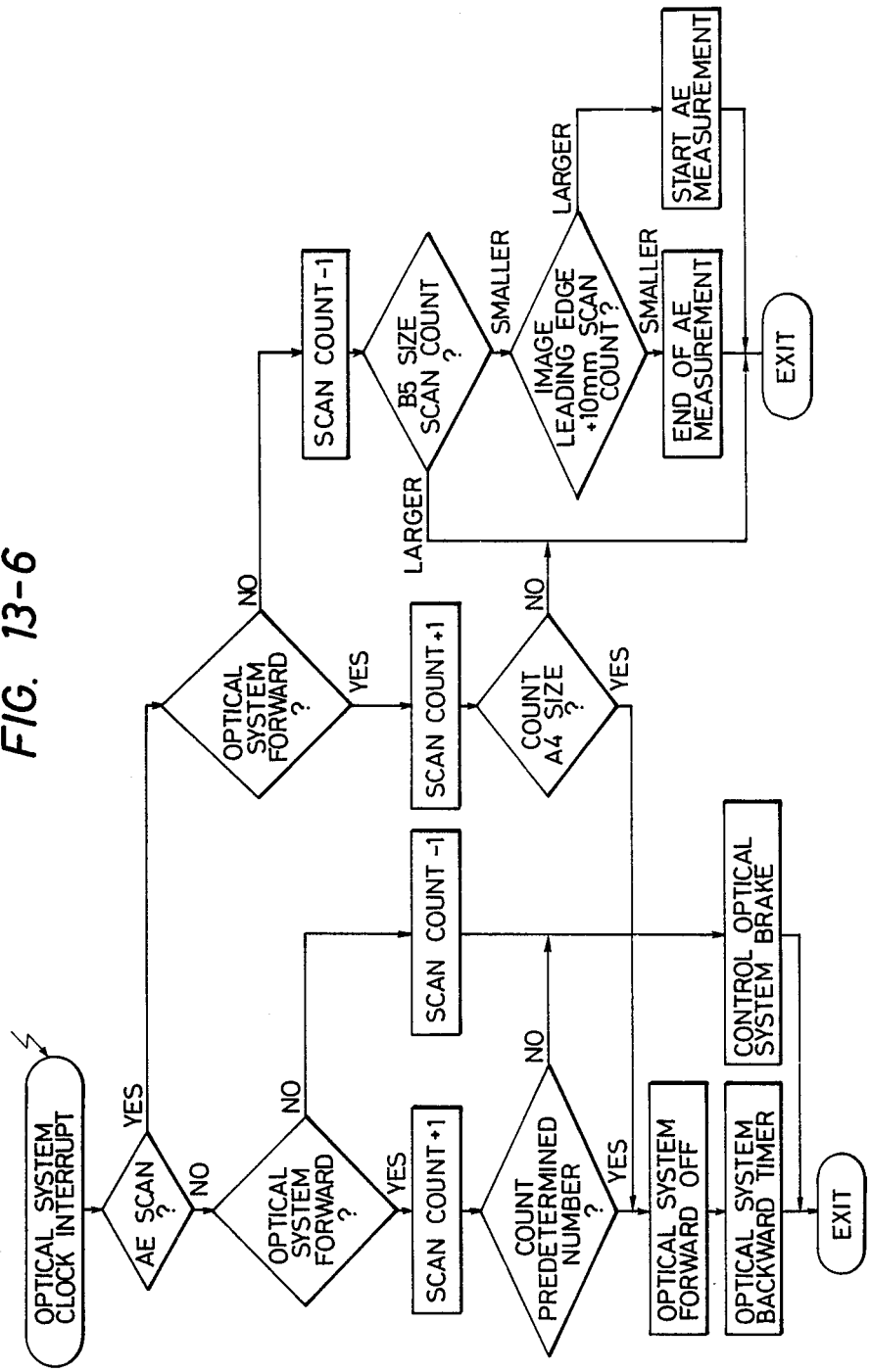
Figures 8, 13:
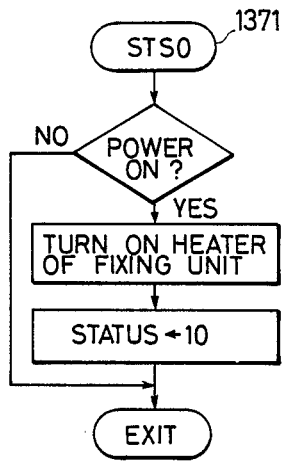
Figures 9, 13:
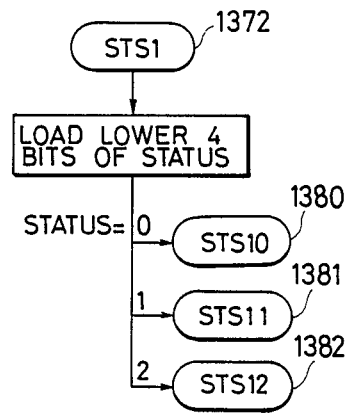
Figures 10, 13:
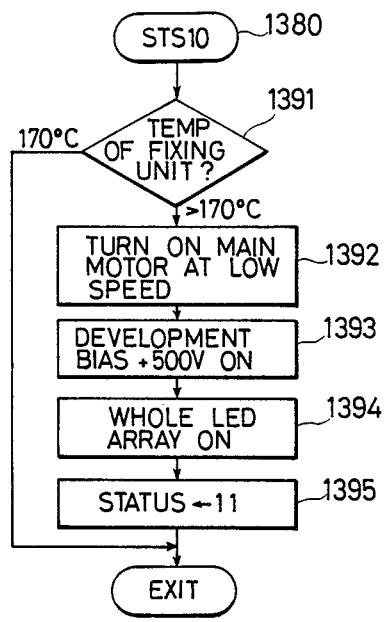
Figures 4, 15:
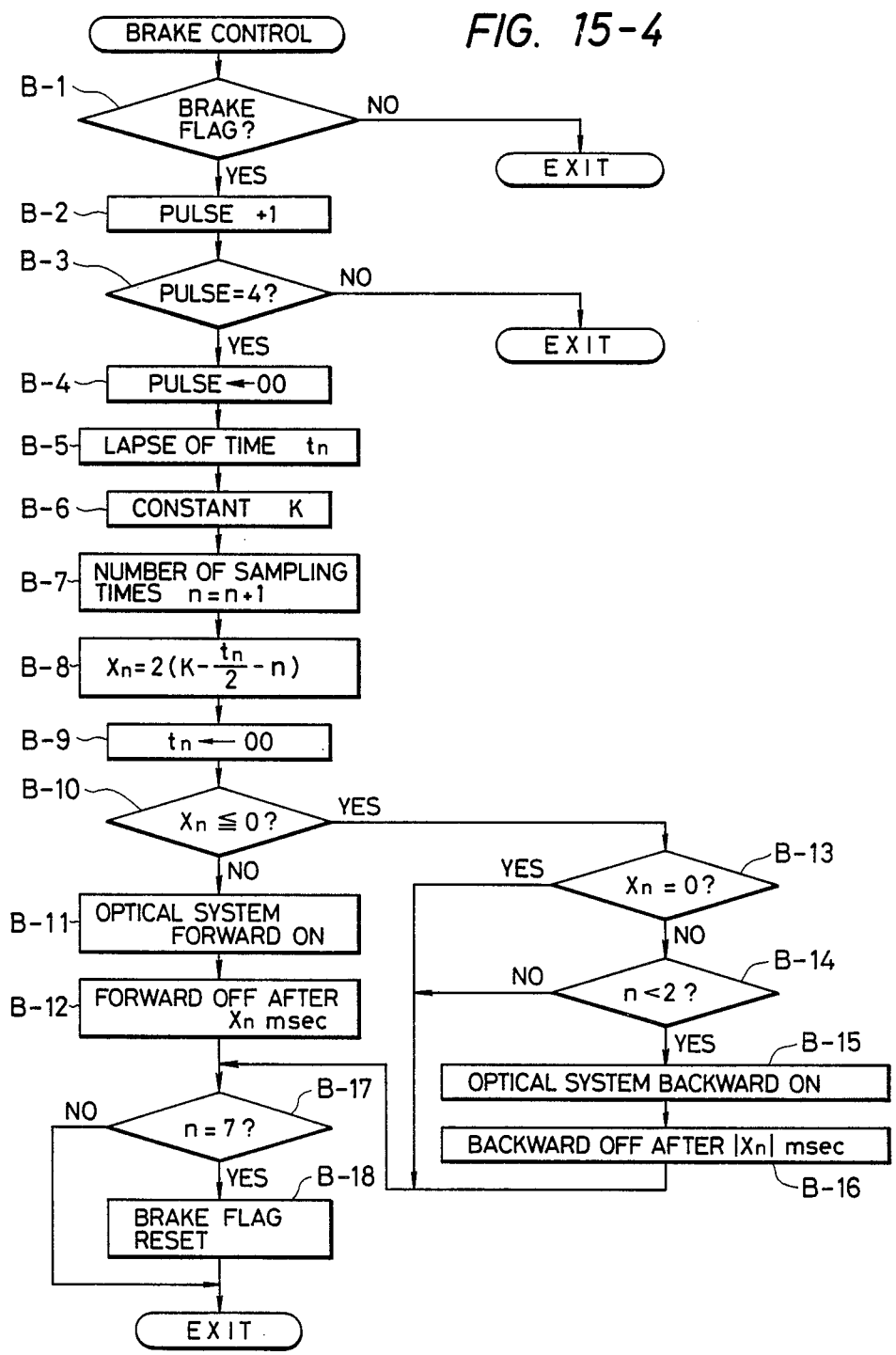
Figures 1, 5, 15, 16:
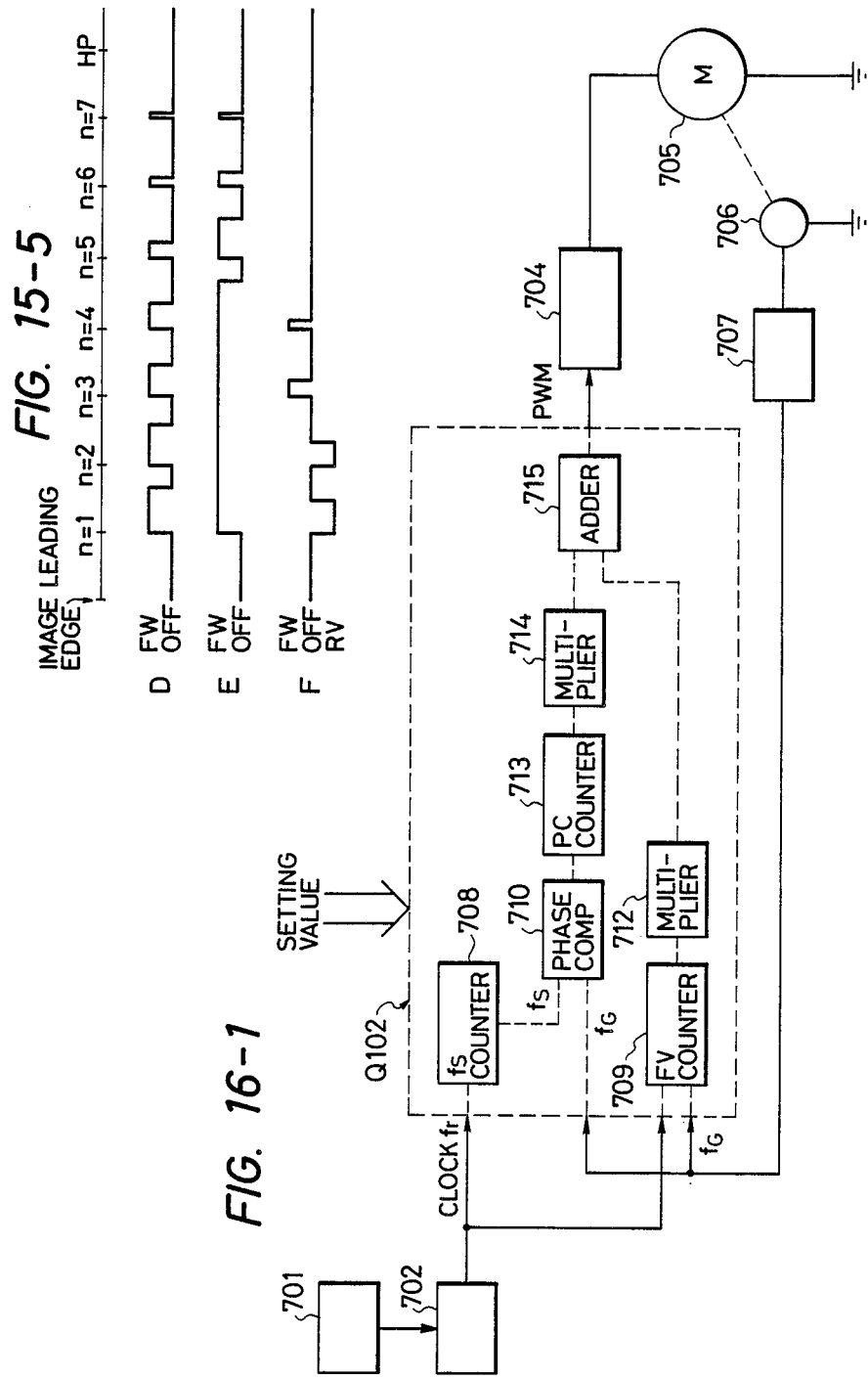
Figures 2, 16:
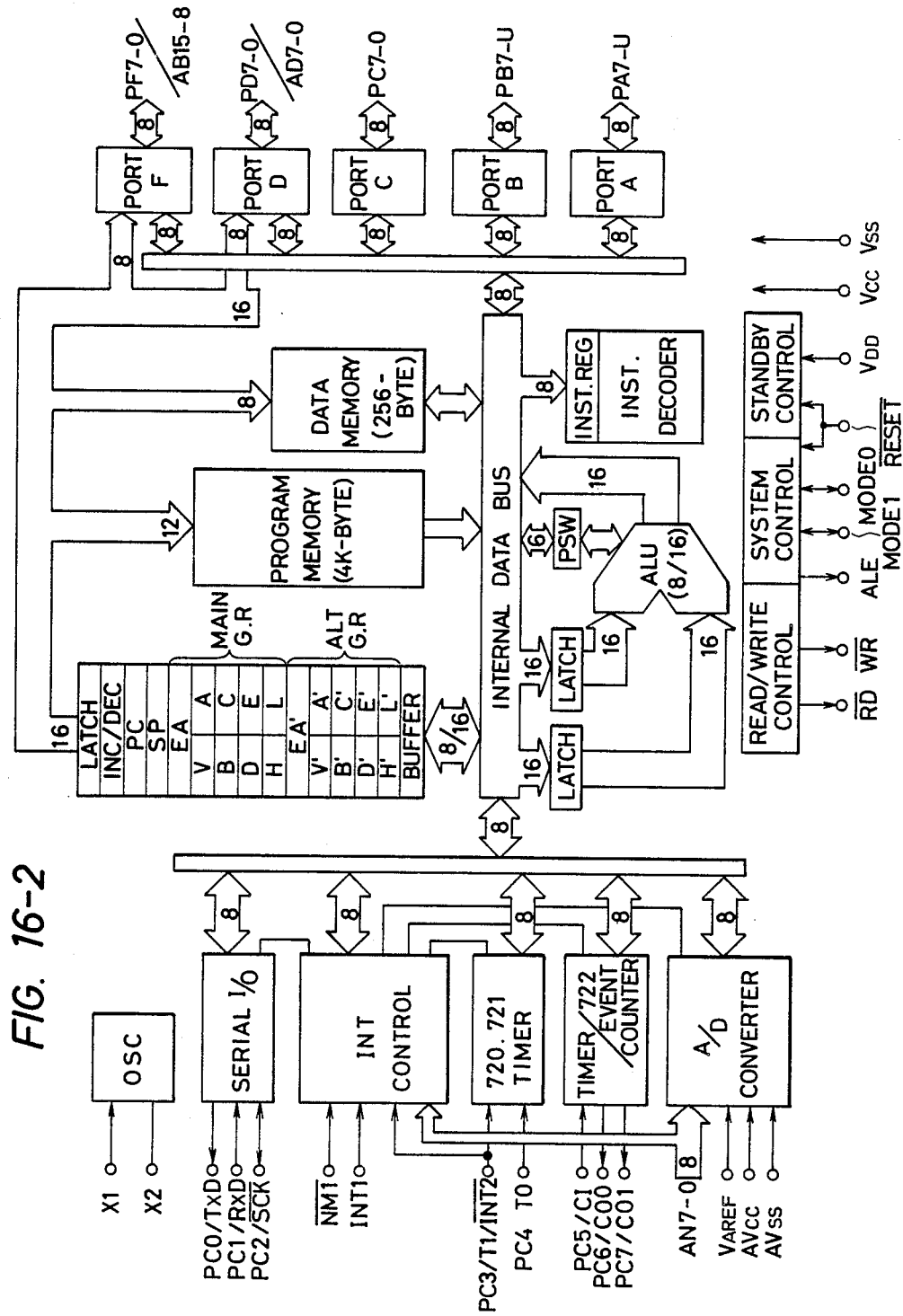
Figures 3D, 16:
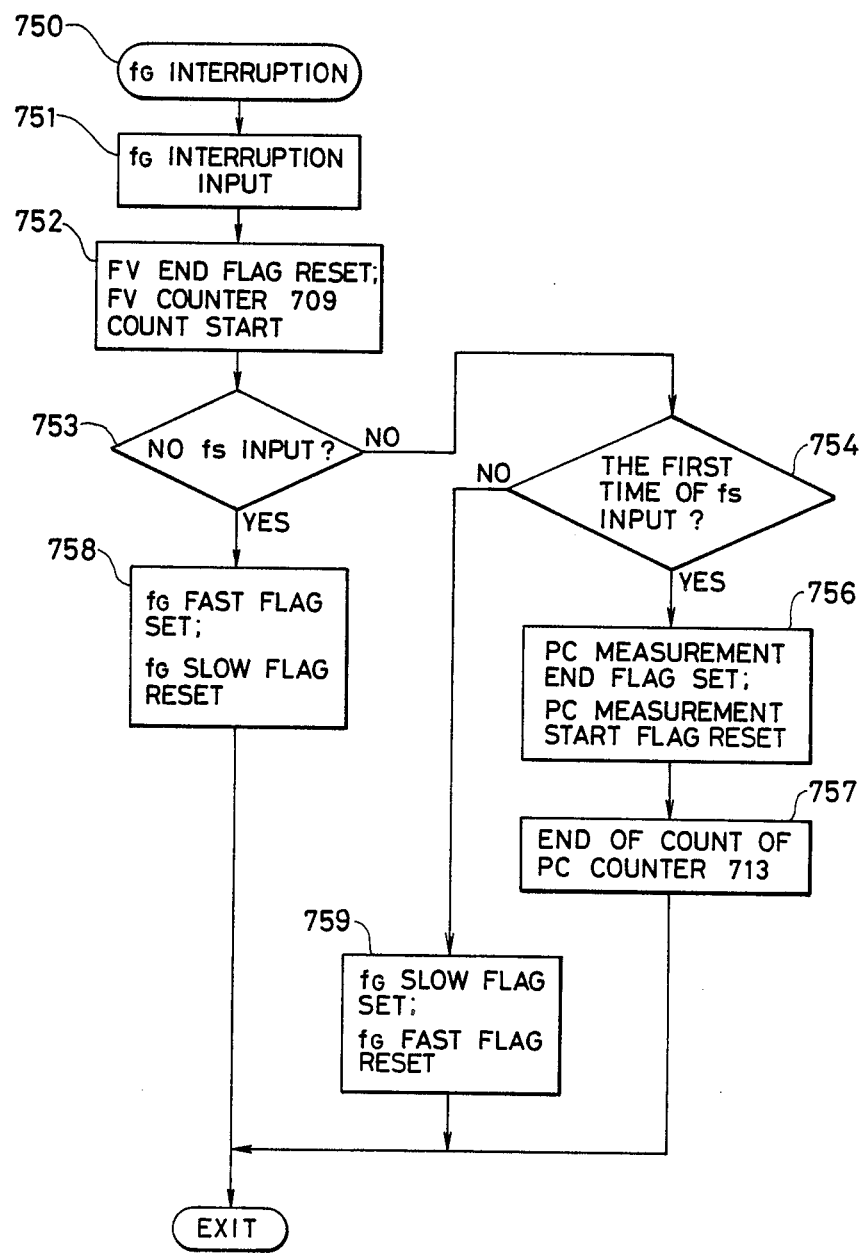

When the status becomes "21", the operation proceeds to step 1402 shown in FIG. 13-14. As a first step of the control rotation, when the drum clock becomes 193 (step 1402-1), an instruction is given to the main CPU (Q101) to cause the potential sensor located in close proximity of the drum surface to read the potential of the dark portion of the drum surface. The main CPU measures the value fetched to the A/D input through the drum surface potential driver 208, feedbacks the result to the current value of the charger 203, and controls so that the potential of the dark portion of the drum surface becomes a desired potential (step 1402-2). D1 to D4 of FIG. 14-1 show the measurement timing, and the measurement is made 4 times in all. Then, the drum clock is cleared, and the status is brought to "22" (step 1402-3 and -4).

When the status becomes "22", the operation proceeds to step 1403 shown in FIG. 13 (O), here when the lens is not shifting (step 1403-1), the halogen lamp 21 is lit, the white plate at the end of the original platen is illumined when the optical system is in the home position (step 1403-2), the drum clock is cleared (step 1403-3), and the status is brought to "23" (step 1403-4). Now, the process of step 1403 is completed.

When the status becomes "23", the operation proceeds to step 1404 shown in FIG. 13-16, and in step 1404-1 whether or not the drum clock reached 115 is judged. When the drum clock reached 115, the potential of the light portion of the drum surface is measured with the aforementioned potential sensor, and an instruction is given to all main CPUs. The main CPU feedbacks the lamp on voltage of the halogen lamp 21 through the halogen voltage control driver 204, and controls so that the potential of the light portion of the drum surface becomes a desired potential. L1 through L3 of FIG. 14-1 show the measurement timing, and the measurement is performed thrice in all (step 1404-2). When the measurement has been done, the drum clock is cleared (step 1404-3), and the status is brought to "24". Now, the process of step 1404 is completed.

When the status becomes "24", the operation proceeds to step 1405 shown in FIG. 13-17, when the drum clock is counted 96, the registration clutch is switched off, the charger is also switched off, and the halogen lamp is switched off (step 1405-1 to -4). After the drum clock is cleared, the status is brought to "25", and the process is terminated (step 1405-5 and -6).

When the status becomes "25", the operation proceeds to step 1406, time is spent to wait the drum clock becoming 193 (step 1406-1), the LED array and the main motor are stopped, and the status is brought to "30".

Status "0" to status "25" is a self check sequence from power on to copy ready condition. The condition of status 30 is copy key press wait. When the copy key is pressed, the status is brought to "40", and when the time elapsed 2 hours or more from the previous copy or when copy size factor varies, zone A is set (step 1374-3 to -5). When the time elapsed within 2 hours and 2 minutes or more from the previous copy, zone C is set. Zones A, B, and C correspond to the times of measurement of the surface potential. In zone A, the potential of light portion is measured thrice, and the potential of dark portion is measured four times. In zone B, the potential of light portion is measured once, and the potential of dark portion is measured twice. In zone C, the potential of light portion is measured once.

(2) Copy pre-process operation

FIG. 14-2 shows a copy pre-process operation timing chart.

When the copy key 106 is pressed, the status becomes "40", and the operation proceeds to step 1375 shown in FIG. 13-20. Here, the lower 4 bits of the status are examined, and according to the value of the lower 4 bits the operation is divided to step 1411 to step 1416.

Since the status is "40" and the lower 4 bits are "0", the operation proceeds to step 1411, the main motor is caused to run at a low speed, high voltage output (233) is caused to become on, the registration clutch is switched on, and all LEDs of the LED array are lit (step 1411-1 to -4). Then, in step 1411-5 and step 1411-6, when the mode is the double side mode, and the scale factor is judged 90% or more, the main motor is switched to high speed run. When in step 1411-6 the scale factor is judged not 90% or more, the main motor is switched to the intermediate speed rotation in step 1411-8. Then, the drum clock is cleared, drum count is made ready, the status is brought to "41", and the process is terminated (steps 1411-9 and -10).

When the status becomes "41", the value of the lower 4 bits becomes "1", and the operation proceeds to step 1412 shown in FIG. 13-21. Here, after the low speed main motor runs corresponding to 30 pulses, the main motor low speed rotation is switched off (steps 1412-1 and -2), subsequently when the scale factor is within the range from 90% to 144%, the main motor is caused to run at a high speed, and when the size factor is less than 90%, the main motor is caused to run at an intermediate speed (steps 1412-3 to -5). Then, development bias is caused to become on, the drum clock is cleared, the process is terminated, and the status is brought to "42" (steps 1412-6 to -8).

When the status becomes "42", the operation proceeds to step 1413 shown in FIG. 13-22. In step 1413, the main motor is run corresponding to 193 pulses, the LED array is turned off (steps 1413-1 and -2), when zone C is set in step 1374, the status is brought to "43" (steps 1413-3 and -5), when zone C is not set and in the AE mode, the status is brought to "50" (step 1413-7), when zone C is set and not in the AE mode, the status is brought to "44" (step 1413-6), the drum clock is cleared, and the process is terminated (step 1413-8). This is for changing the times of drum potential adjustment according to the copy interval from the previous copy, that is, the rest time.

When the above time interval is 2 minutes or more and zone is other than C, the status is "43", and the operation proceeds to step 1414 shown in FIG. 13-23. In step 1414, the main motor is caused to run corresponding to 69 pulses (step 1414), the drum surface potential is measured 4 times when the time interval from the previous copy is 2 hours or more, the same is measured twice when the time interval from the previous copy is within 2 hours, the status is set to "44", and the process is terminated.

When the time interval from the previous copy is within 2 minutes and after the completion of 1414 process, the status is "44", and the operation proceeds to step 1415 shown in FIG. 13-24. In step 1415, the halogen lamp 21 is lit (step 1415-1), the drum clock is cleared (step 1415-2), the status is set to "45" (step 1415-3), and the process is terminated. The halogen lamp is lit for the same purpose as step 1403 process.

When the status becomes "45", the operation proceeds to step 1416 shown in FIG. 13-25, the main motor is run corresponding to drum clock 115 pulses (step 1416-1), then the light portion potential of the drum surface is measured thrice when zone is A, the same is measured once when zone is other than A (step 1416-2 to -4), the status is set at "50" (step 1416-6) in the case of the AE mode and the operation proceeds to the AE mode process, and in the case of other than the AE mode, the status is set at "60" (step 1416-7), and the operation proceeds to the transfer sheet feed process.

In the AE mode, the status is set at "50", the operation proceeds to step 1376, and the operation is divided to step 1421 through step 1425 according to the value of the lower 4 bits of the status.

The AE mode is for adjusting the shading level automatically by measuring the shading level of the original. This mode assures fog-free clear copy. First, the process of step 1421 shown in FIG. 13-27 is executed with the status set at "50", the optical system is moved forward, and the status is set at "51". This is due to the necessity of performing idle scan of the optical system before copying for measuring the shading level of the original.

When the status becomes "51", the operation proceeds to step 1422 shown in FIG. 13 (c), the halogen lamp is turned on when the optical system has moved forward to the ½ position of the A4 size (steps 1422-1 and 1422-2), the status is brought to "52" (step 1422-3), and the process is terminated.

When the status becomes "52", the operation proceeds to step 1423 shown in FIG. 13-29, when the AE measurement is started, a signal requesting AE measurement is sent to the main CPU (Q101), the optical system is moved backward though not shown, the status is brought to "53", and the process is terminated.

Upon receiving the request from the slave CPU (Q102), the main CPU (Q101) performs the AE measurement jointly. The measuring sensor may be the photosensor disposed on the optical path of the sensor for measuring the surface potential on the photosensitive drum surface. In FIG. 14-2, the AE measurement is also performed during the backward travel of the optical system, this is for shortening the time required for copying the first sheet as much as possible by making the halogen lamp completely on state during the forward travel of the optical system, and performing the AE measurement during its backward travel. With this machine, it may be adapted to perform AE measurement during the forward travel of the optical system by being so switched (not shown) by a serviceman.

The result of the AE measurement is feedbacked to the halogen lamp 21, and the halogen lamp on voltage is controlled by the main CPU (Q101).

When the status becomes "53", the operation proceeds to step 1424 shown in FIG. 13 (e) in step 1424-1, and time is spent waiting completion of the above AE measurement. When the AE measurement is completed, the fact is spent to the master [main CPU (Q101)], and the status is brought to "54".

When the status becomes "54", the operation proceeds to step 1425 shown in FIG. 13-31, the status is brought to "60" after the optical system has returned to the home position, and the process is terminated.

Thereafter the scan for copy is performed. At this time, for the optical system to move forward, the sheet feed end flag is verified, and the scan is started. The sheet feed end flag will be described later.

(3) One side copy mode process

When copy pre-process is completed, the status becomes "60", and the operation proceeds to step 1377 shown in FIG. 13-32. Here, firstly the intermediate tray sheet feed sequence process is performed (step 1430), and then the deck sheet feed sequence process is performed in step 1431. The intermediate tray sheet feed sequence process is a sequence process for storing copy sheet to the intermediate tray 47 in case of front side copy in the double side copy mode. The deck sheet feed sequence process is a sequence process for feeding copy sheets from the 2000 sheets deck 46 to the registration roller 10.

Then, the main body sheet re-feed process is performed (step 1432), and the operation is divided to the processes of step 1434 through step 1440 according to the value of the lower 4 bits of the status. The main body sheet re-feed process is a sequence process for re-feeding copy sheet from the intermediate tray 47 to the registration roller 10.

Step 1430 through step 1432 are steps provided to enable execution of the following copy operation before the copy sheet is completely discharged. That is, these steps are steps provided so that the sheet transfer control is performed in parallel with the process to be given by the lower 4 bits of the status at all times.

The status is initially "60", and the operation proceeds to step 1434 shown in FIG. 13-33. Here, in the case of the double side copy mode, the later-mentioned intermediate tray switch back process is performed (step 1434-3) after the transfer completion of the intermediate tray is confirmed (step 1434-2). In the case of the one side copy mode, the status is brought to "61", and nothing else is actually performed.

In the case of the one side copy, the status is immediately set at "61", and the operation proceeds to step 1435 shown in FIG. 13-34.

In step 1435, time is spent waiting the completion of sheet feed in the sheet feed sequence process of step 1431 (waiting the completion of the sheet feed flag setting) (step 1435-1). When the sheet feed has been completed, whether or not the optical system is in the home position is judged (step 1435-1). When the optical system is in the home position, the copy sequence is started, the development bias is caused to become on, the fixing unit is cleaned, the scan width over which the optical system is caused to scan is calculated using the copy scale factor, the LED array is turned off, the optical system scans corresponding to the original, and the image of the original is caused to form on the drum (step 1435-4 through step 1435-8). The status is set at "62", and the process is terminated (step 1435-9).

In step 1435, when the optical system is not in the home position, the optical system is moved backward to the hole position (step 1435-3).

In this machine, since the scan by the optical system is started after the completion of the sheet feed, even in the equipment wherein continuous copy scale factor is settable, the sequence control is simple. In addition, since the scan start control of the scan system, typically the optical system is performed, with the priority given to the feed of transfer sheet, it may be made a simple control even when a plurality of feed routes (paths) typically by the cassette, double side unit, and deck are provided, or when the route is long, and degradation of copy quality due to transfer timing error can be prevented.

When the status becomes "62", the operation proceeds to step 1436 shown in FIG. 13-35, copy sheet count is decremented by 1, the last copy flag is set at the time of the last copy or when the stop key is pressed (step 1436-2 through step 1436-4), and then the status is re-set at "63", and the process is terminated (step 1436-5).

When the status becomes "63", the operation proceeds to step 1437 shown in FIG. 13-36 (step 1437-1), when the scan is completed, the LED array is turned on to prevent image forming of unwanted portion, the drum clock is cleared, the status is brought to "64", and the process is terminated (step 1437-2 through step 1437-4).

When the status becomes "64", the operation proceeds to step 1438 shown in FIG. 13-37, the main motor is run corresponding to 10 drum clock pulses, then the halogen lamp is turned off, the status is brought to "65", and the process is terminated.

When the status becomes "65", the operation proceeds to step 1349 shown in FIG. 13-38. When in step 1349-1 the last copy flag set in step 1436 is set, the optical system is moved backward at a low speed, the status is changed to "70", and process is terminated (step 1439-2 and step 1439-3). When the copy is not the last copy, since the above control must be performed again, the halogen lamp is turned on again at the time when the optical system returned by ½ of A4 size (step 1439-4 and step 1439-5), and the status is changed to "66" so as to be ready for the next copy (step 1439-6).

When the status becomes "66", the operation proceeds to step 1440 shown in FIG. 13-39, time is spent waiting the return of the optical system to the home position, the status is set at "61" (step 1440-1) when the optical system returns to the home position (step 1440-1), and process is performed again from step 1435 shown in FIG. 13-34. When in step 1440-1 the optical system is not returned to the home position, whether or not the optical system is moving backward is judged (step 1440-3), and the optical system backward process is performed when the optical system is not moving backward (step 1440-4).

When the copy is made to the last sheet, the status becomes "70", and the operation proceeds to step 1378 shown in FIG. 13-40.

In step 1378, the operation is divided to processes from step 1451 to step 1453 according to the value of the lower 4 bits of the status.

Initially, the value of the lower 4 bits of the status is "0", and the operation proceeds to step 1451 shown in FIG. 13-41. In step 1451, the development bias is caused to become off when the main motor runs corresponding to 26 drum clock pulses (step 1451-1 and step 1451-2), then the drum clock is cleared, the status is set at "71", and the process is terminated (step 1451-3 and step 1451-4).

When the status becomes "71", the operation proceeds to step 1452 shown in FIG. 13-42, high voltage control is stopped after the main motor runs corresponding to 96 drum clock pulses (step 1452-1 and step 1452-2), the drum clock is cleared, then the status is set at "72", and the process is terminated (steps 1452-3 and 1552-4).

When the status becomes "72", the operation proceeds to step 1453, time is spent waiting the completion of the drum clock rotation corresponding to 193 drum clock pulses (step 1453-1), then when sheet discharge is not completed, time is spent waiting the completion of sheet discharge and the main motor is stopped, concurrently the pedestal transfer motor is stopped, the status is set at "30", and copy operation is terminated (step 1453-2 through step 1453-5).

The status "30" is the step 1374 process shown in FIG. 13-44, and time is spent waiting the pressing of the following copy key.

(4) Double side copy (AE) mode H) FIG. 14-3 shows its operation timing chart.

The front side copy is almost the same as the one side copy. However, since it is necessary that the copy sheet is not discharged from the main body 100 but is stored in the intermediate tray 47, in step 1434 shown in FIG. 13-33 the pedestal transfer motor 230 is started to drive the transfer belt 40B, and the intermediate tray sheet feed roller 41 is lifted by lifting the switch back flapper 31 of FIG. 14-4. Then, the status becomes "61", the operation proceeds to step 1435, and the process similar to the one side copy mode is performed.

In the rear side copy, the copy sheet is driven by the sheet feed stepping motor and sent from the intermediate tray 47 by the intermediate tray sheet feed roller 41, and is sent to the main body registration roller 10 by the actuation of the transfer clutch not shown. Now, as the sheet feed end flag is set, the optical system moves forward, and exposure operation is performed.

The copy process is the same as the one side copy except some difference in the sheet feed process.

When the sorter 400 is connected, the copied sheet is reversed at the switch back unit, and is discharged. In FIG. 14-4 which shows an enlarged view of the switch back unit, when the flapper 31 is lifted, the copy sheet flows down, then a switch back sensor 34 (switch back sensor 1) detects the front end of the copy sheet, when the switch back sensor 34 (sensor 1) detects the rear end of the copy sheet after a switch back sensor 35 (sensor 2) has detected the front end of the sheet, a switch back solenoid 33-3 is actuated, and the copy sheet runs upward reversed. When the switch back sensor 35 (sensor 2) detects the rear end of the sheet, the solenoid 33-3 is deenergized. The sheet is directly guided to the discharge port (outlet) and is discharged outside the machine with the front and rear side reversed. A guide plate 32 is kept pressed to the arrow side, the sheet flows smoothly from upside pressing the guide plate, and 32 is used to direct the sheet to the left side at the time of reversing.

Now, the control of the optical system comprising typically the halogen lamp 21 and the first scan mirror 22 will be described.

As shown in the plan of FIG. 15-1, the optical system is directly driven by a DC motor 15-1 through a wire 15-3.

A clock pulse corresponding to the shift distance of the optical system is generated by an encorder 15-2 attached to the DC motor. In addition, when a flag plate 15-7 attached to the mirror base of the optical system crosses fixed sensors (described later), a signal is output. One of these sensors is an optical system home position detection sensor 15-5 for detecting the home position of the optical system, and the other is an image leading edge detection sensor 15-6 for detecting the front end of the original. 15-4 is a pulley.

In the present embodiment, the optical system is driven for the forward shift at a speed corresponding to the scale factor by the slave CPU (Q102) and is controlled. For the speed stabilization, PLL control (described later) is employed. The forward travel distance is determined by the copy scale factor and transfer sheet size. Actual shift distance of the optical system can be known by counting the optical system clock pulses based on an image leading edge detection sensor 15-3.

FIG. 15-2 shows the relation among the scale factor, optical system clock pulse, and transfer sheet size. The calculation formula is Y (clock count)= $\{(L/M)+5\} \div 1.76$. Here, M is scale factor (100%=1, 50%=0.5, 120%=1.2), constant "5" (mm) indicates the slit width of the optical system meaning excess scan by that value, and "1.76" indicates that this optical system is designed to be shifted 1.76 mm per clock. The original is in A3 size at the maximum, and the maximum value of the scan clock count is clock count in A3 100% scale factor.

In the backward shift, the optical system makes the backward shift at a fixed speed 2.5 times that of real size forward shift. At the time of backward shift, the clock pulse is decremented, and the position of the optical system is verified. In order to keep the stop position constant at the backward shift, the speed is slowed down before the optical system home position by applying a brake force, and is controlled so as to stop within a certain range. In this embodiment, backward driving is stopped by a sense signal of the image leading edge detection sensor 15-6, and brake control is performed from here to the optical system home position detection sensor 15-5. The above distance is 55 mm, and is 32 pulses in the optical system clock pulse. Brake control is performed once in 4 pulses, and it is performed 7 times in all. FIG. 15-3 shows this timing, and FIG. 15-4 shows a control flowchart.

The control method is one wherein an optical system forward signal is fed according to the speed to cause the optical system to slow down. In FIG. 15-3, the speed can be known by measuring time tn required for shifting 4 pulses. Brake time (forward on time) Xn (msec) from the present time is determined based on this speed. When sampling is at the nth time, however, since inertia force has fallen, the brake time should be collected. Hence calculation is made using brake time Xn (msec) $=2\{K-(tn/2)-n\}$. Here, K is a constant according to the motor characteristic. In this embodiment, this constant is made to allow variable setting by a volume or a dip switch, thus making it possible to obtain a stable stop position by changing the constant at the time of factory shipment or when the serviceman replaced the motor with one which differs greatly in the characteristic. Table 2 shows values of Xn when constant K=10. In Table 2, n represents speed sampling times, and tn denotes time required for 4 pulse shift. When the calculation results of only the first and second samplings have become negative values, the optical system cannot reach the home position by inertia alone, therefore a backward signal is fed again. At the third time and thereafter, the brake is not applied when the calculation result is below "0".

TABLE 2

| | | | n | | | | (tn = ms) |
|---|---|---|---|---|---|---|---|
| tn | 1 | 2 | 3 | 4 | 5 | 6 | 7 |
| 0 | 18 | 16 | 14 | 12 | 10 | 8 | 6 |
| 2 | 16 | 14 | 12 | 10 | 8 | 6 | 4 |
| 4 | 14 | 12 | 10 | 8 | 6 | 4 | 2 |
| 6 | 12 | 10 | 8 | 6 | 4 | 2 | 0 |
| 8 | 10 | 8 | 6 | 4 | 2 | 0 | 0 |
| 10 | 8 | 6 | 4 | 2 | 0 | 0 | |
| 12 | 6 | 4 | 2 | 0 | 0 | | |
| 14 | 4 | 2 | 0 | 0 | | | |
| 16 | 2 | 0 | 0 | | | | |
| 18 | 0 | −2 | | | | | |
| 20 | −2 | −4 | | | | | |
| 22 | −4 | −6 | | | | | |
| 24 | −6 | −8 | | | | | |

The brake control program shown in the flowchart of FIG. 15-4 is in "optical system clock interrupt process" shown in FIG. 13 (F), i.e., a process to be executed one every shot of the encoder pulse of the optical system motor.

The brake flag here (step B-1) is a flag to be set when in "image leading edge interrupt" (step 1330) shown in FIG. 13 (D) interruption of a signal from the image leading edge detection sensor enters while the optical system is making a backward shift and the optical system backward signal is discontinued. The brake control program is executed only when this brake flag is set.

To execute the brake control program at once means that the encoder pulse has entered once, and therefore the value of "pulse" is incremented by 1 in step B-2. When the pulse has arrived 4 times in all, the operation proceeds to step B-4 by step B-4-YES. In step B-4, "pulse" is cleared, and the next sampling is made ready. On the other hand, in "timer interrupt process" shown in FIG. 13 (B), the value of tn is incremented by 1 every 2 msec, and the value of tn is read in step B-5. In step B-6, the value of constant K of aforementioned volume or dip switch is fetched. In step B-7, the number of sampling times n is incremented by 1, and calculation is made based on the aforementioned calculation formula using these data. Then, in step B-9 the speed detection tn is cleared, in step B-10 whether or not the calculation result is below 0 is checked, when the value is larger than 0 the forward brake (optical system forward signal) is made on in step B-11, and the value of timer is set so that the brake becomes off after Xn (sec) in step B-12. In step B-13, nothing is performed when the calculation result is 0. In step B-14, when the calculation result is negative and the sampling is within the second time, the backward signal is made on for $|Xn|$ msec. Step B-17 is END check, the brake flag is reset when 7 times samplings have been completed, and the brake control program is terminated.

FIG. 15-5 shows examples of control result.

D shows that the backward signal is output in 7 pulses in normal control. E shows the control result when the speed at the image leading edge is faster than normal, and shows that individual brake times overlap up to n=4 with resultant continuous entry of the forward signal. F shows that in the case of the speed at the image leading edge faster than normal the backward signal becomes on at n=1 and n=2.

With controls thus being performed, the copying machine can sufficiently deal with speed change and change in inertia force typically due to load variation of the optical system resulted from aging.

Though in the aforementioned control example, reversing the direction of rotation of the DC motor is used as speed reduction means, a solenoid brake may be used as an alternative retardation means. That is, completely identical effects may be obtained by the control method wherein the position of the optical system is detected similar to the above control example and the solenoid brake on time is controlled accordingly.

Alternatively, a hysteresis clutch brake may be used as a retardation means. In this case, control is not effected by the time of braking, and by controlling the clutch drive current the extent of braking can be adjusted. Particularly, in the case of the hysteresis clutch brake, there is no abrasion surface due to magnetic coupling, aging may be disregarded, and the torque is determined not by the number of revolution but by the current, making it convenient.

Now, the PLL control will be described in detail.

FIG. 16-1 is a block diagram of the PLL control unit. In the diagram, 701 is a crystal oscillator for generating reference frequency of PLL control, 702 is a divider for producing a reference clock by dividing the output of the crystal oscillator, Q102 is a slave CPU, 704 is a driver for driving a motor, 705 is a motor to be controlled to a fixed speed, 706 is an optical rotary encoder for sensing the motor speed, 707 is a divider for dividing the encoder output, and this divider outputs encoder pulse $f_G$ corresponding to the encoder output.

FIG. 16-2 is a detail diagram of the slave CPU (Q102).

As shown in the diagram, the slave CPU has two timers 720 and 721 and a timer/event counter 722. An fs counter 708 uses the timer 720, an FV counter 709 uses the timer/event counter 722, and a PC counter 713 uses the timer 721.

Referring to FIG. 16-1, the processes accomplished by a phase comparison means 710, a pulse width conversion operation means (multiplier) 712 and 714, and an adding means 715 are, in practice, performed programatically, and thus these means are not part of the hardware of the slave CPU (Q102).

This configuration is the same as that of the main CPU (Q101).

FIG. 16-3 is a flowchart of the PLL control so far been described.

Operations in the above configuration will now be described sequentially with reference to FIG. 16-3 (a) through (d). In FIG. 16-3 (a), in step 731 a setting (a value for setting a speed of the optical system) is fed from outside via a port of the slave CPU (Q102), in step 732 a count value corresponding to the setting value is set to the fs counter 708, and counting is started. In step 733 a count value corresponding to the setting value (normally a value ½ the fs counter) is set to the FV counter 709. The fs interruption program of FIG. 16-3 (c) starts each time the counting of the fs counter 708 ends. When a count end interruption enters from the fs counter 708 (step 741), the operation proceeds to step 742, and whether or not there has been input of an encoder pulse $f_G$ ($f_G$ input) is judged. When as a result of judgment of step 742 there was no $f_G$ input until the end of counting by the fs counter, $f_G$ show flag is set, and $f_G$ fast flag is reset (step 743). Here, the slow flag is a flag indicating that the motor is in low speed rotation, while the $f_G$ fast flag is a flag indicating that the motor is in high speed rotation. When there was an $f_G$ input and it was once according to the judgment of step 745, the PC measurement start flag is set and the PC measurement end flag is reset (step 746), then the PC counter 713 is caused to start counting (step 746). When the result of judgment in step 745 is No, i.e., $f_G$ input is twice or more, the $f_G$ fast flag is set, and the $f_G$ slow flag is reset (step 748). The PC measurement start flag here is a flag for starting the PC counter 713 for obtaining the phase comparator output of pulse fs to be output from the fs counter 708 vs. encoder pulse $f_G$, while the PC measurement end flag is a flag which is set when the phase comparator output is obtained when the counting of the PC counter 713 is completed.

The $f_G$ interruption program of FIG. 16-3 (d) starts each time an encoder pulse $f_G$ enters. When an $f_G$ interruption input of step 751 enters, first the FV end flag is reset in step 752, and the FV counter 709 is caused to start counting. Then, when according to the judgment of step 753 no fs input entered since the last $f_G$ input, the $f_G$ fast flag is set and the $f_G$ slow flag is reset (step 758). The fs input here is the input of pulse fs which is output each time the fs counter 708 finished counting. The FV counter 709 is one to be used for performing a rough motor speed control, and outputs a specified output except during a specified period after $f_G$ input.

When fs input entered once in step 754, the PC measurement end flag is set, and the PC measurement start flag is reset (step 756), and then counting operation of PC counter 713 is terminated (step 757). When the result of judgment in step 754 is No, i.e., fs input entered twice or more, the $f_G$ slow flag is set and the $f_G$ fast flag is reset (step 759).

The FV interruption program of FIG. 16-3 (b) starts each time the FV counter 709 finished counting. When in step 761 the count end interruption of the FV counter 709 entered, the FV end flag is set (step 762). The slave CPU performs multiplication by the pulse width conversion operation means 714 and 712 for converting the count value thus obtained by the PC counter 713 and the output value from the FV counter 709 to values corresponding to PWM signal respectively. Then, a single PWM signal is obtained by the addition of the values obtained by the multiplication with an adding means (adder) 715. The slave CPU inputs this PWM signal to a driver 704, drives the motor directly, and controls the motor to a speed corresponding to the setting value.

Since a low-pass filter used in the prior art PLL control need not be used, the DC motor can be controlled to a speed corresponding to the setting value simply by the configuration of the above embodiment without being affected by the low-pass filter (aging and temperature change). In addition, through the introduction of a microcomputer, external peripheral circuits can be minimized. Furthermore, for performing a wide range motor speed control, since changing typically coefficient values on the program is all that is required, changing the filter as in the prior art is not required.

Now, sheet feed control will be described.

Figures 1, 17:
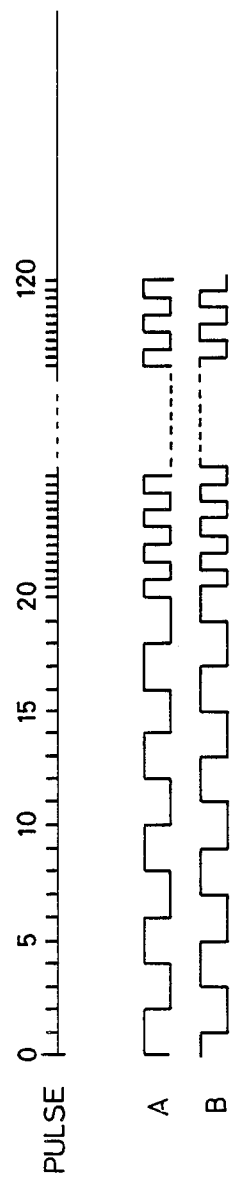
Figures 2, 17:
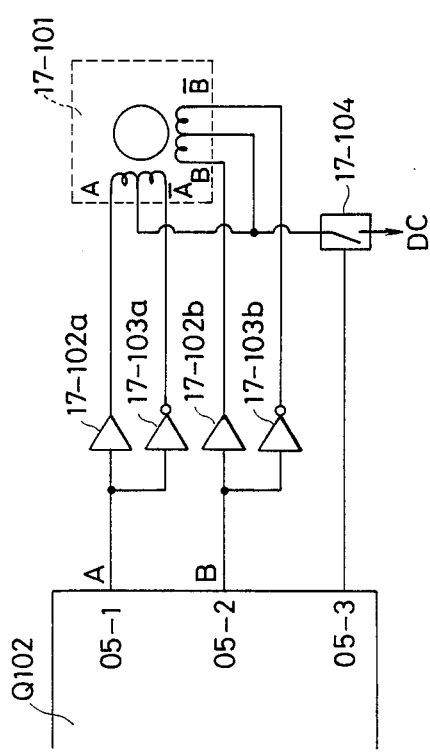
Figures 3, 17:
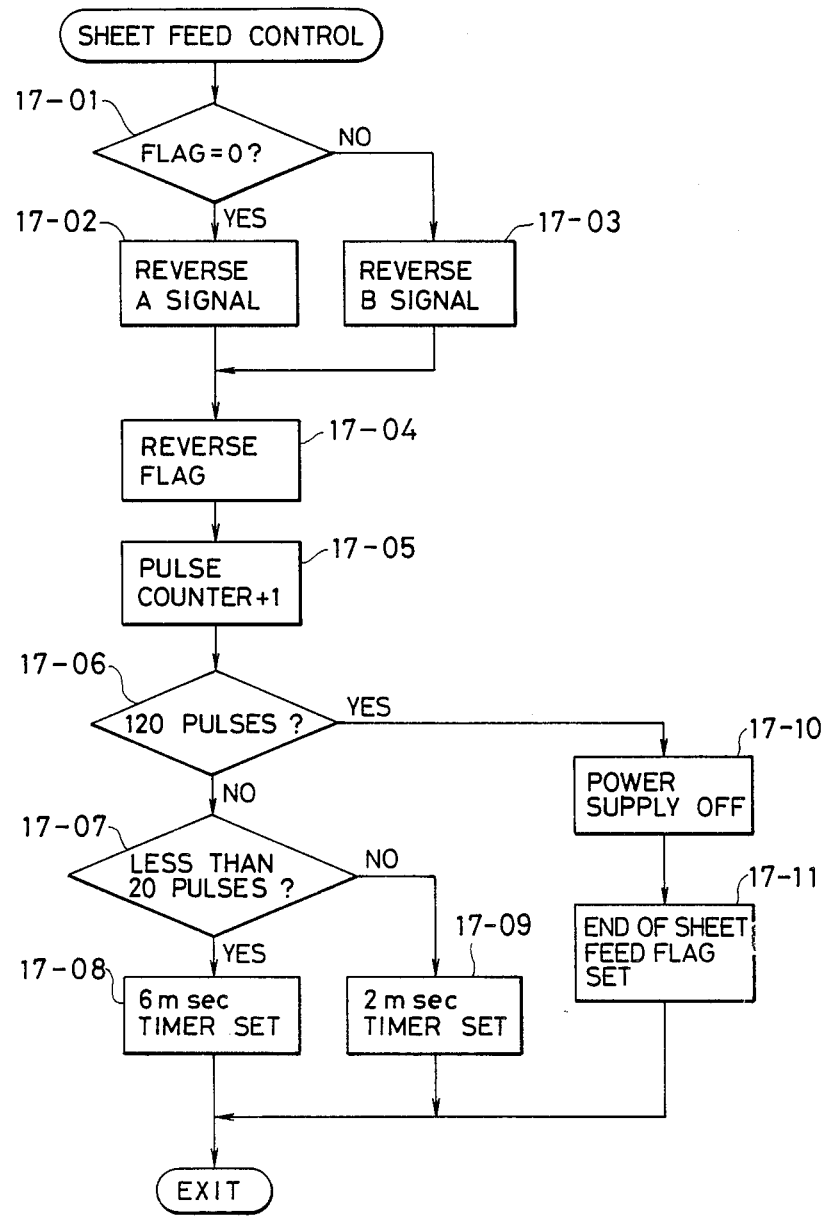
Figures 4, 5:
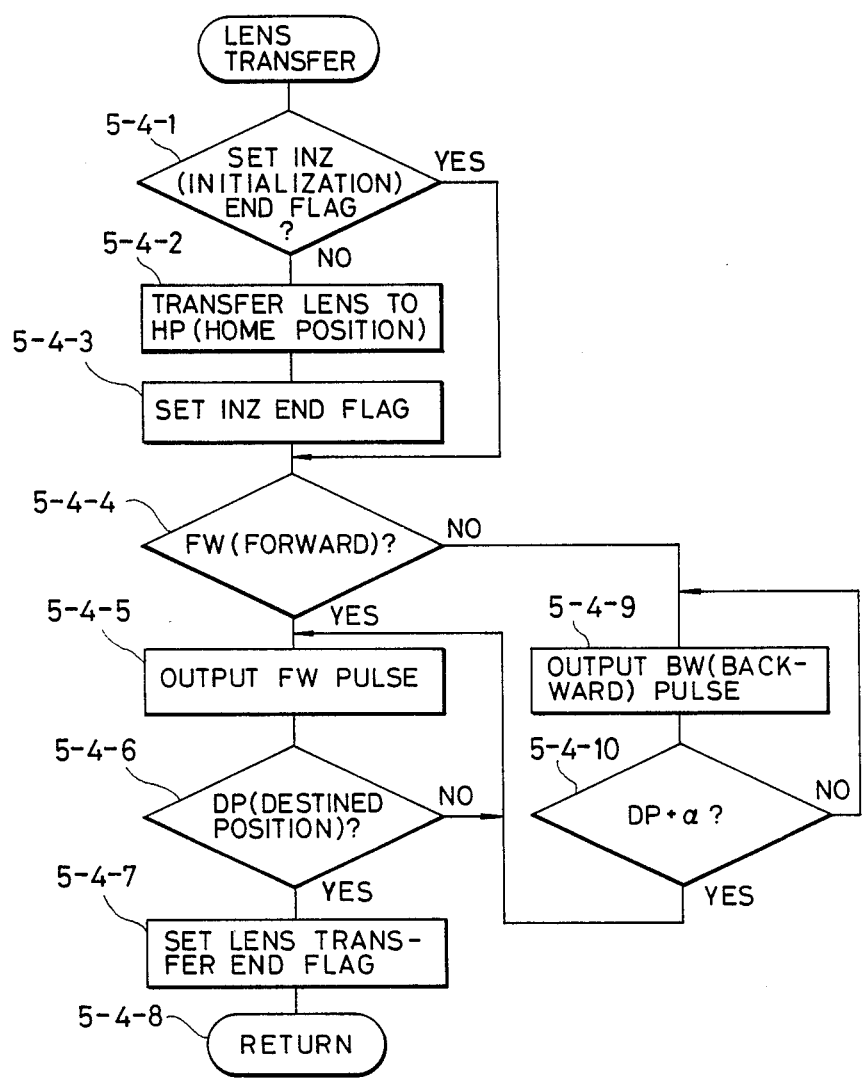
Figures 1, 6:
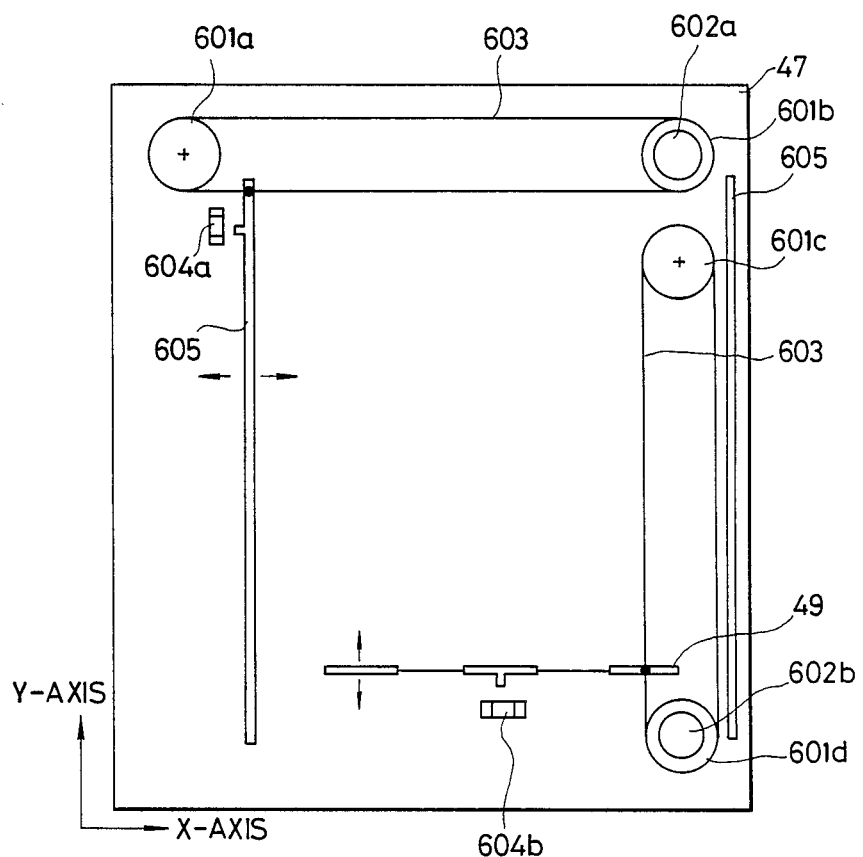
Figures 1, 7:
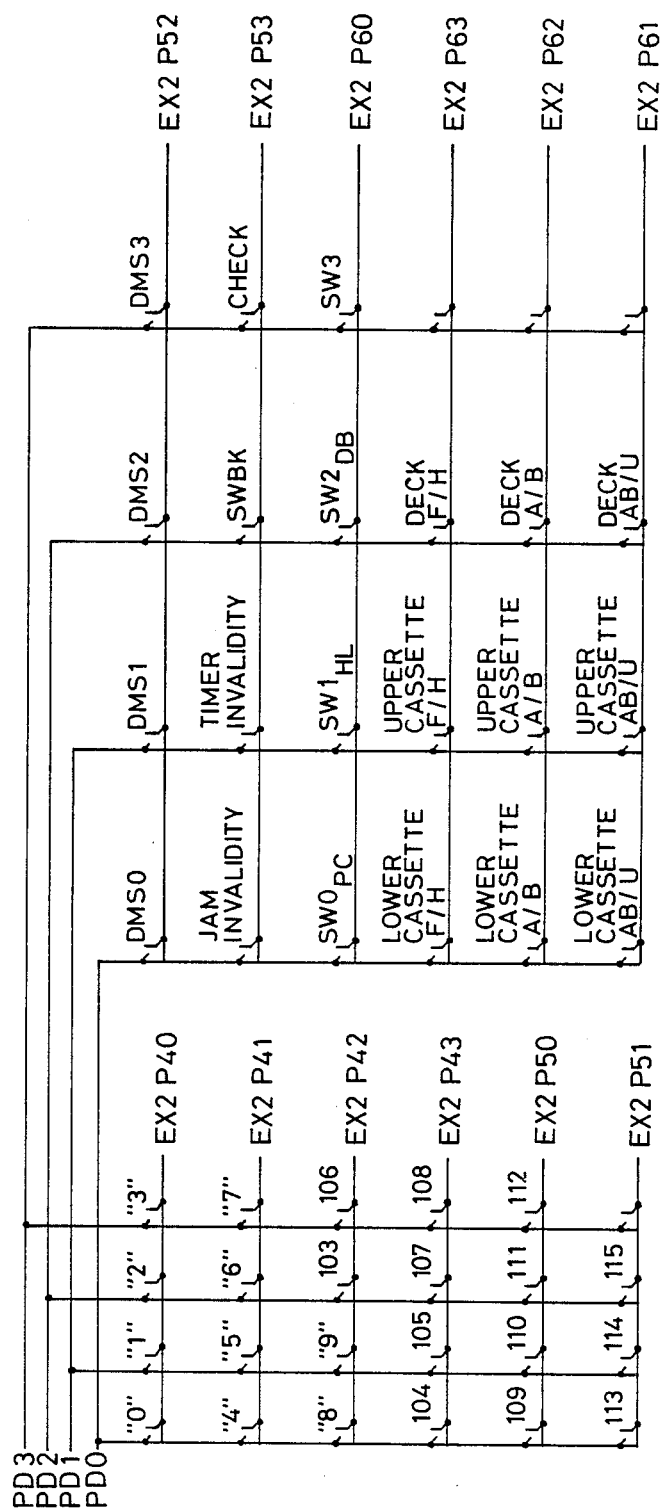
Figures 2, 7:
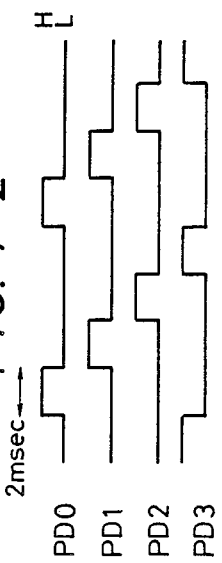
Figures 1, 12:
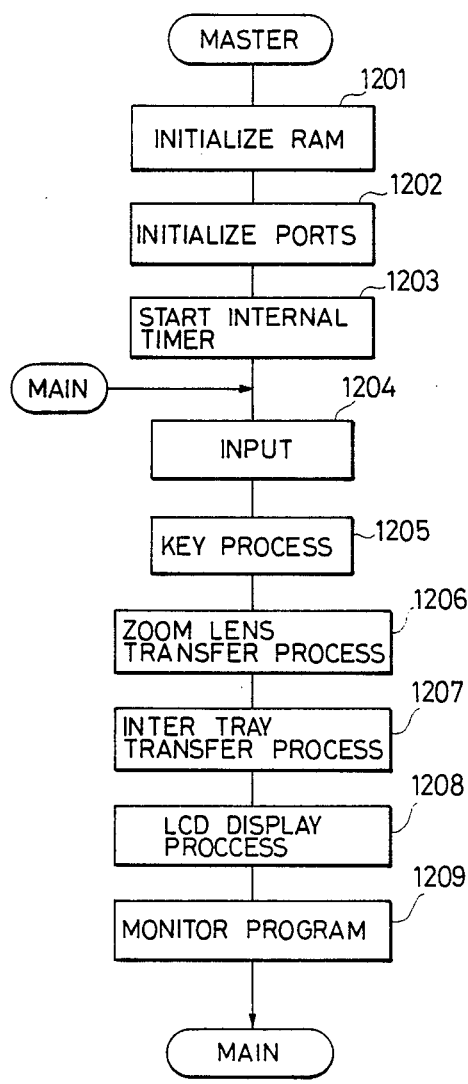
Figures 2, 12:
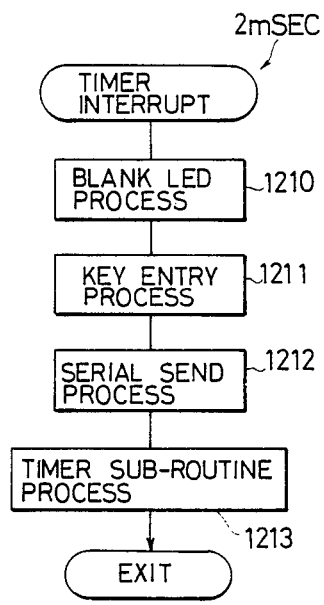
Figures 3, 12:
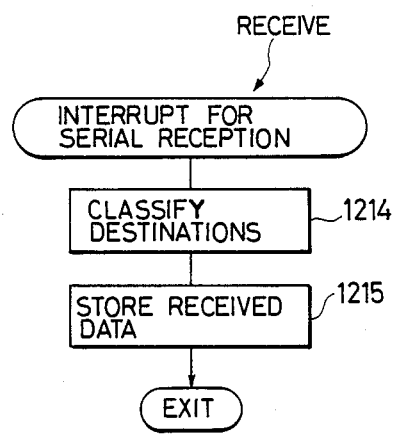
Figures 4, 12:
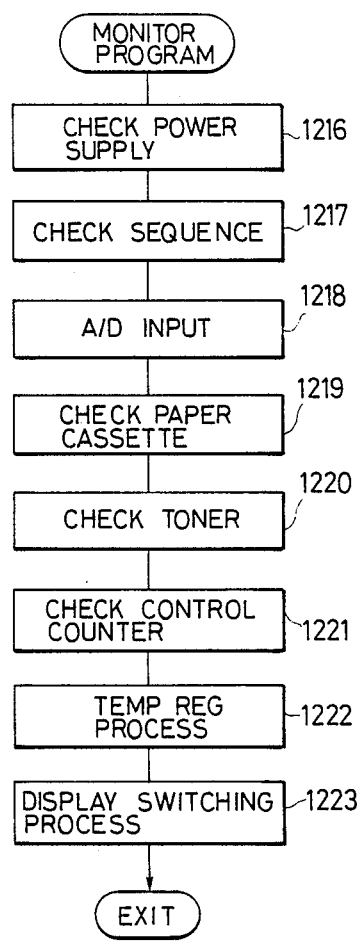
Figures 5, 12:
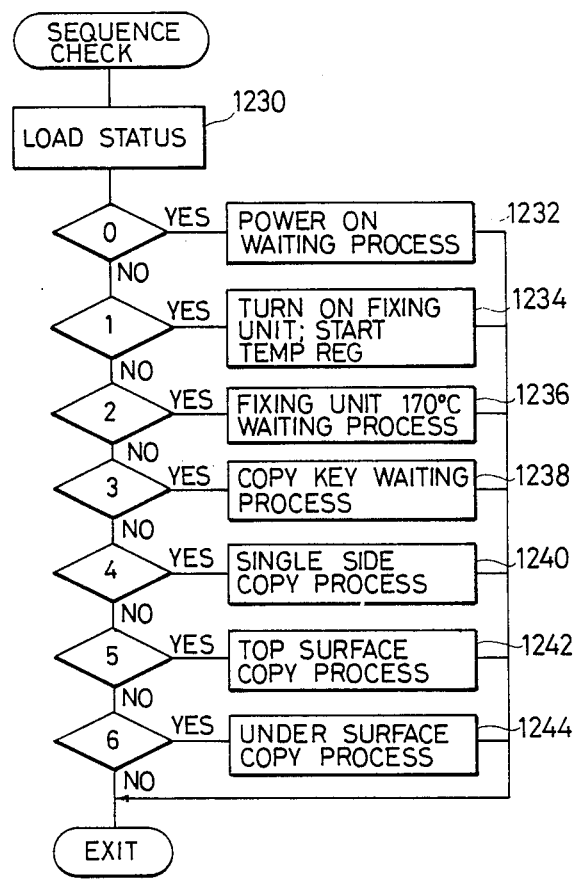
Figures 6, 12:
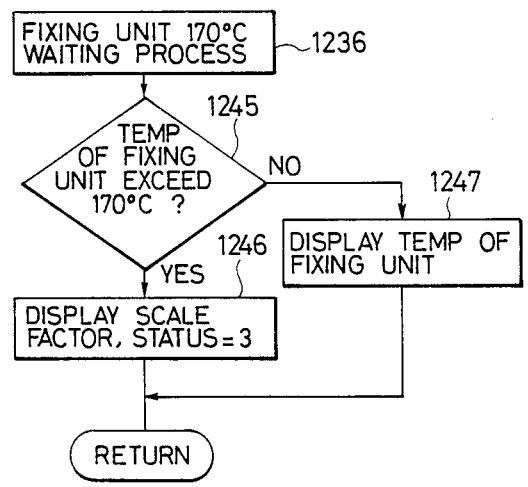
Figures 7, 12:
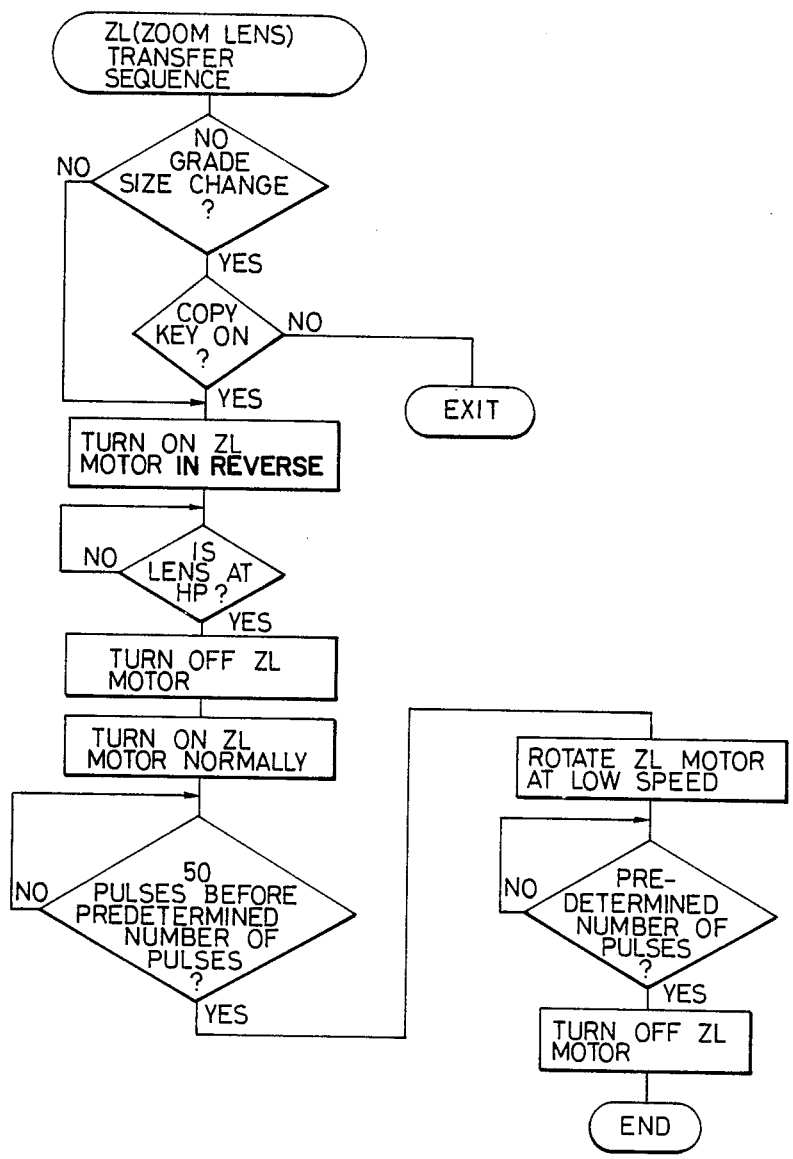
Figures 8, 12:
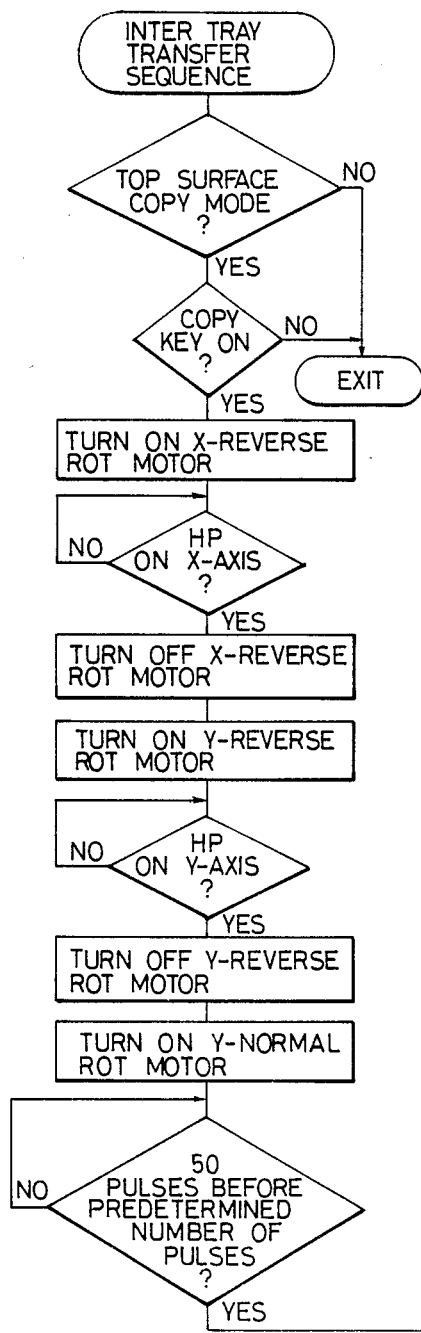
Figures 9, 12:
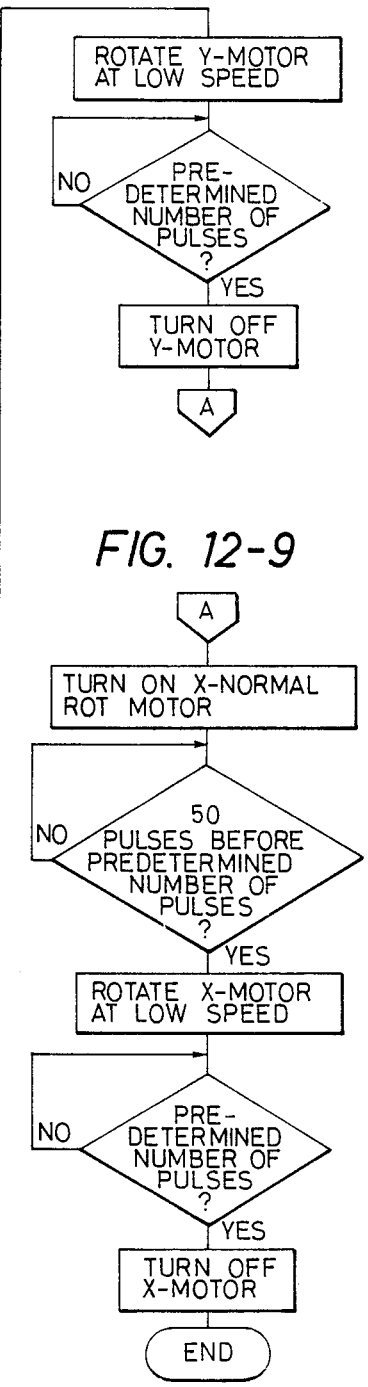

FIG. 17-2 shows an example of the circuit for driving the stepping motor to be used in the sheet feed control by the 2-phase excitation system. To the coils $\overline{A}$, B, and $\overline{B}$ of a stepping motor 17-101, a voltage corresponding to the output status of the slave CPU (Q102) is applied by a buffer driver 17-103 and an inverter driver 17-103. 17-104 is a relay which is capable of performing ON/OFF of DC power to the motor by a signal to be output from a port 05-3 of the slave CPU (Q102). This relay is used to make the sheet feed roller the free condition (freely movable) after the sheet is fed by giving a specified pulse to the stepping motor. FIG. 17-1 shows signals to be output from the slave CPU (Q102). Pulse signals A and B are output from ports 05-1 and 05-2 of the slave CPU respectively, the first 20 pulses of which are outputted at a rate of 166 pps (6 msec/pulse) as shown. Thereafter, 100 pulses are output at a rate of 500 pps (2 msec/pulse). In this manner, by making the pulse interval long for the first 20 pulses, the sheet feed roller is prevented from slipping.

FIG. 17-3 is a flowchart of a program stored in the slave CPU (Q102) for controlling the stepping motor. This program is processed in the timer process of FIG. 13 (B) in which interruption enters at fixed time intervals.

First, whether the flag for knowing which of A and B signals is reversed is "0" or "1" is checked (step 17-01), and then each signal is reversed (step 17-02 and step 17-03). Then the flag is reversed (0→1 or 1→0) (step 17-04), and the branching in step 17-01 is caused to be reversed at the next timing. Then the pulse counter is incremented by 1 (step 17-05), whether or not 120 pulses are completed is checked (step 17-06), when YES a relay 17-104 of FIG. 17-2 is turned off, and power supply is stopped. Then, in step 17-11 the end of sheet feed flag notifying sheet feed completion (that the transfer sheet has arrived at the registration roller 10) is set, and the process is terminated.

Step 17-7 is for checking whether or not within the first 20 pulses, when YES the 6 msec timer is set in step 17-08, and when NO the 2 msec timer is set in step 17-09. When this timer completes, the sheet feed control program is executed again.

FIG. 17-3 is a flowchart when the copy sheet is in the upper cassette. When the copy sheet is supplied from other sheet cassette (the lower cassette 14 or the 2000 sheet deck 46), changing the number of the aforementioned drive pulses is all that is required, and a specific fixed value is set for each sheet cassette. By performing the above-mentioned control, error-free sheet feed operation can be performed.

FIG. 5-1 shows the drive portion of the zoom lens.

A lens holder 506 on which a zoom lens 20 is attached is fitted to the shaft of a stepping motor 501 through a wire 503, a pulley 504, and 502. By causing the stepping motor 501 to make normal/reverse rotation a lens 20 can be shifted and can be focused.

FIG. 5-2 shows an example of the circuit for driving the stepping motor 501 by the 2-phase excitation system. To the coils A, $\overline{A}$, B, and $\overline{B}$ of the stepping motor 501 an voltage corresponding to the output condition of an I/O port Q103 is impressed by a buffer driver 507 and an inverter driver 508. That is, when the pulses shown in FIG. 5-3 (a) are fed sequentially, the lens 20 moves forward, while when the pulses are fed in the sequence shown in FIG. 5-3 (b), the lens 20 moves backward.

In the device shown in FIG. 5-1, in order to prevent typically hunting and start-up failure, the pulse width is lengthened at the time of start-up of the stepping motor 501, and then is gradually shortened. At the stop time, the pulse width is gradually lengthened.

In addition, in the device shown in FIG. 5-4, to improve the accuracy of the stop position the lens 20 is stopped at a destined position always from a fixed direction.

FIG. 5-4 shows a flowchart for transferring the lens to a destined position in the zoom lens transfer sequence in detail. When a lens transfer request has occurred, whether or not the initialize end flag has been set is judged in step 5-4-1, and when YES the operation proceeds to step 5-4-4. When the initialize end flag is not set, the operation proceeds to step 5-4-2, the pulse motor 501 is reversed in its direction of rotation, and the lens is moved until the lens holder 506 reaches the home sensor 505 which employs a photo-interrupter. Then, the operation proceeds to step 5-4-3, and the initialize end flag is set since the lens is in the home position. In step 5-4-4 the relation between the present position and the transfer destined position is judged. When the lens moves backward, the operation proceeds to step 5-4-9. Here, "lens backward" is an operation wherein the lens moves toward the home sensor 505. When the lens moves forward, the operation proceeds to step 5-4-5, and a pulse is output from the output port of the extension I/O port Q103 so that the lens moves in the forward direction by one step. Then the operation proceeds to step 5-4-6, and whether or not the lens is in the destined position is judged. When the lens is not in the destined position, the operation returns to step 5-4-5, and the lens is moved forward to the destined position. When the lens reached the destined position, the operation proceeds to step 5-4-7, the lens transfer end flag is set, and the lens transfer process is terminated. In this example, when the lens is transferred from the first scale factor to the second scale factor, the lens is transferred directly from the position of the first scale factor to the position of the second scale factor. Accordingly, the lens is transferred forward or backward corresponding to the specified scale factor.

In the backward process, to cause the lens to move backward pulses are generated from the ports A and B or the I/O port Q103 (step 5-4-9), the lens is moved one step backward, the operation proceeds to step 5-4-10, and whether or not the lens has moved to the destined position $+\alpha$ (a position on the home sensor side beyond the destined position) is judged. When the lens is not in the destined position $+\alpha$, the operation is returned to step 5-4-9, and the lens is transferred backward. When the lens is in the destined position $+\alpha$, the operation proceeds to step 5-4-5, lens forward process is executed in step 5-4-5 and subsequent steps, when the lens is moved forward to the destined position, the lens transfer end flag is set, and the lens transfer process is terminated.

Since the lens 20 is transferred to the destined position from a fixed direction (forward direction) in this manner, a very good stop position accuracy is obtained. The lens position can be easily known by memorizing the number of pulses given to the stepping motor.

In addition, when the sheet holder for storing copy sheets is transferred corresponding to the sheet size in the intermediate tray 47 to be used in the double side copy mode, by transferring the sheet holder always from a fixed direction an excellent stop position accuracy can be obtained.

The operation will be described below.

FIG. 6-1 is a schematic view showing the structure of the sheet size control board of the intermediate tray 47. Control boards 49 and 605 are boards which are transferred in accordance with the size of the copy sheet. As shown, the control board 49 is such that moves in the Y-axis direction, while the control board 605 moved in the X-axis direction. Each control board is moved by a stepping motor 602 through a wire 603 and a pulley 601.

FIG. 6-2 is a flowchart showing the detailed transfer control flow of the sheet size control boards of the intermediate tray shown in FIG. 12 (H) and (I). When an intermediate tray transfer request is generated, a pulse is fed to the stepping motor 602a in step 6-2-1 until the X-axis control board (X-control board) 605 crosses a home sensor 604a.

When the X-control board 605 reaches the home position, the operation proceeds to step 6-2-2, a pulse is applied to the stepping motor 602b until the Y-axis control board (Y-control board) 49 crosses a home sensor 604b, and the Y-control board is transferred to the home position. Then, the operation proceeds to step 6-2-3, the transfer distance of the control board 49 from the home position is obtained from the size of the copy sheet, and the operation proceeds to step 6-2-4. In step 6-2-4, whether or not the Y-control board is transferred to the destined position or not is judged. When the control board is not in the destined position, the operation proceeds to step 6-2-5, a single Y-stepping motor drive pulse is output, the operation returns to step 6-2-4, and the control board 49 is transferred to the destined position by repeating step 6-2-4 and step 6-2-5. When the Y-control board reached the destined position, the operation proceeds to step 6-2-6, and the X-control board 605 is transferred to the destined position by step 6-2-7 and step 6-2-8, the operation proceeds to step 6-2-9, the intermediate tray sheet size control board transfer end flag is set, and the process is terminated.

FIG. 6-3 shows a flowchart of the intermediate tray Y-axis control board UP of the intermediate tray sheet feed sequence process shown in FIG. 13 (g). The process here is for transferring the copy sheet stored in the intermediate tray to the re-feed position. When a Y-control board UP request is generated, in step 6-3-1 the transfer distance of the Y-control board 49 is converted to the number of pulses, the operation proceeds to step 6-3-2, whether or not the Y-control board 49 reached the destined position is checked. When the Y-control board 49 is not in the destined position, the operation proceeds to step 6-3-3, the Y-stepping motor pulse is advanced by one, and then the operation returns to step 6-3-2. When the Y-control board 49 reached the destined position, the operation proceeds to step 6-3-4, the flag of intermediate tray control board UP end is set, and the process is terminated.

Though not described in FIG. 6-2 and FIG. 6-3, a drive pulse is applied similar to FIG. 5-3 (c) to prevent hunting and start-up failure of the stepping motor.

While but one embodiment of the invention has been illustrated and described, it is obvious that a number of changes and modifications can be made without departing from the scope of the invention.

What is claimed is:

1. A moving body control device comprising:
   a motor for driving a moving body; first detecting means for detecting a first predetermined position of the moving body;
   second detecting means for detecting speed of said moving body; and
   control means for controlling braking of the moving body to stop the moving body within a predetermined range associated with a second predetermined position by utilizing outputs of said first and second detecting means, said control means starting the brake control of the moving body after said first detecting means detects the first predetermined position of the moving body,
   wherein said control means calculating the speed of the moving body and obtains a movement position of the moving body by utilizing the outputs of said first and second detecting means, determine a brake time of the moving body, said brake time being variable on the basis of the calculated speed and the obtained movement position, and brakes and unbrakes the moving body plural times on the basis of the obtained movement position during movement of the moving body from said first predetermined position to said second predetermined position.

2. The moving body control device according to claim 1, wherein said control means controls braking of the moving body by sending a reversal signal to said motor.

3. The moving body control device according to claim 1, wherein said control means comprises a microcomputer having a predetermined program.

4. The moving body control device according to claim 1, wherein said second detecting means comprises an encoder adapted to generate clock pulses in response to the rotation of said motor.

5. The moving body control device according to claim 1, whereinn said moving body is a reciprocative scanner for reading an original sheet, said first detecting means is set correspondingly to a leading edge of the original sheet, and said second predetermined position is a home position of said scanner.

6. The moving body control according to claim 1, further including means for generating a reference signal, wherein said control means controls said motor to move said moving body at a predetermined speed by comparing the phase of the output from said second detecting means with the phase of said reference signal.

7. A moving body control device comprising:
   a motor for driving a moving body;
   first detecting means for detecting a first predetermined position of the moving body;

second detecting means for detecting speed of the moving body; and control means for controlling braking of the moving body to stop the moving body within a predetermined range associated with a second predetermined position by utilizing outputs of said first and second detecting means, said control means starting the brake control of the moving body after said first detecting means detects the first predetermined position of the moving body, wherein said control means obtains a movement position of the moving body by utilizing the outputs of said first and second detecting means, and said control means brakes and unbrakes the moving body at plural times on the basis of the obtained movement position during movement of the moving body from said first predetermined position to said second predetermined position.

8. The moving body control device according to claim 7, wherein said control means calculates the speed of the moving body and obtains the movement position of the moving body by utilizing the outputs of said first and second detecting means, and determines a brake mode on the basis of the calculated speed and the obtained movement position.

9. The moving body control device according to claim 8, wherein said control means determines a brake time of the moving body, said brake time being variable on the basis of the calculated speed and the obtained movement position.

10. The moving body control device according to claim 7, wherein said control means controls braking of the moving body by sending a reversal signal to said motor.

* * * * *

UNITED STATES PATENT AND TRADEMARK OFFICE
CERTIFICATE OF CORRECTION

PATENT NO. : 4,739,231
DATED : April 19, 1988
INVENTOR(S) : MASANORI MIYATA, ET AL.

It is certified that error appears in the above-identified patent and that said Letters Patent is hereby corrected as shown below:

IN THE DRAWINGS

Sheet 2, Figure 2A, "DRUM THERMISTER" should read —DRUM THERMISTOR—.

Sheet 2, Figure 2A, "FIXING UNIT THERMISTER" should read —FIXING UNIT THERMISTOR—.

Figure 2B:
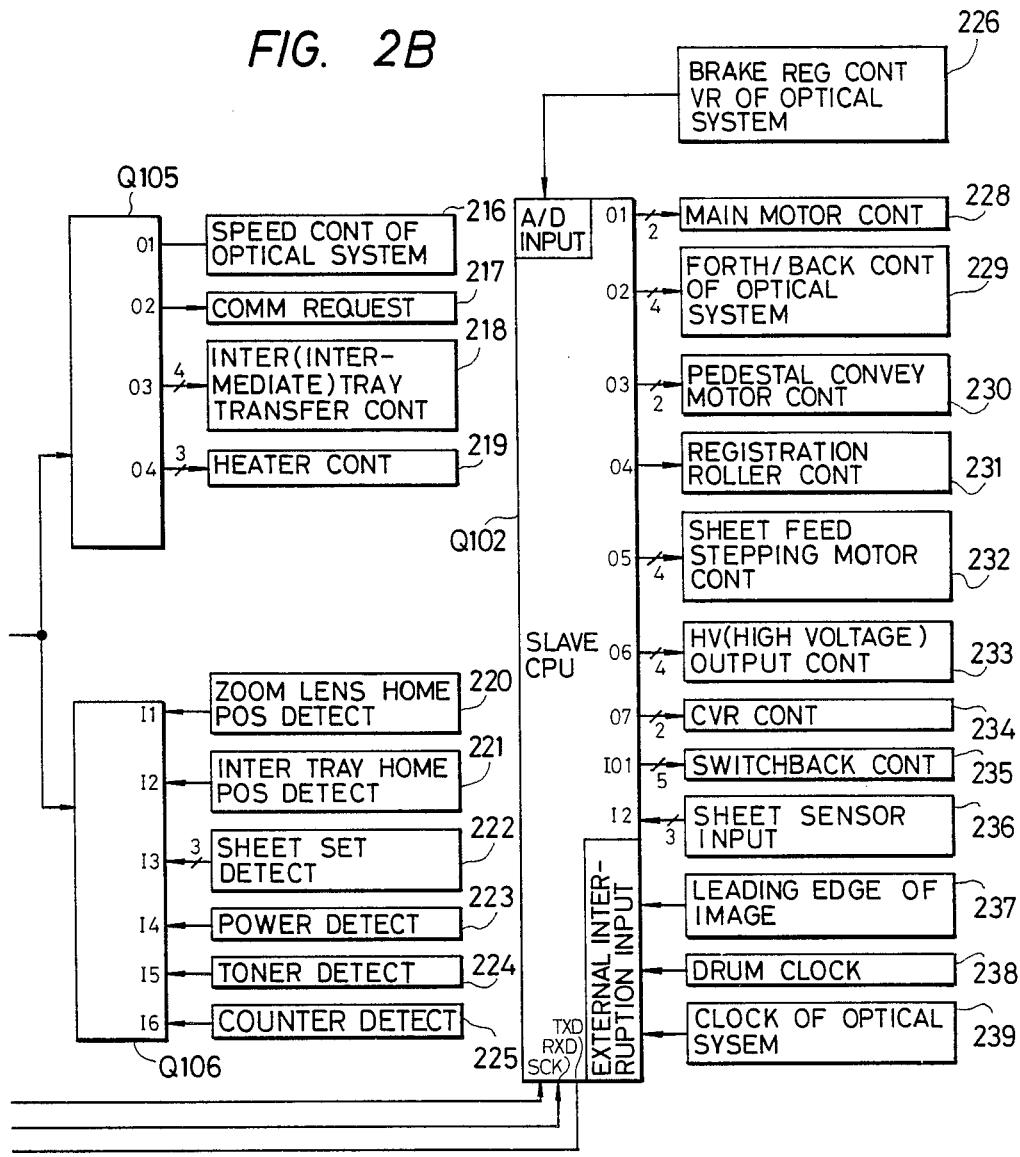

Sheet 3, Figure 2B, "CLOCK OF OPTICAL SYSEM" should read —CLOCK OF OPTICAL SYSTEM—.

COLUMN 1

Line 28, "copying" should read —in copying—.
Line 41, "number" should read —a number—.

COLUMN 2

Line 22, "highly," should read —highly—.
Line 40, "claim." should read —claims.—

COLUMN 3

Line 52, "started" should read —starting—.

COLUMN 4

Line 51, "99 sheet." should read —99 sheets.—.

UNITED STATES PATENT AND TRADEMARK OFFICE
CERTIFICATE OF CORRECTION

PATENT NO. : 4,739,231

DATED : April 19, 1988

INVENTOR(S) : MASANORI MIYATA, ET AL.

It is certified that error appears in the above-identified patent and that said Letters Patent is hereby corrected as shown below:

COLUMN 5

Line 29, "are" should read --and are--.

COLUMN 6

Line 10, "0" should be deleted.

COLUMN 8

Line 1, "examole" should read --example--.

COLUMN 9

Line 45, "nose" should read --noise--.

COLUMN 10

Line 23, "FIGURE (b)" should read --FIG. 10(b)--.
    Line 29, "difference" should read --different--.

COLUMN 11

Line 23, "FIGS. 2-1" should read --FIGS. 12-1--.

COLUMN 12

Line 16, "FIG. 13(A)," should read --FIG. 13-1,--.
    Line 60, "FIG. 13(G)," should read --FIG. 13-7,--.

UNITED STATES PATENT AND TRADEMARK OFFICE
CERTIFICATE OF CORRECTION

PATENT NO. : 4,739,231
DATED : April 19, 1988
INVENTOR(S) : MASANORI MIYATA, ET AL.

It is certified that error appears in the above-identified patent and that said Letters Patent is hereby corrected as shown below:

COLUMN 13

Line 62, "FIG. 13(O)," should read --FIG. 13-15,--.

COLUMN 14

Line 25, "wait the" should read --wait for the--.

COLUMN 15

Line 67, "FIG. 13(c)," should read --FIG. 13-29,--.

COLUMN 16

Line 29, "FIG. 13(e)" should read --FIG. 13-31--.
    Line 32, "spent" should read --sent--.

COLUMN 17

Line 29, "hole" should read --home--.

COLUMN 18

Line 36, "1552-4)." should read --1452-4).--.

COLUMN 19

Line 29, "encorder 15-2" should read --encoder 15-2--.

UNITED STATES PATENT AND TRADEMARK OFFICE
CERTIFICATE OF CORRECTION

PATENT NO. : 4,739,231
DATED : April 19, 1988
INVENTOR(S) : MASANORI MIYATA, ET AL.

It is certified that error appears in the above-identified patent and that said Letters Patent is hereby corrected as shown below:

COLUMN 20

Line 50, "in" should read --an--.
    Line 51, "FIG. 13(F)," should read --FIG. 13-6,--.
    Line 51, "one" should read --once--.
    Line 55, "in" should read --an--.
    Line 56, "FIG. 13(D)" should read --FIG. 13-4--.
    Line 68, "FIG. 13(B)," should read --FIG. 13-2,--.

COLUMN 24

Line 12, "coils A, A, B, and B" should read
        --coils A, $\bar{A}$, B, and $\bar{B}$--.
    Line 13, "an" should read --a--.

COLUMN 25

Line 32, "FIG. 12(H) and (I)." should read --FIGS. 12-8 and
        12-9.--.

UNITED STATES PATENT AND TRADEMARK OFFICE
CERTIFICATE OF CORRECTION

PATENT NO. : 4,739,231
DATED : April 19, 1988
INVENTOR(S) : MASANORI MIYATA, ET AL.

It is certified that error appears in the above-identified patent and that said Letters Patent is hereby corrected as shown below:

COLUMN 26

Line 17, "body; first" should read --body; ¶ first--.
Line 30, "calculating" should read --calculates--.
Line 33, "determine" should read --determines--.
Line 54, "whereinn" should read --wherein--.
Line 59, "moving body control" should read --moving body control device--.

Signed and Sealed this

Second Day of May, 1989

*Attest:*

DONALD J. QUIGG

*Attesting Officer*      *Commissioner of Patents and Trademarks*